United States Patent
Xiong et al.

(10) Patent No.: US 11,696,193 B2
(45) Date of Patent: *Jul. 4, 2023

(54) RANDOM ACCESS METHOD, NETWORK NODE AND USER EQUIPMENT

(71) Applicant: Samsung Electronics Co., Ltd., Suwon-si (KR)

(72) Inventors: Qi Xiong, Beijing (CN); Chen Qian, Beijing (CN); Bin Yu, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/372,152

(22) Filed: Jul. 9, 2021

(65) Prior Publication Data

US 2021/0337438 A1 Oct. 28, 2021

Related U.S. Application Data

(63) Continuation of application No. 16/500,079, filed as application No. PCT/KR2018/003870 on Apr. 2, 2018, now Pat. No. 11,064,401.

(30) Foreign Application Priority Data

| Apr. 1, 2017 | (CN) | 201710214206.8 |
| May 5, 2017 | (CN) | 201710313539.6 |

(Continued)

(51) Int. Cl.
*H04W 4/00* (2018.01)
*H04W 36/00* (2009.01)
(Continued)

(52) U.S. Cl.
CPC ...... *H04W 36/0058* (2018.08); *H04B 7/0626* (2013.01); *H04L 5/0051* (2013.01);
(Continued)

(58) Field of Classification Search
CPC ......... H04W 36/0058; H04W 36/0072; H04W 56/001; H04W 72/1263; H04W 74/0833;
(Continued)

(56) References Cited

U.S. PATENT DOCUMENTS 11,064,401 B2 *  7/2021  Xiong .............. H04W 36/0058
2013/0072244 A1   3/2013  Jeong et al.
(Continued)

FOREIGN PATENT DOCUMENTS

CN        101640922 A    2/2010
CN        101778481 A    7/2010
(Continued)

OTHER PUBLICATIONS

China National Intellectual Property Administration, "The Second Office Action," dated Apr. 19, 2022, in connection with Chinese Patent Application No. 201710491173.1, 24 pages.
(Continued)

*Primary Examiner* — Chuong T Ho

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides a random access method, a network node and a user equipment. With the
(Continued)

solution of the above embodiment of the present disclosure, the performance of the UE randomly accessing the target cell can be improved.

12 Claims, 48 Drawing Sheets

(30) Foreign Application Priority Data

| | | | |
|---|---|---|---|
| Jun. 23, 2017 | (CN) | ......................... | 201710491173.1 |
| Sep. 20, 2017 | (CN) | ......................... | 201710855759.1 |
| Sep. 30, 2017 | (CN) | ......................... | 201710928123.5 |
| Nov. 29, 2017 | (CN) | ......................... | 201711227251.3 |

(51) Int. Cl.
*H04W 74/08* (2009.01)
*H04W 76/11* (2018.01)
*H04W 72/1263* (2023.01)
*H04B 7/06* (2006.01)
*H04L 5/00* (2006.01)
*H04L 25/02* (2006.01)
*H04W 56/00* (2009.01)

(52) U.S. Cl.
CPC ..... *H04L 25/0226* (2013.01); *H04W 36/0072* (2013.01); *H04W 56/001* (2013.01); *H04W 72/1263* (2013.01); *H04W 74/0833* (2013.01); *H04W 76/11* (2018.02)

(58) Field of Classification Search
CPC ............... H04W 76/11; H04W 74/006; H04W 36/0077; H04W 36/30; H04B 7/0626; H04B 7/0695; H04B 7/0888; H04L 5/0051; H04L 25/0226; H04L 25/0224; H04L 5/0048; H04L 5/0094; H04L 5/001; H04L 5/0053
USPC ......................................................... 370/331
See application file for complete search history.

(56) References Cited

U.S. PATENT DOCUMENTS

| | | | |
|---|---|---|---|
| 2013/0223409 A1 | 8/2013 | Jung et al. | |
| 2013/0242730 A1 | 9/2013 | Pelletier et al. | |
| 2014/0153536 A1 | 6/2014 | Ouchi et al. | |
| 2014/0247796 A1 | 9/2014 | Ouchi et al. | |
| 2014/0308596 A1 | 10/2014 | Ibuka et al. | |
| 2014/0308956 A1 | 10/2014 | Zhang et al. | |
| 2014/0314046 A1 | 10/2014 | Jung et al. | |
| 2015/0172973 A1* | 6/2015 | Jeong ................ | H04W 36/0033 370/331 |
| 2015/0181461 A1 | 6/2015 | Kim et al. | |
| 2015/0181493 A1 | 6/2015 | Park et al. | |
| 2015/0237626 A1 | 8/2015 | Li et al. | |
| 2015/0305014 A1 | 10/2015 | Li et al. | |
| 2015/0373740 A1* | 12/2015 | Eriksson .............. | H04B 17/309 370/329 |
| 2016/0037425 A1 | 2/2016 | Van Lieshout et al. | |
| 2016/0330659 A1 | 11/2016 | Zhu et al. | |
| 2017/0141825 A1 | 5/2017 | Zhang et al. | |
| 2017/0171787 A1 | 6/2017 | Fu et al. | |
| 2017/0195998 A1 | 7/2017 | Zhang et al. | |
| 2017/0238228 A1 | 8/2017 | Zhang et al. | |
| 2017/0318608 A1 | 11/2017 | Ryoo et al. | |
| 2018/0152225 A1 | 5/2018 | Dinan | |
| 2018/0192384 A1* | 7/2018 | Chou ................... | H04W 24/10 |
| 2018/0235013 A1 | 8/2018 | Jung et al. | |
| 2018/0279186 A1 | 9/2018 | Park et al. | |
| 2020/0021336 A1* | 1/2020 | Da Silva .............. | H04B 7/0695 |
| 2020/0154326 A1 | 5/2020 | Deenoo et al. | |
| 2020/0245205 A1* | 7/2020 | Park ...................... | H04W 36/30 |

FOREIGN PATENT DOCUMENTS

| | | |
|---|---|---|
| CN | 103931112 A | 7/2014 |
| CN | 104871629 A | 8/2015 |
| CN | 106165489 A | 11/2016 |
| CN | 106788879 A | 5/2017 |
| EP | 2214449 A1 | 8/2010 |
| KR | 10-2013-0105669 A | 9/2013 |
| KR | 10-2015-0079939 A | 7/2015 |
| KR | 10-2016-0119816 A | 10/2016 |
| WO | 2016019574 A1 | 2/2016 |
| WO | 2016044994 A1 | 3/2016 |
| WO | 2016085235 A1 | 6/2016 |
| WO | 2017044155 A1 | 3/2017 |

OTHER PUBLICATIONS

China National Intellectual Property Administration (CNIPA), "The First Office Action" dated Oct. 11, 2021, in connection with counterpart Chinese Patent Application No. 201710491173.1, 14 pages.
ISA/KR, International Search Report and Written Opinion of the International Searching Authority, International Application No. PCT/KR2018/003870, dated Jul. 10, 2018, 15 pages.
The First Office Action dated Dec. 2, 2020 in connection with Chinese Application No. 201710313539.6, 19 pages.
The Second Office Action dated May 18, 2021 in connection with Chinese Application No. 201710313539.6, 17 pages.
Ericsson, "Random Access Enhancements," Tdoc R2-1700850, 3GPP TSG-RAN WG2 #97, Athens, Greece, Feb. 13-17, 2017, 5 pages.
Huawei, et al., "UL SRS design for CSI acquisition and beam management," R1-1700074, 3GPP TSG RAN WG1 NR Ad Hoc Meeting, Spokane, USA, Jan. 16-20, 2017, 8 pages.
Huawei, et al., "RACH Procedures and Resource Configuration," R1-1701724, 3GPP TSG RAN WG1 Meeting #88, Athens, Greece, Feb. 13-17, 2017, 7 pages.
LG Electronics Inc, "Condition based handover procedure in NR," R2-1701966 (Resubmission of R2-1700512), 3GPP TSG-RAN2 Meeting #97, Athens, Greece, Feb. 13-17, 2017, 2 pages.
Samsung, "NR 4-step random access procedure," R1-1700891, 3GPP TSG RAN WG1 NR Ad Hoc, Spokane, Washington, USA, Jan. 16-20, 2017, 14 pages.
China National Intellectual Property Administration, "The First Office Action," dated Oct. 28, 2022, in connection with Chinese Patent Application No. 201710214206.8, 15 pages.
Ericsson, "Introducing Rel-14 NB-IoT enhancements and SC-PTM for NB-IoT and eMTC," 3GPP TSG-RAN WG2 Meeting #97, R2-1702438, 20 pages.
Korean Intellectual Property Office, "Office Action," dated Mar. 23, 2023, in connection with Korean Patent Application No. 10-2019-7028899, 13 pages.
China National Intellectual Property Administration, "Office Action," dated Apr. 21, 2023, in connection with Korean Patent Application No. 201711227251.3, 34 pages.
Ericsson, "Remaining details on RACH procedure," 3GPP TSG RAN WG1 NR Ad-Hoc#3, R1-1716155, Nagoya, Japan, Sep. 18-21, 2017, 18 pages.

* cited by examiner

Msg 3

FIG. 24

| Number of subsets M | Starting preamble sequence index of Subset 1 | Number of preamble sequences Of subset 1 | Number of preamble sequences Of subset 2 | ... | Number of preamble sequences Of subset M |

FIG. 25

| Number of subsets M | Number of preamble sequences | Starting preamble sequence index of subset 1 | Starting preamble sequence index of subset 2 | ... | Starting preamble sequence index of Subset M |

FIG. 27

| Number of subsets M | Number of basic sequences | Starting index of basic sequence | index range of covering codes |
|---|---|---|---|

- PRIOR ART -

RANDOM ACCESS METHOD, NETWORK NODE AND USER EQUIPMENT

CROSS-REFERENCE TO RELATED APPLICATIONS

This application is a continuation of application Ser. No. 16/500,079, which is the 371 National Stage of International Application No. PCT/KR2018/003870, filed Apr. 2, 2018, which claims priority to Chinese Patent Application No. 201710214206.8, filed Apr. 1, 2017, Chinese Patent Application No. 201710313539.6, filed May 5, 2017, Chinese Patent Application No. 201710491173.1, filed Jun. 23, 2017, Chinese Patent Application No. 201710855759.1, filed Sep. 20, 2017, Chinese Patent Application No. 201710928123.5, filed Sep. 30, 2017, Chinese Patent Application No. 201711227251.3, filed Nov. 29, 2017, the disclosures of which are herein incorporated by reference in their entirety.

BACKGROUND

1. Field

The present disclosure relates to the field of wireless communication technology, and more particularly, to a random access method, a network node and a user equipment.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as ""sensing technology"", ""wired/wireless communication and network infrastructure"", ""service interface technology"", and ""Security technology"" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Rapid developments of information industry, especially growing demands from a mobile internet and an internet of things (IoT), bring unprecedented challenges to future mobile communication technologies. According to a report ITU-R M. [IMT.BEYOND 2020.TRAFFIC] of the International Telecommunication Union (ITU), it can be expected that the growth of mobile traffic will increase nearly 1000 times that of 2010 (4G era) by 2020, a number of user equipment connections will be more than 17 billion, and with gradually penetrating of massive IoT devices to the mobile communication network, the number of connected devices will be even more astonishing. To meet this unprecedented challenge, the communication industry and academia have embarked on a wide-ranging fifth generation (5G) mobile communication technology research for the 2020s. Currently, a framework and an overall goal of the future 5Gare discussed in the ITU report ITU-R M. [IMT-.VISION], wherein demand outlooks, application scenarios and various key performance indicators for 5G are described in detail. For new requirements in 5G, the ITU report ITU-R M. [IMT.FUTURE TECHNOLOGY TRENDS] provides information on technology trends for 5G, aiming to address significant issues such as a significant increase in system throughput, user experience consistency, scalability to support IoT, time delay, energy efficiency, cost, network flexibility, emerging business support, and flexible spectrum utilization.

Performance of a random access directly affects the user's experience. In traditional wireless communication systems, such as LTE and LTE-Advanced, the random access procedure is applied to multiple scenarios such as establishing an initial link, cell handover, reestablishing an uplink, and Radio Resource Control (RRC) connection reestablishment, and is divided into a Contention-based Random Access and a Contention-Free Random Access according to whether the user has exclusive preamble sequence resources. In the contention-based random access, when the user attempts to establish an uplink, selecting a preamble sequence from the same preamble sequence resource may result in that multiple users select the same preamble sequence and transmit it to the base station. Therefore, a contention resolution mechanism is an important research direction in the random access. How to reduce a probability of the contentions and how to quickly resolve an occurred contention are key indicators that affect the random access performance.

The contention-based random access procedure in the LTE-A is divided into four steps, as shown in FIG. 1. FIG. 1 is a schematic diagram illustrating a conventional contention-based random access procedure. In the first step, a user randomly selects a preamble sequence from a preamble sequence resource pool and transmits it to the base station. The base station detects a correlation of the received signal to identify the preamble sequence sent by the user. In the second step, the base station transmits a Random Access Response (RAR) to the user, comprising a random access preamble sequence identifier, a timing advance instruction determined based on an estimation of a time delay between the user and the base station, a temporary Cell-Radio Network Temporary Identifier (C-RNTI), and a time-frequency resource allocated for the user's next uplink transmission. In the third step, the user transmits a Third Message (Message 3, Msg3) to the base station according to the information in the RAR. The Msg3 includes information such as a User Equipment (UE) identifier and a RRC link request, wherein the UE identifier is unique to the user and is used to resolve the contention. In the fourth step, the base station transmits the user a contention resolution identifier, which includes the UE identifier of the user who has won the contention resolution. After detecting its own identifier, the user upgrades the temporary C-RNTI to a C-RNTI and transmits an ACK signal to the base station to complete the random access procedure and waits for a scheduling from the base station. Otherwise, the user will start a new random access procedure after a time delay.

For the contention-free random access procedure, the user may be assigned a preamble sequence because the base station already knows the user identifier. Therefore, when transmitting the preamble sequence, the user does not need to randomly select the preamble sequence, but uses the assigned preamble sequence. After detecting the assigned preamble sequence, the base station transmits a corresponding random access response including information such as timing advance and uplink resource allocation, etc. After receiving the random access response, the user considers that an uplink synchronization has been completed and waits for a further scheduling from the base station. Therefore, the contention-free random access procedure includes only two steps: Step 1 is to transmit the preamble sequence; and Step 2 is to transmit the random access response.

The random access procedure in LTE is suitable for the following scenarios:

1. Initial accessing under RRC IDLE;
2. Re-establishing RRC connection;
3. Cell handover;
4. In RRC connected state, downlink data arrives and random access procedure is requested (when the uplink is in asynchronous);
5. In the RRC connected state, the uplink data arrives and random access procedure is requested (when the uplink is in asynchronous or there is no resource allocated for the scheduling request in the PUCCH resource);
6. Positioning.

In the LTE, the above six scenarios use same random access steps. In a standard study of 5G, millimeter-wave communication is a possible key technology for 5G. By increasing a carrier frequency to the millimeter-wave band, an available bandwidth will increase greatly, thus greatly increasing the system's transmission rate. In order to combat characteristics of high fading and high loss in the wireless channel of the millimeter-wave band, the millimeter-wave communication system generally adopts a beamforming technology, that is, beam energies are concentrated in a certain direction by using a weighting factor. When performing the wireless communication, the base station and the user search an optimal beam pair by polling or the like so as to maximize a reception signal-noise ratio (SNR) at the user side.

In the millimeter-wave system, for the base station, it is required to configure a UE-specific sounding reference signal (SRS) or a channel state information reference signal (CSI-RS) for a UE, which is critical for a beam management and a beam correction for uplink between the base station and the UE. Therefore, the UE needs to report a number of beams owned by itself to the base station, and the number of beams can be considered as a capability possessed by the UE. If the base station can know the number of beams possessed by the UE in time when the UE accesses or after the UE accesses, the base station can allocate appropriate time-frequency resources to the UE and configure appropriate SRSs and CSI-RSs in processes of the resource allocation, the beam management, the beam correction, and the cell handover, in order to avoid a waste of system resources and improve a resource utilization efficiency.

In existing discussions of the 5G standard, the communication system uses the beamforming method, but there is no suitable signaling and flow for the UE to notify the base station of the beam-numbers capability of itself, which leads to a low resource utilization efficiency of the existing millimeter wave system, and thus it is unable to reasonably configure allocation resources, for example, resources for SRSs and CSI-RSs, according to the number of beams of the UE.

With regard to the contention-free random access procedure, since the base station has obtained the user ID, the base station may allocate a preamble sequence for the user. Therefore, when the user sends the preamble sequence, the user may not need to randomly select a sequence, but use the allocated preamble sequence. After detecting the allocated preamble sequence, the base station may send a corresponding random access response including information such as timing advance and UL resource allocation. When the user receives the random access response, the user may have finished the UL synchronization and waited for further scheduling of the base station. Therefore, the contention-free random access procedure may include two steps: step one is transmitting the preamble sequence and the step two is transmitting the random access response.

SUMMARY

In the LTE, the above-described six scenarios may use same random access steps. In some scenarios, such as no resource is allocated to a scheduling request in the PUCCH resources, the contention-based random access procedure actually works at an RRC connection state. Therefore, the existing random access procedure may be optimized, so that the optimized random access procedure may be more applicable to the schedule request scenario in the connection state. Further, in the Radio Access (NR), there may be some other application scenarios, that may need the contention-based random access in the RRC connection state. The some other application scenarios may include a beam request or a beam recovery procedure when the carrier frequency is larger than 6 GHz. Therefore, in the NR standardization, it is necessary to provide an optimized UL schedule request mode for the user in the connection state.

In the traditional LTE network, when the network transmits the information of the second step in the random access, i.e. when the network transmits the random access response, a Random Access-Radio Network Temporary Identifier (RA-RNTI) is needed to scramble the RAR information. Meanwhile, the user side may use the same mode to generate the RA-RNTI to descramble the RAR and detect the random access response. At present, the RA-RNTI is calculated using random access time-frequency resource locations bearing the random access preamble. Therefore, the users, which transmit the preamble on the same random access time-frequency resource, may generate the same RA-RNTI.

In the standard research of 5G, a downlink transmission beam is bound to available random access resources (random access channel resources and/or random access preamble code resources), so that the base station (BS) can acquire the available downlink transmission beams selected by the UE through the detected preamble codes from the user equipment (UE) and/or the time-frequency resources where the detected preamble codes are located. However, in general, the downlink transmission beam used by Synchronization signal block (SS-block) is a wide beam. When the UE accesses the system after passing through the random access process, it is necessary to continue beam management or beam correction operation to obtain a better (narrower) beam, so as to obtain higher beamforming gain; in another case, the BS detects that there is a better beam available to the UE in the connected state due to a change in movement or environment. Therefore, the UE is notified of changing a new beam. At this time, the timing advance (TA) value of the UE is possible to change due to the change or adjustment of the beam. Therefore, the UE needs to be notified of a new TA or TA adjustment.

In addition, when the UE needs to adjust or change the used transmission beam, the timing information will be changed. The BS needs to measure and calculate the new timing information and notify the UE. Since the change of the timing information is related to the beam adjustment change, how to notify the UE of the new timing information becomes a key problem to be solved.

Compared with the existing LTE systems, 5G will introduce systems which operate in high bands, in order to improve the data transmission efficiency and spectrum efficiency of the systems. The introduction of high bands significantly increases the available bandwidth for wireless communication, so that the systems can support a larger subcarrier interval. The increase in the subcarrier interval shortens the time-domain symbols, so the supportable cell radius becomes smaller.

Timing Advance (TA) is used for instructing a terminal to transmit in advance uplink data before a downlink reference timing sequence, to make up different transmission delays for different terminals due to different transmission paths, so that uplink data transmitted by different terminals can arrive at a base station at the same time for the purpose of uplink synchronization. The effect of the TA is described simply in FIG. 42. In FIG. 42, the first transmitted data represents data transmission performed by a terminal on the basis of downlink synchronization. However, due to factors such as delay, the uplink data received by a base station may be shown in the second picture. That is, the received data is delayed with respect to the downlink reference timing sequence. This delay will lead to a Cyclic Prefix (CP) in an OFDM detection window, and consequently, the detection is disturbed. To avoid this problem, the base station configures a TA for the terminal, and the terminal transmits, according to the TA, data in advance on the basis of the downlink synchronization reference timing sequence. This process is shown in the third picture in FIG. 42. With the use of the TA, it is able to ensure that data can fall into the OFDM detection window even if it is delayed, as shown in the fourth picture in FIG. 42. The size of the TA is mainly determined by the supportable cell radius. In LTE, an initial TA is configured in a random access response during a random access process, and this configuration information is in uniform form of 11-bit configuration information. This configuration will not change with the change in the supported cell radius or subcarrier interval. The terminal adjusts the timing sequence of Msg3 according to the TA, and transmits the Msg3. Meanwhile, during the data transmission, it is also necessary to adjust the TA according to the change of channel state. This TA adjustment amount is 6-bit information.

In 5G, due to the high bands and the change in the subcarrier interval, the supported cell radius changes to kilometers from tens of meters and thus the effective range of the TA also significantly changes. Moreover, due to the shortened symbol length caused by the increase in the subcarrier interval, the dynamic range of the TA is reduced. The use of TA configuration information of the same bit number and the same resolution will cause the waste of bits for TA configuration, and as a result, the running efficiency of the system is decreased. Therefore, in view of this problem, it is necessary to design a corresponding TA configuration method by which TA configuration for systems with different subcarrier interval can be completed in the premise of saving the signaling overhead.

The present disclosure provides a random access method, a network node and a user equipment (UE).

According to an aspect of the present disclosure, there is provided a random access method comprising the steps of: measuring, by a user equipment UE, a signal of a target cell; sending, by the UE, a measurement report on the signal of the target cell to a network node corresponding to a serving cell; receiving, by the UE, a handover command including resource configuration information for random access from the network node; and performing, by the UE, random access to the target cell based on the resource configuration information.

In an exemplary embodiment, the resource configuration information includes at least one of: random access resource configuration information based on a normal uplink; and random access resource configuration information based on a supplementary uplink.

In an example embodiment, the resource configuration information further includes an indication indicating to the UE whether to use the normal uplink or the supplementary uplink for the random access.

In an exemplary embodiment, the resource configuration information further includes dedicated random access resource configuration information sent to the UE.

In an exemplary embodiment, the dedicated random access resource configuration information includes a first threshold for the UE to determine whether to use the normal uplink or the supplementary uplink for the random access.

In an exemplary embodiment, the UE obtains the measurement report by measuring a synchronization signal block SSB or a configured channel status information-reference signal CSI-RS of the target cell, and the resource configuration information further includes: a mapping relationship between the SSB and a corresponding random access resource or a mapping relationship between the CSI-RS and a corresponding random access resource; and a second threshold for selecting the SSB or the CSI-RS.

In an exemplary embodiment, the UE obtains the measurement report by measuring a synchronization signal block SSB or a configured channel status information-reference signal CSI-RS of the target cell, and the dedicated random access resource configuration information includes: a mapping relationship between the SSB and a corresponding random access resource or a mapping relationship between the CSI-RS and a corresponding random access resource; and a second threshold for selecting the SSB or the CSI-RS.

In an exemplary embodiment, the method further includes the steps of: comparing, by the UE, a latest signal measurement result of the target cell with the first threshold; and determining whether to use the normal uplink or the supplementary uplink for the random access according to the comparison result.

According to another aspect of the present disclosure, there is provided a random access method comprising the steps of: receiving, from a user equipment UE, a measurement report on a signal of a target cell; and sending, to the UE, a handover command including resource configuration information for random access, based on the measurement report.

In an exemplary embodiment, the resource configuration information includes at least one of: random access resource configuration information based on a normal uplink; and random access resource configuration information based on a supplementary uplink.

In an example embodiment, the resource configuration information further includes an indication indicating to the UE whether to use the normal uplink or the supplementary uplink for random access.

In an exemplary embodiment, the resource configuration information further includes dedicated random access resource configuration information sent to the UE.

In an exemplary embodiment, the dedicated random access resource configuration information includes a first threshold for the UE to determine whether to use a normal uplink or a supplementary uplink for the random access.

In an exemplary embodiment, the measurement report is obtained by the UE by measuring a synchronization signal block SSB or a configured channel status information-reference signal CSI-RS of the target cell, and the resource configuration information further includes: a mapping relationship between the SSB and a corresponding random access resource or a mapping relationship between the CSI-RS and a corresponding random access resource; and a second threshold for selecting the SSB or the CSI-RS.

In an exemplary embodiment, the measurement report is obtained by the UE by measuring a synchronization signal block SSB or a configured channel status information-reference signal CSI-RS of the target cell, and the dedicated random access resource configuration information includes: a mapping relationship between the SSB and a corresponding random access resource or a mapping relationship between the CSI-RS and a corresponding random access resource; and a second threshold for selecting the SSB or the CSI-RS.

According to another aspect of the present disclosure, there is provided a user equipment, comprising: a communication interface configured to communicate; a processor; and a memory storing computer-executable instructions that, when executed by the processor, cause the processor to perform the following operations: measuring a signal of a target cell; sending a measurement report on the signal of the target cell to a network node corresponding to a serving cell; receiving, from the network node, a handover command including resource configuration information for random access; and performing random access to the target cell based on the resource configuration information.

According to another aspect of the present disclosure, there is provided a network node, comprising: a communication interface configured to communicate; a processor; and a memory storing computer-executable instructions that, when executed by the processor, cause the processor to perform the following operations: receiving, from a user equipment UE, a measurement report on a signal of a target cell; and sending, to the UE, a handover command including resource configuration information for random access, based on the measurement report.

Through the solutions of the above embodiments of the present disclosure, the performance of the UE randomly accessing the target cell can be improved.

Embodiments of the present disclosure provide information generation methods, which may distinguish users who have selected different DL transmission beams and may improve detection efficiency of the RAR.

In order to achieve the above objective, embodiments of the present disclosure may adopt following technical schemes:

An information generation method, includes:
sending, by a User Equipment (UE), a random access preamble to a base station;
calculating, by the UE, a Random Access-Radio Network Temporary Identifier (RA-RNTI) according to an index of a preamble group, to which the transmitted random access preamble belongs, and a resource location of a random access resource bearing the random access preamble;
wherein the preamble group is a group of available random access preambles corresponding to the random access resource.

Preferably, the random access resource is determined according to a Downlink (DL) transmission beam, which is selected by the UE according to DL measurement;
the transmitted random access preamble is selected from a preamble group, which corresponds to the random access resource and is bound with the DL transmission beam selected by the UE based on the DL measurement.

Preferably, the random access resource is determined according to a physical broadcast signal or a synchronization signal block, which is selected by the UE according to DL measurement;
the transmitted random access preamble is selected from a preamble group, which corresponds to the random access resource and is bound with physical broadcast signal or synchronization signal block selected by the UE based on the DL measurement.

Preferably, when there is an one-to-one binding relationship between each different preamble group and each different DL transmission beam, the index of the preamble group is an index of the selected DL transmission beam.

Preferably, the preamble group is determined according to a preamble root sequence group, to which a preamble root sequence used by the random access preamble belongs, and random access preambles determined using preamble root sequences of a same group belong to a same preamble group;
the index of the preamble is an index of a root sequence group, at which the preamble root sequence of the random access preamble is located.

Preferably, the preamble group is determined according to an Orthogonal Cover Code (OCC) group, to which an OCC used by the available random access preamble belongs, and random access preambles determined using OCCs of a same group belong to a same preamble group;

the index of the preamble group is an index of an OCC group, at which an OCC used to generate the random access preamble is located.

Preferably, the preamble group is determined according to a Cyclic Shift (CS) group, to which a CS value used by the random access preamble belongs, and random access preambles determined using CSs of a same group belong to a same preamble group;

the index of the preamble group is an index of a CS group, at which a CS value used to generate the random access preamble is located.

Preferably, the preamble group is determined according to the random access preamble, and each random access preamble is a preamble group;

the index of the preamble group is a random access preamble index.

Preferably, calculating the RA-RNTI according to the index of the preamble group and the resource location of random access resource bearing the random access preamble includes:

with regard to the random access resource bearing the transmitted random access preamble, calculating the RA-RNTI according to index information t_id of a time unit, at which a starting location of the random access resource is located, index information f_id of a frequency unit, at which a starting location of the random access resource is located, and an index pg_id of the preamble group, RA-RNTI=1+a*t_id+b*f_id+c*pg_id, a, b, and c are weight coefficients of preset t_id, f_id and pg_id.

Preferably, when different random access resources do not have differences on time domain, the t_id is set as 0 when calculating the RA-RNTI; and/or when the random access resources do not have differences on a frequency domain, the f_id is set as 0 when calculating the RA-RNTI.

Preferably, calculating the RA-RNTI according to the index of the preamble group, and the resource location of random access resource bearing the random access preamble includes:

with regard to the random access resource bearing the transmitted random access preamble, calculating the RA-RNTI according to an index SFN_id of a first first-time-unit, at which the random access resource is located, index information t_id of a first second-time-unit in the first first-time-unit, at which the random access resource is located, index information f_id of a first frequency domain unit, at which the random access resource is located, and an index pg_id of the preamble group, RA-RNTI=1+a*t_id+b*f_id+c*(SFN_id mod (Wmax/10))+d*pg_id, a, b, c and d respectively are weight coefficients of the t_id, f_id, (SFN_id mod (Wmax/10)) and pg_id, Wmax is maximum window a possible random access response window of a user.

Preferably, a=1, b=max{1+a*t_id}=M+1, c=max{1+a*t_id+b*f_id}=(max{t_id}+1)(max{f_id}+1).

Preferably, index information t_id of a time unit/a second time unit includes: an index value of the time unit/second time unit, or the t_id is determined according to index values of multiple time units, at which the random access resource is located; and/or index information f_id of a frequency unit includes: an index value of the frequency unit, or the f_id is determined according to index values of multiple frequency units, at which the random access resource is located.

Preferably, an index value of the time unit/second time unit includes: a sub-frame index, time slot index, small time slot index, symbol group index, or symbol index; and/or the index values of the multiple time units include: multiple of the sub-frame index, time slot index, small time slot index, symbol group index, and symbol index; and/or the first time unit is a radio frame; and/or an index of the frequency unit includes: a Physical Resource Block (PRB) group index, PRB index, subcarrier index or subcarrier group index; and/or index values of the multiple frequency units include: multiple of the PRB group index, PRB index, subcarrier index and subcarrier group index.

Preferably, calculating the RA-RNTI according to the index of the preamble group, and the resource location of random access resource bearing the random access preamble includes:

with regard to the random access resource bearing the transmitted random access preamble, calculating the RA-RNTI according to an index SFN_id of a first time unit, at which the random access resource is located, and an index pg_id of the preamble group, RA-RNTI=1+a*floor (SFN_id/4)+b*pg_id, a and b respectively are weight coefficients of floor (SFN_id/4) and pg_id, value of floor(x) is the maximum integer less than x.

Preferably, a=1, b=max{1+a*floor (SFN_id/4)}=floor (SFN_id/4)+1.

An information generation method, includes:

receiving, by a base station, a random access preamble from a User Equipment (UE);

calculating, by the base station, a Random Access-Radio Network Temporary Identifier (RA-RNTI) according to an index of a preamble group, to which the received random access preamble belongs, and a resource location of a random access resource bearing the random access preamble;

wherein the preamble group is a group of available random access preambles corresponding to the random access resource.

An information generation device, includes: a transmitting unit and a calculating unit; wherein the transmitting unit is to send a random access preamble to a base station;

the calculating unit is to calculate a Random Access-Radio Network Temporary Identifier (RA-RNTI) according to an index of a preamble group, to which the transmitted random access preamble belongs, and a resource location of a random access resource bearing the random access preamble; wherein the preamble group is a group of available random access preambles corresponding to the random access resource.

An information generation device, includes: a receiving unit and a calculating unit; wherein the receiving unit is to receiving a random access preamble from a User Equipment (UE);

the calculating unit is to calculate a Random Access-Radio Network Temporary Identifier (RA-RNTI) according to an index of a preamble group, to which the received random access preamble belongs, and a resource location of a random access resource bearing the random access preamble;

wherein the preamble group is a group of available random access preambles corresponding to the random access resource.

It can be seen from the above technical scheme that in embodiments of the present disclosure, with regard to a random access resource, multiple available random access preambles may be grouped to obtain preamble groups; the Random Access-Radio Network Temporary Identifier (RA-RNTI) may be calculated according to an index of a preamble group, to which a random access preamble transmitted by a User Equipment (UE) belongs, and a resource location of a random access resource bearing the random access preamble. With embodiments of the present disclosure, users which have selected different DL transmission beams may be distinguished and different users using the same random access resource may be distinguished, so that detection efficiency of random access response may be improved.

The present disclosure provides a way of reporting information. In the existing millimeter-wave system, there is no suitable signaling and flow for the UE to notify the base station of the beam-numbers capability of itself, which results in a relatively low resource utilization and an operation efficiency for operations such as resource allocation, beam management and beam correction in the existing multi-beam operating system. Therefore, there is a need for a new signaling and flow for notify the beam-numbers capability of the UE, in order to improve system work efficiency and resource utilization.

The present disclosure provides a way of reporting information, and specifically provides a way of indicating a capability of a UE's beam-numbers, and the capability of the UE's beam-numbers refers to a number of beams that the UE has for an uplink transmission/downlink reception. Specifically, in the random access procedure, the base station is notified the number of beams that the UE has by the transmission of the Message 3 or the selection of the random access resources. When the UE completes the random access procedure, the base station can know the number of beams that the UE has.

According to an aspect of the present disclosure, a method for random access of a UE is provided, the method comprises: obtaining random access configuration information; determining a preamble sequence and a random access channel according to the random access configuration information, and transmitting the preamble sequence on the random access channel; detecting a random access response after transmitting the preamble sequence; generating a Message 3 if the random access response is successfully detected, wherein the Message 3 comprises an indication of a number of beams that the UE has; and detecting contention resolution information.

Wherein the indication of the number of beams may be N-bit indication information, where N is greater than 0, and wherein the indication of the number of beams may be determined according to a maximum number of beams that the UE has or an maximum number of beams that can be processed by the base station.

Wherein the indication of the number of beams may be added directly into the Message 3 or added into a radio resource control (RRC) connection request in the Message 3, in a form of a new field.

The UE may detect a CSI-RS or SRS configured from the base station, and the CSI-RS or SRS is configured by the base station for the UE according to the indication of the number of beams reported by the UE.

According to an aspect of the present disclosure, an apparatus for random access of a UE is provided, the apparatus comprises: a configuration information obtaining module for obtaining random access configuration information; a preamble sequence transmitting module for determining a preamble sequence and a random access channel according to the random access configuration information, and transmitting the preamble sequence on the random access channel; a random access response detection module for detecting a random access response transmitted by a base station; a Message 3 generating and transmitting module for generating and transmitting a Message 3 according to the detected random access response and an indication of a number of beams that the UE has, wherein the Message 3 includes the indication of the number of beams that the UE has; and a contention resolution receiving module for detecting contention resolution information.

Wherein the indication of the number of beams may be N-bit indication information, where N is greater than 0, and wherein the indication of the number of beams may be determined according to the maximum number of beams that the UE has or the maximum number of beams that can be processed by the base station.

Wherein the indication of the number of beams may be added directly into the Message 3 or added into a radio resource control (RRC) connection request in the Message 3, in a form of a new field.

The UE may detect a CSI-RS or SRS configured from the base station, and the CSI-RS or SRS is configured by the base station for the UE according to the indication of the number of beams reported by the UE.

According to an aspect of the present disclosure, an apparatus for random access of a base station is provided, the apparatus comprises: a random access resource configuration transmitting module for transmitting random access resource configuration information comprising a configured random access channel resource and a preamble sequence resource; a preamble sequence detection module for detecting a possibly transmitted preamble sequence on a random access channel according to the random access configuration information; a random access response transmitting module for generating and transmitting a random access response for the detected preamble sequence; a Message 3 detection module for detecting a possible Message 3 transmission, wherein the Message 3 includes an indication of a number of beams that the UE has; and a contention resolution transmitting module for generating and transmitting contention resolution information if the Message 3 is successfully detected.

Wherein the contention solution transmitting module may further transmits the CSI-RSs or SRSs configured for the UE, and wherein the number of the CSI-RSs or SRSs configured by the base station may be determined according to an indication of the number of beams of the UE that the UE reports in the Message 3.

According to an aspect of the present disclosure, a method for random access of a UE is provided, the method comprises: obtaining random access configuration information; selecting a corresponding random access resource according to a number of beams that the UE has; generating and transmitting a preamble sequence according to a selected random access resource; detecting a random access response; generating and transmitting a Message 3 if the random access response is successfully detected; detecting a contention resolution message.

Wherein the random access configuration information may include random access channel time-frequency resources allocated to different numbers of beams or preamble sequence resource pool information allocated to different numbers of beams, and wherein the selecting the random access resource may comprises selecting the random access channel time-frequency resource corresponding to the number of beams that the UE has or selecting the preamble sequence resource corresponding to the number of beams that the UE has.

Wherein, the random access channel time-frequency resources may be divided into non-overlapping M subsets, each subset corresponds to one of the beam-numbers, wherein the M non-overlapping subsets correspond to 0 to M−1 beams respectively. When the number of beams of the UE is between 0 and M−2, the time-frequency resource corresponding to the number of the beams is selected directly, and when the number of the beams of the UE is M−1 or more, the time-frequency resource corresponding to the number of beams M−1 is selected.

The preamble sequence pool may be divided into M disjoint subsets, each subset corresponds to one of the beam-numbers, and the UE selects a preamble sequence from among the preamble sequence subset corresponding to its own number of beams according to the number of beams and transmits the selected preamble sequence on the random access channel.

Wherein, the UE may transmit the preamble sequence using a plurality of different beam directions on a plurality of different random access channels.

According to an aspect of the present disclosure, an apparatus for random access of a UE is provided, the apparatus comprising: a configuration information obtaining module for obtaining random access configuration information; a random access resource selection module for selecting a corresponding random access resource according to a number of beams that the UE has; a preamble sequence transmitting module for generating and transmitting a preamble sequence according to the selected random access resource; a random access response detection module for detecting a random access response transmitted by a base station; a Message 3 generating and transmitting module for generating and transmitting a Message 3 according to the detected random access response and the indication of the number of beams that the UE has; and a contention resolution receiving module for receiving contention resolution information.

Wherein the random access configuration information may include random access channel time-frequency resources allocated to UEs having different numbers of the beams or preamble sequence resource pool information allocated to UEs having the numbers of beams, and wherein the selected random access resource may include the random access channel time-frequency resource suitable for the number of beams that the UE has or the preamble sequence resource suitable for the number of beams that the UE has.

Wherein the random access channel time-frequency resources may be divided into M non-overlapping subsets, each subset corresponds to one of beam-numbers, where the M non-overlapping subsets correspond to 0 to M−1 beams respectively, when the number of beams that the UE has is between 0 and M−2, the time-frequency resource corresponding to the number of the beams is selected directly, and when the number of beams that the UE has is M−1 or more, the time-frequency resource corresponding to the number of beams M−1 are selected.

Wherein the preamble sequence pool may be divided into M disjoint subsets, each of the subsets corresponds to a value indicated by one of beam-numbers, and the preamble sequence is selected from the preamble sequence subset corresponding to the number of beams that the UE has, according to the number of beams that the UE has, and the selected preamble sequence is transmitted on the random access channel.

Wherein the preamble sequence may be transmitted using a plurality of different beam directions on a plurality of different random access channels.

According to an aspect of the present disclosure, a method for random access of a base station is provided, the method comprises: allocating random access resources to UEs having different numbers of beams, wherein the random access resources include different random access channel time-frequency resources or different preamble sequence resources, and notifying the UEs of them; detecting transmission of a preamble sequence from a UE; determining the number of beams corresponding to the random access channel time-frequency resource or the preamble sequence used by the UE, according to the preamble sequence subset to which the detected preamble sequence from the UE belongs; generating and transmitting a random access response for the detected preamble sequence; detecting transmission of a Message 3; and generating and transmitting a contention resolution message.

Wherein random access channel time-frequency resources of the UEs may be allocated by dividing the random access channel time-frequency resources into M non-overlapping subsets, each subset corresponds to one of the beam-numbers, wherein M subsets correspond to 0 to M−1 beams respectively.

Wherein the preamble sequences of the UEs may be allocated by dividing a preamble sequence pool into M disjoint subsets, each subset corresponds to one of the numbers of beams, and the UEs are notified of an index range of possible preamble sequences in each preamble sequence subset by one of the following ways: way 1: indicating a starting preamble sequence index of the first preamble sequence subset and the number of preamble sequences in each preamble sequence subset; way 2: indicating a starting preamble sequence index of each preamble sequence subset and a total number of the preamble sequences; way 3: indicating the starting preamble sequence index of the first preamble sequence subset and the last preamble sequence index of each preamble sequence subset; way 4: indicating the starting preamble sequence index of each preamble sequence subset and the number of the preamble sequences of each preamble sequence subset; way 5: indicating the starting preamble sequence index and the last preamble sequence index of each preamble sequence subset; and way 6: indicating a first sequence index in a basic sequence resource pool, a number of the sequences in the basic sequence resource pool, and the index range of available covering codes, wherein the preamble sequence subset of the UE is formed as follows: for the M subsets, M covering codes and one basic sequence resource pool are defined or preset, and the mth preamble sequence subset consists of the basic sequence resource pool and the mth covering code.

The base station may configure the CSI-RS or SRS corresponding to the determined number of the beams for the UE according to the determined number of the beams and transmit the configured CSI-RS or SRS to the UE.

Compared with the prior art, with the method provided by the present disclosure, a base station can learn the number of beams that a UE has when the base station accesses the UE, and therefore, in the subsequent operation, the number of beams that the UE has can be used to improve the system operating efficiency. For example, the base station can more effectively allocate SRS, CSI-RS or other time-frequency resources for the UE in a multi-beam operation, and perform operations such as beam management and beam direction correction more effectively. Through interaction between base stations, the base stations can more effectively complete cell handover and other processes.

According to one aspect, an embodiment of the present invention provides a method for notifying information, which is executed by a base station (BS), comprising:

receiving an uplink signal transmitted by a user equipment (UE);

determining the uplink beam to be used by the UE and/or the timing advance (TA) information corresponding to the uplink beam to be used by the UE according to the uplink signal; and transmitting beam indication information and/or the TA information to the UE, wherein, the beam indication information indicates the uplink beam to be used by the UE.

According to another aspect, an embodiment of the present invention further provides another method for notifying information, which is executed by a user equipment (UE), comprising:

transmitting an uplink signal to a base station (BS);

receiving the beam indication information and/or the timing advance (TA) information transmitted by the BS, and determining the uplink beam to be used and/or TA information corresponding to the uplink beam to be used according to the beam indication information and/or the TA information;

transmitting the uplink signal to the BS by using the determined uplink beam to be used and/or the determined TA information corresponding to the determined uplink beam to be used.

According to another aspect, an embodiment of the present invention provides a base station, including:

a first receiving module configured to receive an uplink signal transmitted by a user equipment (UE);

a first determining module configured to determine the uplink beam to be used by the UE and/or the timing advance (TA) information corresponding to the uplink beam to be used by the UE according to the uplink signal received by the first receiving module; and a first transmitting module configured to transmit the beam indication information and/or the TA information determined by the first determining module to the UE, wherein, the beam indication information indicates the uplink beam to be used by the UE.

According to another aspect, an embodiment of the present invention provides a user equipment, including:

a second transmitting module configured to transmit an uplink signal to the base station (BS);

a second receiving module configured to receive the beam indication information and/or the timing advance (TA) information transmitted by the BS;

a second determining module configured to determine the uplink beam to be used and/or the TA information corresponding to the uplink beam to be used according to the beam indication information and/or the TA information received by the second receiving module;

the second transmitting module is further configured to transmit the uplink signal to the BS by using the determined uplink beam to be used and/or the determined TA information corresponding to the determined uplink beam to be used determined by the second determining module.

The present invention provides a UE, a BS and a method for notifying information notification. Compared with the prior art, the UE in the present invention transmits an uplink signal to the BS, and the BS can determine an uplink beam to be used by the UE and/or TA information corresponding to the uplink beam to be used according to the uplink signal, and transmit the beam indication information carrying the uplink beam to be used and/or the TA information corresponding to the uplink beam to be used to the UE so that the UE can transmit the uplink signal according to the uplink beam and/or the corresponding TA information (i.e. the uplink beam corresponding to the UE which can be determined by the BS and/or the TA information changed as the uplink beam changes), and can notify the UE of the determined uplink beam and/or the corresponding TA information, so that the UE can be notified of a new TA information.

The present invention provides a method and device for acquiring configuration of timing advance, and a method and device for configuring timing advance. The configuration of initial Timing Advance (TA) information with a fixed number of bits is used, but the granularity is determined by the format of the random access preamble. That is, the granularity for the TA configuration is associated with the cell radius determined by the format of the random access preamble. Meanwhile, during the subsequent data transmission, the granularity for the TA information adjustment amount is determined according to the used subcarrier interval.

The present invention provides a method for acquiring configuration of timing advance, comprising steps of:

acquiring random access configuration information and transmitting a random access preamble according to the random access configuration information;

detecting a random access response and acquiring first timing advance configuration information carried in the random access response; and determining second timing advance configuration information according to the random access configuration information and/or the first timing advance configuration information, and determining timing advance according to the second timing advance configuration information.

Preferably, random access preamble configuration information is carried in the random access configuration information, and the determining second timing advance configuration information according to the random access configuration information and/or the first timing advance configuration information comprises steps of:

determining timing advance interval configuration information according to the random access preamble configuration information; and determining second timing advance configuration information according to the timing advance interval configuration information and/or the first timing advance configuration information.

Preferably, timing advance interval configuration information is determined according to the random access preamble configuration information, wherein the random access preamble configuration information and the timing advance interval configuration information satisfy a predetermined mapping rule.

Preferably, the step of determining the second timing advance configuration information according to the random access configuration information and/or the first timing advance configuration information comprises steps of:

preconfiguring a mapping rule between reference random access preamble configuration information and timing advance interval configuration information, and determining the timing advance interval configuration information according to a proportional relation between the random access preamble configuration information and the reference random access preamble configuration information and the mapping rule; and the random access preamble configuration information is random access preamble subcarrier interval information.

Preferably, random access preamble configuration information is carried in the random access configuration information, and the determining second timing advance configuration information according to the random access configuration information and/or the first timing advance configuration information comprises steps of:

determining timing advance configuration bit length information according to the random access preamble configuration information; and determining second timing advance configuration information according to the timing advance configuration bit length information and/or the first timing advance configuration information.

Preferably, the timing advance configuration bit length information is determined according to the random access preamble configuration information, wherein the random access preamble configuration information and the timing advance configuration bit length information satisfy a predetermined mapping rule.

Preferably, the random access preamble configuration information is specifically random access preamble format information and/or random access preamble subcarrier interval information.

Preferably, first index information is carried in the random access configuration information, and the determining second timing advance configuration information according to the random access configuration information and/or the first timing advance configuration information comprises steps of:

acquiring timing advance interval configuration information corresponding to the first index information according to the first index information; and determining second timing advance configuration information according to the timing advance interval configuration information and/or the first timing advance configuration information.

Preferably, the second index information is carried in the random access configuration information, and the determining second timing advance configuration information according to the random access configuration information and/or the first timing advance configuration information comprises steps of:

acquiring timing advance configuration bit length information corresponding to the second index information according to the second index information; and determining second timing advance configuration information according to the timing advance configuration bit length information and/or the first timing advance configuration information.

Preferably, the step of determining timing advance according to the second timing advance configuration information comprises a step of:

determining timing advance according to the first timing advance configuration information, the determined timing advance configuration bit length information, and the timing advance interval configuration information determined according to the random access configuration information.

Preferably, the method further comprises steps of:

receiving timing advance adjustment indication information transmitted by a base station;

determining timing advance adjustment amount configuration information according to the timing advance adjustment indication information and preconfigured uplink data transmission subcarrier spacing information;

determining timing advance adjustment amount information according to the uplink data transmission subcarrier spacing information and the determined timing advance adjustment amount configuration information; and wherein the preconfigured uplink data transmission subcarrier spacing information is specifically uplink data transmission subcarrier spacing information preconfigured by a terminal or received uplink data transmission subcarrier spacing information which is preconfigured and then transmitted by a base station.

Preferably, the step of determining timing advance adjustment amount information according to the uplink data transmission subcarrier spacing information and the timing advance adjustment amount configuration information specifically comprises steps of:

inquiring a third associative mapping list according to the uplink data transmission subcarrier spacing information to acquire timing advance adjustment amount interval information corresponding to the uplink data transmission subcarrier spacing information in the third associative mapping list; and determining timing advance adjustment amount information according to the timing advance adjustment amount interval information and the timing advance adjustment amount configuration information.

Preferably, the method further comprises steps of:

determining the adjusted timing advance according to the timing advance adjustment amount information and the determined timing advance;

Preferably, the process in the random access process is specifically the process in the contention-free random access process.

Preferably, the method further comprises steps of:

Msg3 is transmitted according to uplink authorization information carried in the random access response and the determined timing advance.

The present invention provides a method for configuring timing advance, comprising steps of:

transmitting random access configuration information to a terminal;

receiving a random access preamble transmitted by the terminal according to the random access configuration information; and performing random access according to the random access preamble, and transmitting a random access response carrying first timing advance configuration information so that the terminal determines timing advance according to the first timing advance configuration information and/or the random access configuration information.

Preferably, the method further comprises steps of:

First index information is carried in the random access configuration information so that the terminal acquires corresponding timing advance interval configuration information according to the first index information.

Preferably, the method further comprises steps of:

Second index information is carried in the random access configuration information so that the terminal acquires corresponding timing advance configuration bit length information according to the second index information.

The present invention provides a device for acquiring configuration of timing advance, comprising:

a first processing unit configured to acquire random access configuration information and transmit a random access preamble according to the random access configuration information;

a second processing unit configured to detect a random access response and acquire first timing advance configuration information carried in the random access response; and a third processing unit configured to determine second timing advance configuration information according to the random access configuration information and/or the first timing advance configuration information, and determine timing advance according to the second timing advance configuration information.

The present invention provides a device for configuring timing advance, comprising:
a transmitting unit configured to transmit random access configuration information to a terminal;
a receiving unit configured to receive a random access preamble transmitted by the terminal according to the random access configuration information; and
a processing unit configured to perform random access according to the random access preamble, and transmit a random access response carrying first timing advance configuration information so that the terminal determines timing advance according to the first timing advance configuration information and/or the random access configuration information.

The present invention further provides a terminal apparatus comprising a memory and a first processor, wherein the memory is configured to store computer programs that, when executed by the first processor, implement steps of a method for acquiring configuration of timing advance as described above.

The present invention further provides a base station comprising a memory and a second processor, wherein the memory is configured to store computer programs that, when executed by the second processor, implement steps of a method for acquiring configuration of timing advance as described above.

Compared with the prior art, the present invention has, but is not limited to, the following technical effects: a signaling configured by TA information can more effectively notify TA information, and different cell radiuses and different subcarrier spacing information can be supported, so that the running efficiency of the system is improved.

According to this method, the user equipment UE measures a signal of a target cell and then the UE sends a measurement report on the signal of the target cell to a network node corresponding to a serving cell. The UE receives a handover command including resource configuration information for random access from the network node. The UE performs random access to the target cell based on the resource configuration information. With the solution of the above embodiment of the present disclosure, the performance of the UE randomly accessing the target cell can be improved.

BRIEF DESCRIPTION OF THE DRAWINGS

For a better understanding of the present invention, the present invention will be described in detail according to the following accompanying drawings, in which:

FIG. 24 shows a possible preamble sequence resource pool configuration and notification way.

FIG. 25 shows another possible preamble sequence resource pool configuration and notification way.

FIG. 27 shows the configuration of the preamble sequence using the covering code.

DETAILED DESCRIPTION

Figure 1:
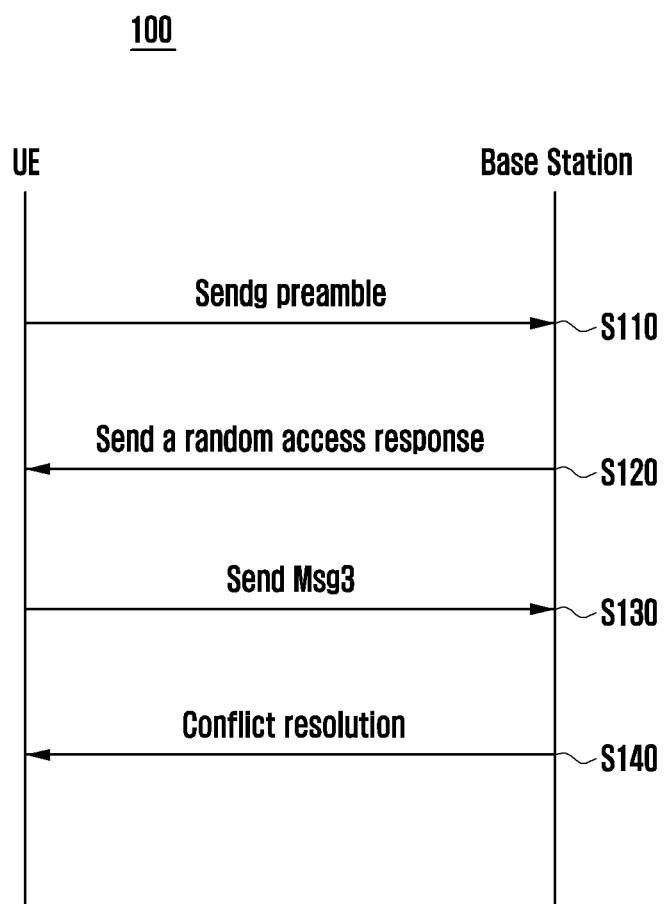
FIG. 1 illustrates a schematic flowchart of a process for contention-based random access.

In order to enable the objectives, technical solutions, and advantages of the present disclosure to be clearer, the present disclosure will be described below in further details with reference to the accompanying drawings. The embodiments described below with reference to the drawings are exemplary only for the purpose of illustration of the present disclosure and are not to be construed as limiting the present disclosure. With regard to description of drawings, similar elements may be marked by similar reference numerals. The terms of a singular form may include plural forms unless otherwise specified.

It should be understood by those skilled in the art that, unless otherwise defined, all terms (including technical and scientific terms) used herein have the same meaning as commonly understood by one of ordinary skill in the art to which this disclosure belongs. It will also be understood that terms, such as those defined in the general dictionary, should be interpreted as having a meaning that is consistent with their meaning in the context of the prior art, and will not be interpreted in an idealized or overly formal sense, unless specifically defined herein.

Embodiments of the present invention will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present invention and should not be regarded as any limitations thereto.

It should be understood by one person of ordinary skill in the art that singular forms "a", "an", "the", and "said" may be intended to include plural forms as well, unless otherwise stated. It should be further understood that terms "comprise/comprising" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it can be directly connected or coupled to other elements or provided with intervening elements therebetween. In addition, "connected to" or "coupled to" as used herein can comprise wireless connection or coupling. As used herein, the term "and/or" comprises all or any of one or more associated listed items or combinations thereof.

It should be understood by one person of ordinary skill in the art that, unless otherwise defined, all terms (including technical and scientific terms) used herein have the same meaning as commonly understood by one person of ordinary skill in the art to which the present invention belongs. It should be further understood that terms, such as those defined in commonly used dictionaries, should be interpreted as having a meaning that is consistent with their meanings in the context of the prior art and will not be interpreted in an idealized or overly formal sense unless expressly so defined herein.

FIG. 1 illustrates a schematic flowchart of a process 100 for contention-based random access in LTE-A. As shown in FIG. 1, in step S110, a User Equipment (UE) randomly selects one preamble from a preamble resource pool and sends the preamble to a base station. The base station performs correlation detection on the received signal to identify the preamble transmitted by the UE.

In step S120, the base station sends a random access response (RAR) to the UE, including a random access preamble identifier, a timing advance command determined according to the delay estimation between the UE and the base station, a temporary Cell-Radio Network Temporary Identifier (C-RNTI), and a time-frequency resource allocated for the next uplink transmission by the UE.

In step S130, the UE sends a Msg3 to the base station according to the information in the RAR. The Msg3 includes information such as a UE terminal identifier (such as S-TMSI, random number, etc.) and Radio Resource Control (RRC) connection request, wherein the UE terminal identifier is unique to the UE and is used to resolve the conflict.

In step S140, the base station sends to the UE a conflict resolution identifier, including a UE terminal identifier of the UE that wins in the conflict resolution. After detecting its own identifier, the UE upgrades the temporary C-RNTI to a C-RNTI and sends an Acknowledgment (ACK) signal to the base station to complete the random access process, and waits for the scheduling by the base station. Otherwise, the UE will start a new random access process after a time period of delay.

For the contention-free random access process, since the user identifier (C-RNTI in addition to the UE terminal identifier may be included) is known to the base station, the UE may be allocated a preamble. Therefore, the UE does not need to randomly select the preamble when sending the preamble, but may use the allocated preamble. After detecting the allocated preamble, the base station may send a corresponding random access response, including information such as timing advance and uplink resource allocation. After receiving the random access response, the UE considers that the uplink synchronization has been completed and waits for further scheduling by the base station. Therefore, the contention-free random access process only includes two steps: sending a preamble; and sending a random access response.

In LTE, the above-described six scenarios use the same random access procedure. In a new generation of communication system, there may be multiple uplinks (UL) that may provide random access channel resources. For the initially accessed UE, it may read the system message to obtain all the available random access channel resource information, and then select a random access resource from it. However, for the UE which is to be handed over, it may measure the signal strength of the target cell and feed it back to a serving cell before performing the hand-over random access. Based on the measurement report, a network node corresponding to the serving cell, such as a NodeB, sends a handover command including resource configuration information for random access to the UE. For example, whether to initiate a handover according to the measurement report is determined by the serving cell. If it is determined to initiate the handover, the UE needs to obtain corresponding random access channel resource configuration information, and when there are random access channel resources on multiple uplinks, the UE needs a way to obtain its own random access channel resources.

When multiple uplinks are available for the UE to perform random access in the communication system, for example, when both a primary cell (Pcell) and a secondary cell (Scell) exist, the base station may configure the uplink of which cell the UE uses for random access. On the other hand, in the communication system, a case where there may be multiple available uplinks is that there is a normal UL and a supplementary UL, and the latter is for UEs with poor channel conditions in a larger coverage area. Therefore, the UE does not necessarily select the uplink according to the indication from the base station. It is possible that the measurement report on the UE owned by the base station is not in time, so the most accurate uplink may not be selected for random access, which is not advantageous for the UE to realize fast handover.

In an embodiment of the present invention, a normal uplink may also be referred to as a first uplink, and a supplementary uplink may also be referred to as a second uplink.

The present disclosure provides a random access method, a network node, and a UE. When the UE performs the handover operation, it may measure the target cell first, and the measurement result is fed back to the serving cell. Based on the measurement report, a network node corresponding to the serving cell, such as a NodeB, sends a handover command including resource configuration information for random access to the UE. For example, the serving cell determines whether to perform handover based on the measurement report, and notifies the UE of the random access resource configuration information of the target cell, where the serving cell may directly determine the used uplink and its corresponding random access resource configuration information. Alternatively, the serving cell may notify the UE of all available uplinks and corresponding random access resource configuration information and a corresponding threshold for determination, and the UE determines the selected uplink and its corresponding random access resource configuration information. In addition, when there is a certain time interval from a time when the UE obtains the above resource configuration information to the UE actually starts to hand over the random access, the UE may use the latest measurement result to select the uplink and its corresponding random access resources. Therefore, the UE can select the most accurate uplink in time to perform random access.

Hereinafter, a random access method according to a first exemplary embodiment of the present disclosure will be described in detail with reference to FIG. 2.

Figure 2:
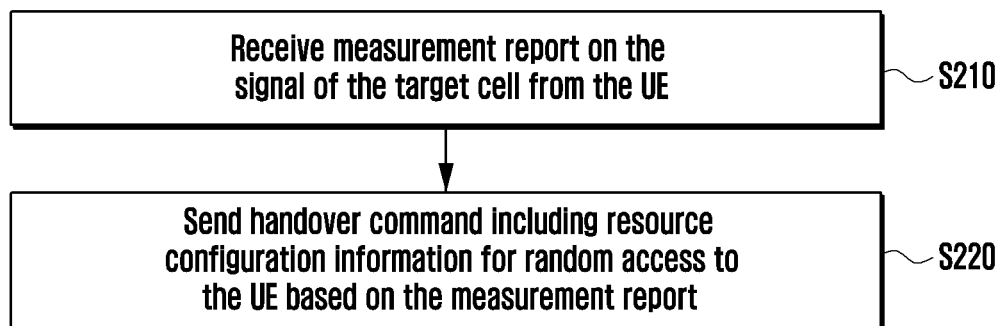
FIG. 2 illustrates a schematic flowchart of a random access method according to an exemplary embodiment of the present disclosure.

FIG. 2 illustrates a schematic flowchart of a random access method 200 according to a first exemplary embodiment of the present disclosure. As shown in FIG. 2, in step S210, a network node corresponding to a serving cell (hereinafter referred to as a "network node") receives a measurement report on a signal of a target cell from the UE. In some embodiments, the network node may be a base station, an eNB, a NodeB, a radio access network center control unit, a radio access network node distribution unit, or the like. The measurement report may include a Reference Signal Receiving Power (RSRP) of the target cell obtained by the UE measuring a Synchronization Signal Block (SSB) or a configured Channel Status Information-Reference Signal (CSI-RS) of the target cell. In addition, the measurement report may further include an SSB index or CSI-RS index to be fed back to the serving cell. Herein, the UE may determine one or more SSB indexes or CSI-RS indexes to be fed back to the serving cell by a threshold, threshold1, configured by the network node. In particular, for example, when the UE measures the SSB-based RSRP (SSB_rsrp), if the SSB_rsrp≥threshold1, the UE records the index of the SSB, and notifies the serving cell of the index. The UE may notify the serving cell of indexes of all M SSBs that satisfy the threshold. Alternatively, the UE may select N (N<M) SSBs from all M SSBs satisfying the threshold with equal probability, and notify the serving cell of the indexes thereof. The threshold1 used for the determination and the number N to be selected are notified to the UE by the network node. The case of using the CSI-RS is similar to that of the SSB, and details thereof are not described herein again.

In step S220, the network node sends a handover command including resource configuration information for random access to the UE based on the measurement report (e.g., RSRP of the target cell). For example, the network node determines whether the UE is handed over from the serving cell to the target cell. Specifically, the network node may determine whether the UE needs to perform handover by comparing the RSRP (RSRP_report) reported by the UE with a preset threshold (threshold_HO). For example, if RSRP_report>threshold_HO, it is determined that the UE needs to be handed over; and if RSRP_report≤threshold_HO, it is determined that the UE does not need to be handed over.

If it is determined that the UE needs to be handed over from the serving cell to the target cell, the network node sends to the UE a handover command including resource configuration information for random access. The handover command may be notified to the UE by radio resource control (RRC) signaling such as a Physical Downlink Shared Channel (PDSCH) or Downlink Control Information (DCI) (PDCCH).

In the handover command, the network node notifies the UE of resource configuration information for random access. When there are multiple types of uplinks that can perform random access to the target cell (that is, all the uplinks have random access resource configurations), take a normal uplink and a supplementary uplink in the target cell as an example, where the normal uplink is for UEs with better channel status conditions, and the supplementary uplink is for UEs with poor channel status conditions. When the UE reports the measured RSRP value, the UE does not know a threshold, threshold2, used by the target cell to determine whether to select the normal uplink or the supplementary uplink. Therefore, the UE cannot determine the configuration information of the random access resources to be used.

Thus, the resource configuration information notified to the UE by the network node according to an exemplary embodiment of the present disclosure may include at least one of:

1) Random access resource configuration information based on the normal uplink, which implicitly notifies the UE to perform random access using the normal uplink; and the UE obtains available random access time-frequency resource locations (including a bandwidth part indication (Bandwidth Part), random access channel resource configuration information) and available random access preamble resources (root sequence, cyclic shift value, number of available preambles, etc.) from the obtained random access resource configuration; and 2) Random access resource configuration information based on the supplementary uplink, which implicitly notifies the UE to perform random access using the supplementary uplink; and the UE obtains available random access time-frequency resource locations (including a bandwidth part indication (Bandwidth Part), random access channel resource configuration information) and available random access preamble resources (root sequence, cyclic shift value, number of available preambles, etc.) from the obtained random access resource configuration.

Additionally, the resource configuration information may further include one of the following:

3) An indication which indicates to the UE whether to use the normal uplink or the supplementary uplink for random access; and 4) The threshold2 for the UE to determine whether to use the normal uplink or the supplementary uplink for random access. In this case, the UE may determine whether to use the normal uplink for random access or use the supplementary uplink for random access by comparing the reported RSRP (RSRP_report) of the target cell with the threshold2. For example, if RSRP_report>threshold2, the UE chooses to use the normal uplink and determines the selected random access resource from the corresponding random access resource configuration information; and if RSRP_report≤threshold2, the UE chooses to use the supplementary uplink and determines the selected random access resource from the corresponding random access resource configuration information.

The above resource configuration information may be included in resource configuration information, which is configured by the target cell in system information thereof that may be used for the UE to perform the contention-based random access. That is, the above resource configuration information may be included in the resource configuration information sent by the network node to the UE for the contention-based random access. In addition, the above resource configuration information may be further included in dedicated random access resource (RACH-ConfigDedicated) configuration information that is additionally notified by the network node to the UE.

Therefore, if the UE is not configured with a dedicated random access resource, it selects a random access resource (a random access channel and a random access preamble) through the configured random access resource configuration information to initiate the contention-based random access. If the UE is configured with a dedicated random access resource, i.e., the UE is configured with a specific random access resource (a specific random access channel and/or a specific random access preamble), it uses the configured dedicated random access resource to initiate the random access. The threshold2 for determining whether to select a normal uplink or a supplementary uplink may be put in the dedicated random access resource (RACH-ConfigDedicated) configuration information as follows:

```
RACH-ConfigDedicated ::= SEQUENCE{
    ra-PreambleIndex INTEGER (0..63),
    ra-PRACH-MaskIndex INTEGER (0..15)
    ra-SUL-Threshold RSRP-value(threshold2)
}
```

After receiving the above resource configuration information from the network node, the UE may perform all random access uplink transmissions (msg1, msg3, and possibly msg3 retransmissions) within the configured or selected uplink.

Additionally, the handover command sent by the network node to the UE may further include: a mapping relationship between the SSB reported by the UE and the corresponding random access resource; or a mapping relationship between the CSI-RS reported by the UE and the corresponding random access resource. Thus, after the UE selects one SSB or CSI-RS, available random access resources may be found through the mapping relationship with the corresponding random access resource.

Figure 3:
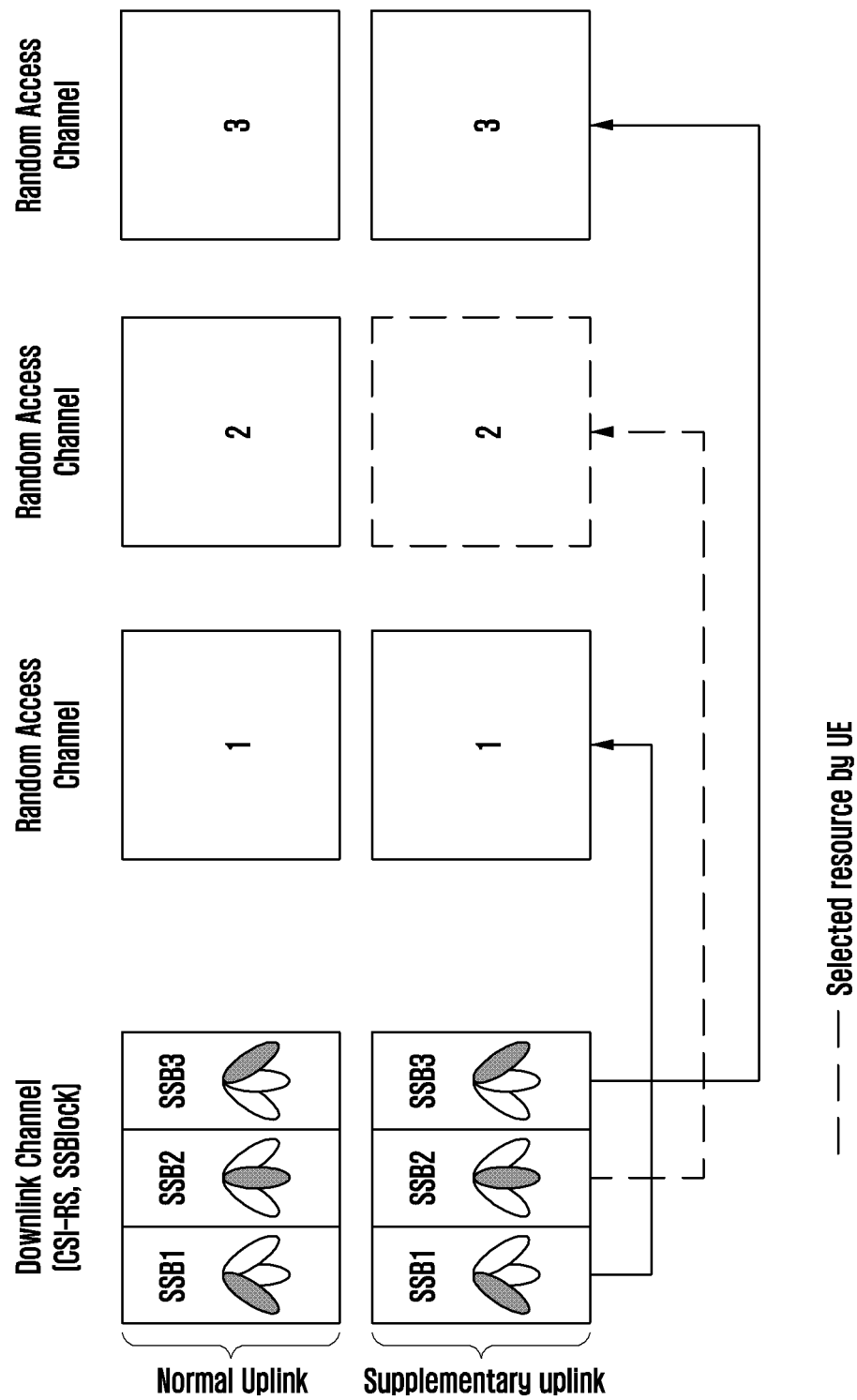
FIG. 3 illustrates a schematic diagram of selecting a random access channel by a UE according to an exemplary embodiment of the present disclosure.

FIG. 3 illustrates a schematic diagram of selecting a random access channel by a UE according to an exemplary embodiment of the present disclosure.

In FIG. 3, the UE has selected a supplementary uplink based on the detected RARP value. The UE may then acquire the random access channel resource to be used based on the handover command from the network node of the serving cell. The handover command may include a mapping relationship between the SSB reported by the UE and the corresponding random access resource. The handover command may further include a threshold, threshold3, for the UE to select a random access resource. When the UE reports a plurality of available SSBs to the network node, the UE may select an SSB greater than or equal to the threshold3 from the plurality of available SSBs before performing random access, and then find the corresponding random access channel resource through the selected SSB and the mapping relationship between the SSB and the random access channel. For example, the UE finds a corresponding random access channel resource (random access channel resource 2 as shown in FIG. 3) from a selected SSB (SSB2 as shown in FIG. 3) through a mapping relationship (for example, a one-to-one mapping) between the SSB notified by the network node of the serving cell and the random access channel. The random access channel resource may include available random access preamble resources, random access channels, time-frequency resources or the like. The threshold3 may be notified to the UE in the random access channel resource configuration, or may be notified to the UE through a UE-dedicated random access configuration.

Afterwards, the UE obtains a determined random access preamble from the dedicated random access resource indication, so as to determine the random access resource. It should be noted that, although a one-to-one mapping is taken as an example herein, the mapping relationship between the SSB and the random access channel is not limited to this, and may be a one-to-multiple mapping or a multiple-to-one mapping. The case of using the CSI-RS is similar to that of the SSB, and details thereof are not described herein again.

Hereinafter, a method for performing random access at a UE according to a second exemplary embodiment of the present disclosure will be described in detail with reference to FIG. 4.

Figure 4:
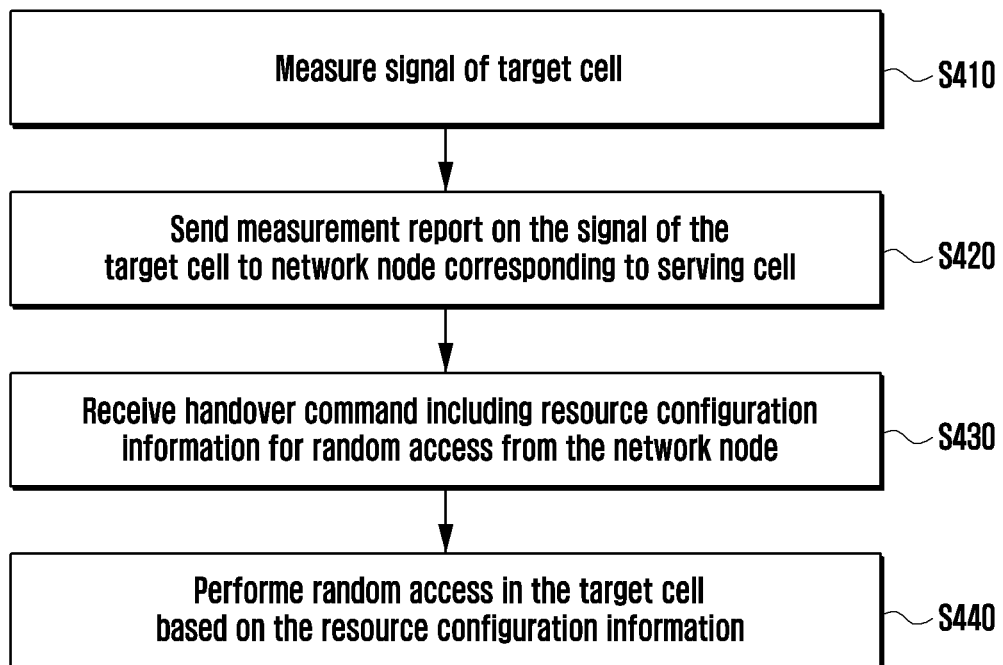
FIG. 4 illustrates a schematic flowchart of a method for performing random access at a UE according to another exemplary embodiment of the present disclosure.

FIG. 4 illustrates a schematic flowchart of a method 400 for performing random access at a UE according to a second exemplary embodiment of the present disclosure. As shown in FIG. 4, in step S410, the UE measures a signal of a target cell. In step S420, the UE sends a measurement report on the signal of the target cell to a network node corresponding to a serving cell. The measurement report may include a Reference Signal Receiving Power (RSRP) of the target cell obtained by the UE measuring a Synchronization Signal Block (SSB) or a configured Channel Status Information-Reference Signal (CSI-RS) of the target cell. In addition, the measurement report may further include an SSB index or CSI-RS index to be fed back to the serving cell. Herein, the UE may determine one or more SSB indexes or CSI-RS indexes to be fed back to the serving cell by a threshold, threshold1, configured by the network node. In particular, for example, when the UE measures the SSB-based RSRP (SSB_rsrp), if the SSB_rsrp≥threshold), the UE records the index of the SSB, and notifies the serving cell of the index. The UE may notify the serving cell of indexes of all M SSBs that satisfy the threshold. Alternatively, the UE may select N (N<M) SSBs from all M SSBs satisfying the threshold with equal probability, and notify the serving cell of the indexes thereof. The threshold1 used for the determination and the number N to be selected are notified to the UE by the network node. The case of using the CSI-RS is similar to that of the SSB, and details thereof are not described herein again.

In step S430, the UE receives a handover command including resource configuration information for random access from the network node. The handover command may be made by the network node based on a measurement report (such as the target cell's RSRP) from the UE. Specifically, the network node may determine whether the UE needs to perform handover by comparing the RSRP (RSRP_report) reported by the UE with a preset threshold (threshold_HO). For example, if RSRP_report>threshold_HO, it is determined that the UE needs to be handed over; and if RSRP_report≤threshold_HO, it is determined that the UE does not need to be handed over. The network node may notify the UE of the handover command through Radio Resource Control (RRC) signaling (PDSCH) or Downlink Control Information (DCI) (PDCCH).

In the handover command, the network node notifies the UE of resource configuration information for random access. When there are multiple types of uplinks that can perform random access to the target cell (that is, all the uplinks have random access resource configurations), take a normal uplink and a supplementary uplink in the target cell as an example, where the normal uplink is for UEs with better channel status conditions, and the supplementary uplink is for UEs with poor channel status conditions. When the UE reports the measured RSRP value, the UE does not know a threshold, threshold2, used by the target cell to determine whether to select the normal uplink or the supplementary uplink. Therefore, the UE cannot determine the configuration information of the random access resources to be used.

Thus, the resource configuration information notified by the network node to the UE according to an exemplary embodiment of the present disclosure may include one of the following:

1) Random access resource configuration information based on the normal uplink, which implicitly notifies the UE to perform random access using the normal uplink; and the UE obtains available random access time-frequency resource locations (including a bandwidth part indication (Bandwidth Part), random access channel resource configuration information) and available random access preamble resources (root sequence, cyclic shift value, number of available preambles, etc.) from the obtained random access resource configuration;

2) Random access resource configuration information based on the supplementary uplink, which implicitly notifies the UE to perform random access using the supplementary uplink; and the UE obtains available random access time-frequency resource locations (including a bandwidth part indication (Bandwidth Part), random access channel resource configuration information) and available random access preamble resources (root sequence, cyclic shift value, number of available preambles, etc.) from the obtained random access resource configuration.

In addition, the resource configuration information may further include one of the following:

3) An indication which indicates to the UE whether to use the normal uplink or the supplementary uplink for random access; and 4) The threshold2 for the UE to determine whether to use the normal uplink or the supplementary uplink for random access. In this case, the UE may determine whether to use the normal uplink for random access or use the supplementary uplink for random access by comparing the reported RSRP (RSRP_report) of the target cell with the threshold2. For example, if RSRP_report>threshold2, the UE chooses to use the normal uplink and determines the selected random access resource from the corresponding random access resource configuration information; and if RSRP_report≤threshold2, the UE chooses to use the supplementary uplink and determines the selected random access resource from the corresponding random access resource configuration information.

The above resource configuration information may be included in resource configuration information, which is configured by the target cell in system information thereof that may be used for the UE to perform the contention-based random access. That is, the above resource configuration information may be included in the resource configuration information sent by the network node to the UE for the contention-based random access. In addition, the above resource configuration information may be further included in dedicated random access resource (RACH-ConfigDedicated) configuration information that is additionally notified by the network node to the UE.

Therefore, if the UE is not configured with a dedicated random access resource, it selects a random access resource (a random access channel and a random access preamble) through the configured random access resource configuration information to initiate the contention-based random access. If the UE is configured with a dedicated random access resource, i.e., the UE is configured with a specific random access resource (a specific random access channel and/or a specific random access preamble), it uses the configured dedicated random access resource to initiate the random access. The threshold2 for determining whether to select a normal uplink or a supplementary uplink may be put in the dedicated random access resource (RACH-ConfigDedicated) configuration information as follows:

```
RACH-ConfigDedicated ::= SEQUENCE {
    ra-PreambleIndex INTEGER (0..63),
    ra-PRACH-MaskIndex INTEGER (0..15)
    ra-SUL-Threshold RSRP-value(threshold2)
}
```

After receiving the above resource configuration information from the network node, in step S440, the UE may obtain the random access resource configuration and indication, and perform random access to the target cell based on the random access resource configuration and indication. For the above cases 1), 2) and 3), the UE performs random access according to the normal uplink or supplementary uplink indicated by the network node. For the above case 4), the UE selects a corresponding random resource configuration (i.e., a normal uplink or supplementary uplink) by itself according to the threshold2 included in the resource configuration information sent by the network node, and determines the random resource to be used. In one exemplary embodiment, the UE may perform a new downlink measurement to the target cell and obtain a new RSRP (RSRP_latest) when the UE actually performs a random access of handover, and the RSRP_latest might not be the same as the RSRP_report. In this case, if RSRP_latest>threshold2, the UE chooses to use the normal uplink and determines the selected random access resource from the corresponding random access resource configuration information; and if RSRP_latest≤threshold2, the UE chooses to use the supplementary uplink and determines the selected random access resource from the corresponding random access resource configuration information.

Additionally, the handover command sent by the network node to the UE may further include: a mapping relationship between the SSB reported by the UE and the corresponding random access resource; or a mapping relationship between the CSI-RS reported by the UE and the corresponding random access resource. Thus, after the UE selects one SSB or CSI-RS, available random access resources may be found through the mapping relationship with the corresponding random access resource. The manner in which the UE selects a random access channel according to an exemplary embodiment of the present disclosure has been described in detail above with reference to FIG. 3, and details thereof are not described herein again.

Figure 5:
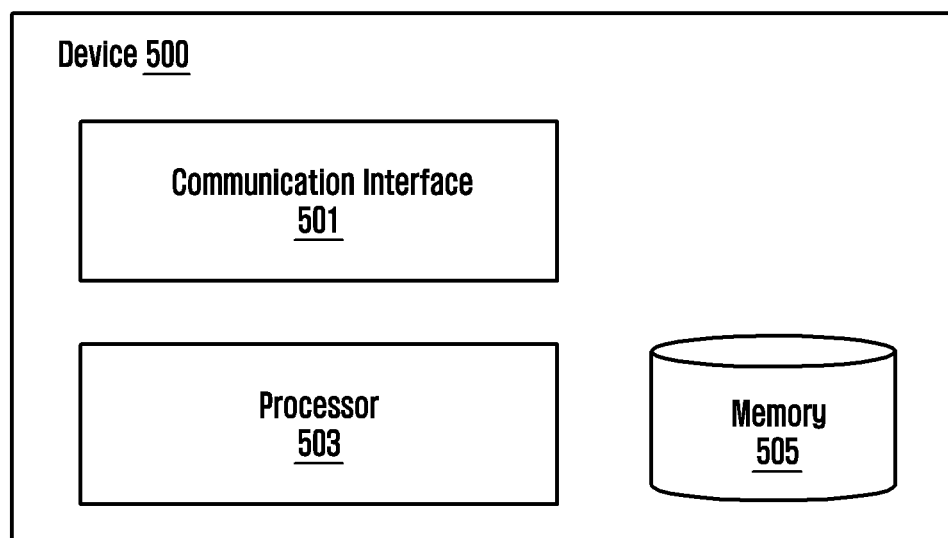
FIG. 5 illustrates a schematic structural diagram of a device according to an exemplary embodiment of the present disclosure.

Hereinafter, a schematic structure of a device according to an exemplary embodiment of the present disclosure will be described with reference to FIG. 5. FIG. 5 is a schematic structural diagram of a device 500 according to an exemplary embodiment of the present disclosure. The device 500 may be used to execute the methods 200 and 400 described with reference to FIGS. 2 and 4. For the sake of simplicity, a schematic structure of a device according to an exemplary embodiment of the present disclosure is described herein, but details that have been already described in detail in the methods described previously with reference to FIGS. 2 and 4 are omitted.

As shown in FIG. 5, the device 500 may include a communication interface 501 for external communication, a processing unit or processor 503, which may be a single unit or a combination of multiple units for performing different steps of the method, and a memory 505, in which computer-executable instructions are stored.

According to the first exemplary embodiment, the instructions, when executed by the processor 503, cause the processor 503 to: receive a measurement report on a signal of a target cell from a user equipment UE (as described in step S210, which is not described herein again); and send a handover command including resource configuration information for random access to the UE based on the measurement report (as described in step S220, which is not described herein again). As such, the device 500 may be embodied as a network node that executes the method 200 as previously described with reference to FIG. 2.

According to the second exemplary embodiment, the instructions, when executed by the processor 503, cause the processor 503 to: measure a signal of a target cell (as described in step S410, which is not described herein again); send a measurement report on the signal of the target cell to a network node corresponding to a serving cell (as described in step S420, which is not described herein again); receive a handover command including resource configuration information for random access from the network node (as described in step S430, which is not described herein again); and perform random access to the target cell based on the resource configuration information (as described in step S440, which is not described herein again). As such, the device 500 may be embodied as a user equipment (UE) that executes the method 400 as previously described with reference to FIG. 4.

Hereinafter, inter-device messaging according to the method of an exemplary embodiment of the present disclosure will be described with reference to FIG. 6.

Figure 6:
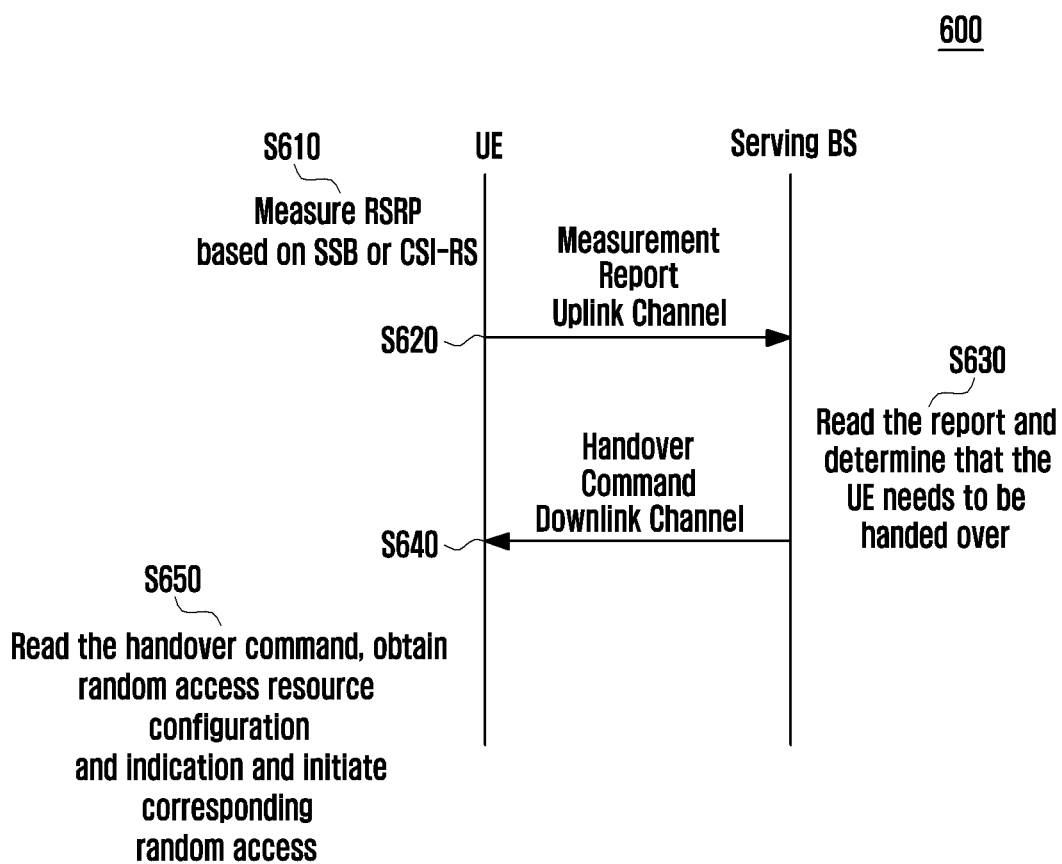
FIG. 6 illustrates a signal flow diagram between devices to which a method according to an exemplary embodiment of the present disclosure is applied.

FIG. 6 illustrates a signal flow diagram between devices to which a method 600 according to an exemplary embodiment of the present disclosure is applied.

In step S610, the user equipment (UE) measures the signal of the target cell. The measurement may be a measurement of a reference signal receiving power (RSRP) of the target cell based on a synchronization signal block (SSB) or a configured channel status information-reference signal (CSI-RS) of the target cell.

Afterwards, in step S620, the UE sends the measurement report to the network node through the uplink channel, for example, the measured RSRP value of the target cell.

In step S630, the network node reads the measurement report from the UE and determines from the measurement report that the UE needs to be handed over from the serving cell to the target cell. The determination regarding the handover operation has been described in detail in the first exemplary embodiment and the second exemplary embodiment above, and details thereof are not described herein again.

When the network node determines that the UE needs to be handed over, in step S640, the network node sends a handover command to the UE through the downlink channel. In the handover command, the network node notifies the UE of resource configuration information for random access. When there are multiple types of uplinks that can perform random access to the target cell (that is, all the uplinks have random access resource configurations), take a normal uplink and a supplementary uplink in the target cell as an example, where the normal uplink is for UEs with better channel status conditions, and the supplementary uplink is for UEs with poor channel status conditions. When the UE reports the measured RSRP value, the UE does not know a threshold, threshold2, used by the target cell to determine whether to select the normal uplink or the supplementary uplink. Therefore, the UE cannot determine the configuration information of the random access resources to be used.

Thus, the resource configuration information notified by the network node to the UE according to an exemplary embodiment of the present disclosure may include one of the following:

1) Random access resource configuration information based on the normal uplink, which implicitly notifies the UE to perform random access using the normal uplink; and the UE obtains available random access time-frequency resource locations (including a bandwidth part indication (Bandwidth Part), random access channel resource configuration information) and available random access preamble resources (root sequence, cyclic shift value, number of available preambles, etc.) from the obtained random access resource configuration;

2) Random access resource configuration information based on the supplementary uplink, which implicitly notifies the UE to perform random access using the supplementary uplink; and the UE obtains available random access time-frequency resource locations (including a bandwidth part indication (Bandwidth Part), random access channel resource configuration information) and available random access preamble resources (root sequence, cyclic shift value, number of available preambles, etc.) from the obtained random access resource configuration.

In addition, the resource configuration information may further include one of the following:

3) An indication which indicates to the UE whether to use the normal uplink or the supplementary uplink for random access; and 4) The threshold2 for the UE to determine whether to use the normal uplink or the supplementary uplink for random access. In this case, the UE may determine whether to use the normal uplink for random access or use the supplementary uplink for random access by comparing the reported RSRP (RSRP_report) of the target cell with the threshold2. For example, if RSRP_report>threshold2, the UE chooses to use the normal uplink and determines the selected random access resource from the corresponding random access resource configuration information; and if RSRP_report≤threshold2, the UE chooses to use the supplementary uplink and determines the selected random access resource from the corresponding random access resource configuration information.

The above resource configuration information may be included in resource configuration information, which is configured by the target cell in the system information thereof that may be used for the UE to perform the contention-based random access. That is, the above resource configuration information may be included in the resource configuration information sent by the network node to the UE for the contention-based random access. In addition, the above resource configuration information may be further included in dedicated random access resource (RACH-ConfigDedicated) configuration information that is additionally notified by the network node to the UE.

After receiving the above resource configuration information from the network node, in step S650, the UE may obtain the random access resource configuration and indication from the resource configuration information. For the above cases 1), 2) and 3), the UE performs random access according to the normal uplink or supplementary uplink indicated by the network node. For the above case 4), the UE selects a corresponding random resource configuration (i.e., a normal uplink or supplementary uplink) by itself according to the threshold2 included in the resource configuration information sent by the network node, and determines the random resource to be used.

It can be seen from the above technical solution that when the UE performs a handover operation, the UE may measure the target cell and feed the measurement result back to the network node of the serving cell. The network node may determine whether to perform the handover and notify the UE of the target cell's random access resource configuration information, where used uplink and its corresponding random access resource configuration information may be directly determined by the network node, or all available uplinks and corresponding random access resource configuration information and a threshold for the corresponding determination may be notified to the UE by the network node, and then the UE determines the selected uplink and its corresponding random access resource configuration information. In addition, when there is a certain time interval from a time when the UE obtains the above resource configuration information to the UE actually starts to hand over the random access, the UE may use the latest measurement result to select the uplink and its corresponding random access resources. Therefore, the UE can select the most accurate uplink in time to perform random access.

In the future fifth-Generation (5G) communication system, the network may use a beam forming system and the base station may transmit signals to the user adopting different DL transmission beams. Since transmission performances of different DL transmission beams are different, the user may select a DL transmission beam with better reception effect from multiple different DL transmission beams according to detection on the DL signals and notify the base station of the selected DL transmission beam. Therefore, the base station may use this DL transmission beam to transmit signals to the user in subsequent transmission to improve transmission performances. In the 5G communication system, multiple DL transmission beams may be bound with a same random access time-frequency resource. Then, in order to make the network side distinguish the DL transmission beam selected by the user via detected resources and preambles, available random access preambles may be grouped and different group indexes may be bound with different DL transmission beams. However, if existing RA-RNTI generation method is used, the user may make extra waste on detecting random preambles of other groups.

In order to solve the above problem, an embodiment of the present disclosure may provide an information generation method, which may use a new mode to generate the RA-RNTI. In a multi-beam transmission system, the system may transmit information such as broadcast messages or synchronization signals via multiple DL transmission beams. Meanwhile, multiple DL transmission beams may be bound with the same random access resource. In this random access resource, random access preambles may need to be grouped and different groups may be used to indicate different DL transmission beams. An embodiment of the present disclosure may provide a new method for constructing and generating an RA-RNTI. The RA-RNTI may be calculated and generated using time-frequency resource locations used by the random access and an index of a group, at which the selected preamble may be located. Therefore, when the user searches the possible RARs, RARs that use the same time-frequency resource and belong to different preamble groups may be automatically excluded via the generated RA-RNTI to save users' search overhead and delay. While the base station may distinguish and select users of different DL transmission beams using different RA-RNTIs in the RAR via the detected random access preambles.

After a user reads configuration information of the random access via the DL channel and obtains the corresponding random access time-frequency resources and corresponding random access preamble (i.e., the random access preamble sequence) groups, the user may send the random access preambles on the selected random access time-frequency resources. In a period after the preambles are transmitted, the user may search a possible RAR according to length of a RAR window and the RAR may be indicated by the RA-RNTI. Different from the traditional mode, the calculation mode provided by embodiments of the present disclosure may be associated with a resource location of a given Physical Random Access Channel (PRACH) and indexes of groups of available random access preamble groups on the PRACH.

In different systems, the resource locations of PRACH used for calculating the RA-RNTI may be different.

In the 5G system, the corresponding resource location may include index information t_id of a starting time unit and index information f_id of a starting frequency unit of the PRACH, which may be used for transmitting the random access preambles. The index information t_id of the starting time unit may be an index value of the time unit, at which a starting location of the PRACH may be located, such as the starting sub-frame index in a radio frame, at which the starting location of the PRACH may be located, and t_id may range from 0 to M, and (0≤t_id<M+1). In an alternative, the index information t_id may be determined by index values of multiple time units, at which the starting location of the PRACH may be located, such as may be determined by an index of a radio frame, at which the PRACH may be located, and an index of a sub-frame, at which the PRACH may be located. Similarly, the index information f_id of the frequency unit may be the index value of the frequency unit, at which the starting location of the PRACH may be located, such as a Physical Resource Block (PRB) index of a PRB, at which the starting location of the PRACH may be located and f_id may range from 0 to N, and (0≤f_id<N+1). In an alternative, the index information f_id may be determined by index values of multiple frequency units, at which the starting location of the PRACH may be located, such as may be determined by an index and sub-carrier index of the PRB, at which the PRACH may be located, and M and N may be nonnegative integers.

In an enhanced Machine Type Communication (eMTC), the corresponding resource location may include index information SFN_id (such as an index of a first radio frame, at which the PRACH may be located) of a first first-time-unit, at which the PRACH may be located, index information t_id (such as an sub-frame index of the first radio frame) of a second time unit in the first first-time-unit, at which the PRACH may be located, and index information f_id of a frequency unit, at which the PRACH may be located.

In a Narrow band-Internet of Things (NB-IOT), the corresponding resource location may be an index SFN_id (such as an index of a first radio frame, at which the PRACH may be located) of the first time unit, at which the PRACH may be located.

The index of the random access preamble group may include pg_id of a random access preamble group, to which the transmitted random access preamble may belong. The random access preamble group may be only for random access time-frequency resources selected by the user and pg_id may range from 0 to P, (0≤pg_id<P+1), P is a nonnegative integer. It should be noted that since the preamble group may be used to notify the base station of the DL transmission beam selected by the user, the preamble group may be bound with the DL transmission beam. When the RA-RNTI is calculated, the preamble group index may be an index of a DL Transmission beam, or an index of a Synchronization Signal (SS) block, or an index of a Physical Broadcast Channel (PBCH). Further, besides directly grouping the preamble set, since the preamble set may be formed by different preamble root sequence groups, or formed by the preamble sequence and different Orthogonal Cover Codes (OCC)s, or formed by the preamble sequence and different Cyclic Shifts (CS)s. Therefore, the preamble group indexes may be different root sequence group indexes, OCC indexes or different CS indexes.

Figure 7A:
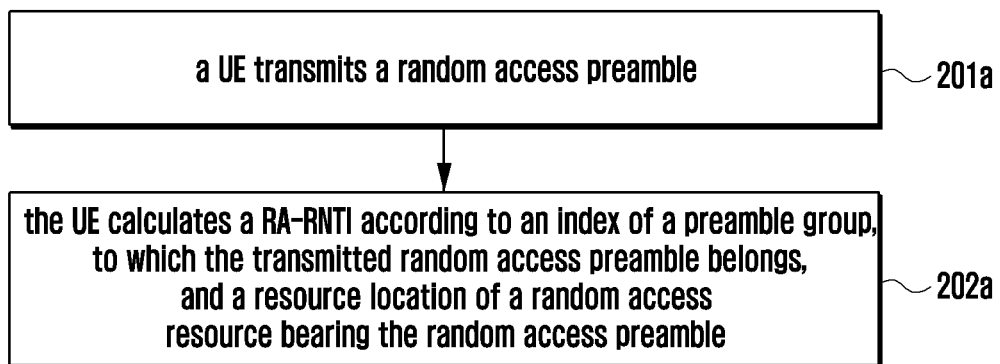
FIG. 7A is a flow chart illustrating a UE side processing procedure in an information generation method in accordance with various embodiments of the present disclosure.
Figure 7B:
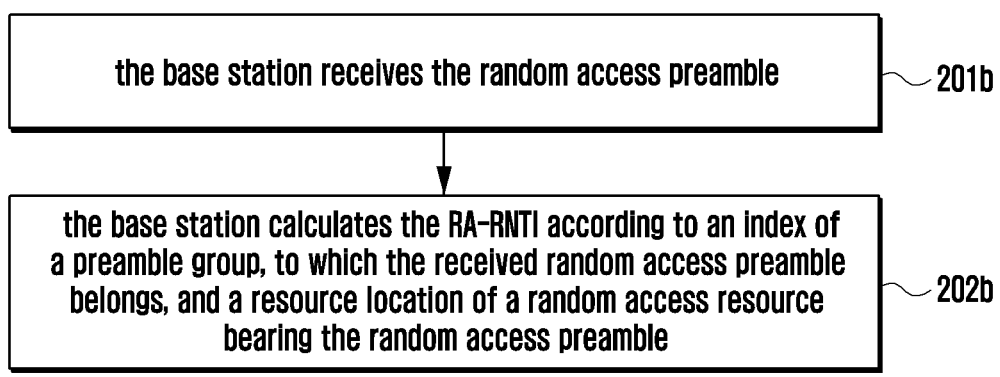
FIG. 7B is a flow chart illustrating a base station side processing procedure in an information generation method in accordance with various embodiments of the present disclosure.

To sum up, the basic flow of the information generation method in embodiments of the present disclosure may be shown in FIG. 7A and FIG. 7B. FIG. 7A may be the processing flow of the UE side and may include:

At block 201a, a UE may transmit a random access preamble.

At block 202a, the UE may calculate a RA-RNTI according to an index of a preamble group, to which the transmitted random access preamble may belong, and a resource location of a random access resource bearing the random access preamble. In an embodiment, the resource location of the random access resource may be the time/frequency location of the random access resource.

The preamble group may be a group of available random access preambles corresponding to the random access resource. Specifically, the multiple available random access preambles corresponding to the random access resource may be grouped in advance to obtain the preamble groups.

FIG. 7B may be a process flow of the base station side and may include:

At block 201b, the base station may receive the random access preamble.

At block 202b, the base station may calculate the RA-RNTI according to an index of a preamble group, to which the received random access preamble may belong, and a resource location of a random access resource bearing the random access preamble.

The preamble group may be a group of available random access preambles corresponding to the random access resource. Specifically, the multiple available random access preambles corresponding to the random access resource may be grouped in advance to obtain the preamble group.

In a communication system, such as 5G communication system, the calculation mode of the RA-RNTI may include:

RA-RNTI=1+a*t_id+b*f_id+c*pg_id(1)t_id and f_id may respectively represent index information of a time unit, at which a starting location of the random access chancel may locate, and index information of a frequency unit, at which the starting location of the random access chancel may locate, such as respectively represent a starting location on the time domain of a radio frame of the random access channel and a starting location on the frequency domain of the radio frame of the random access channel. In an embodiment, t_id may be a sub-frame index, slot index, mini-slot index, symbol-group index, symbol index, or that determined according to indexes of the multiple time units, such as a slot index in a sub-frame index, or a symbol index in the slot index. In an embodiment, f_id may be a PRB-group index, PRB index, subcarrier index, subcarrier group index, or that determined according to indexes of the multiple frequency units, such as the subcarrier index in the PRB index.

Wherein, a, b and c may respectively be coefficients of t_id, f_id and pg_id. Values of a, b and c should satisfy a condition, i.e., the RA-RNTI should only correspond to the value of {t_id, f_id, pg_id}. The value of the RA-RNTI may be calculated using the value of a group of {t_id, f_id, pg_id}. On the contrary, the only value of {t_id, f_id, pg_id} may be calculated using the value of RA-RNTI. A feasible design may be that the value of a is 1, the value of b is the maximum value of (1+a*t_id) and the value of c is the maximum value of (1+a*t_id+b*f_id), that is $$a=1,$$

$$b=\max\{1+a*t\_id\}=M+1,$$

$$c=\max\{1+a*t\_id+b*f\_id\}=(M+1)(N+1).$$

Such as, M=9, N=5, therefore, the calculation method of RA-RNTI may be:

$$RA\text{-}RNTI=1+t\_id+10*f\_id+60*pg\_id \qquad (2)$$

Therefore, when the value of RA-RNTI is 32, the only value t_id=1, f_id=3, pg_id=0 may be calculated.

After the UE obtains the RA-RNTI using the method shown in FIG. 7A, the UE may detect the RAR transmitted by the base station. After the base station obtains the RA-RNTI using the method shown in FIG. 7B, the base station may scramble the RAR using the RA-RNTI and send the scrambled RAR to the UE.

The RA-RNTI generated with the above method may reflect the DL transmission beam selected by the user and improve the detection efficiency of the RAR. The implementation of the methods in embodiments of the present disclosure may be described via several embodiments.

Embodiment One

In this embodiment, corresponding to the random access resource, the available random access preambles may be grouped to obtain preamble groups and one-to-one binding relationship may be established between the preamble group and the DL transmission beam. Therefore, the random access preamble may be selected from the corresponding preamble group according to the DL transmission beam selected by the user, so that the base station may distinguish the DL transmission beam selected by the UE according to the selected random access preamble.

Figure 8:
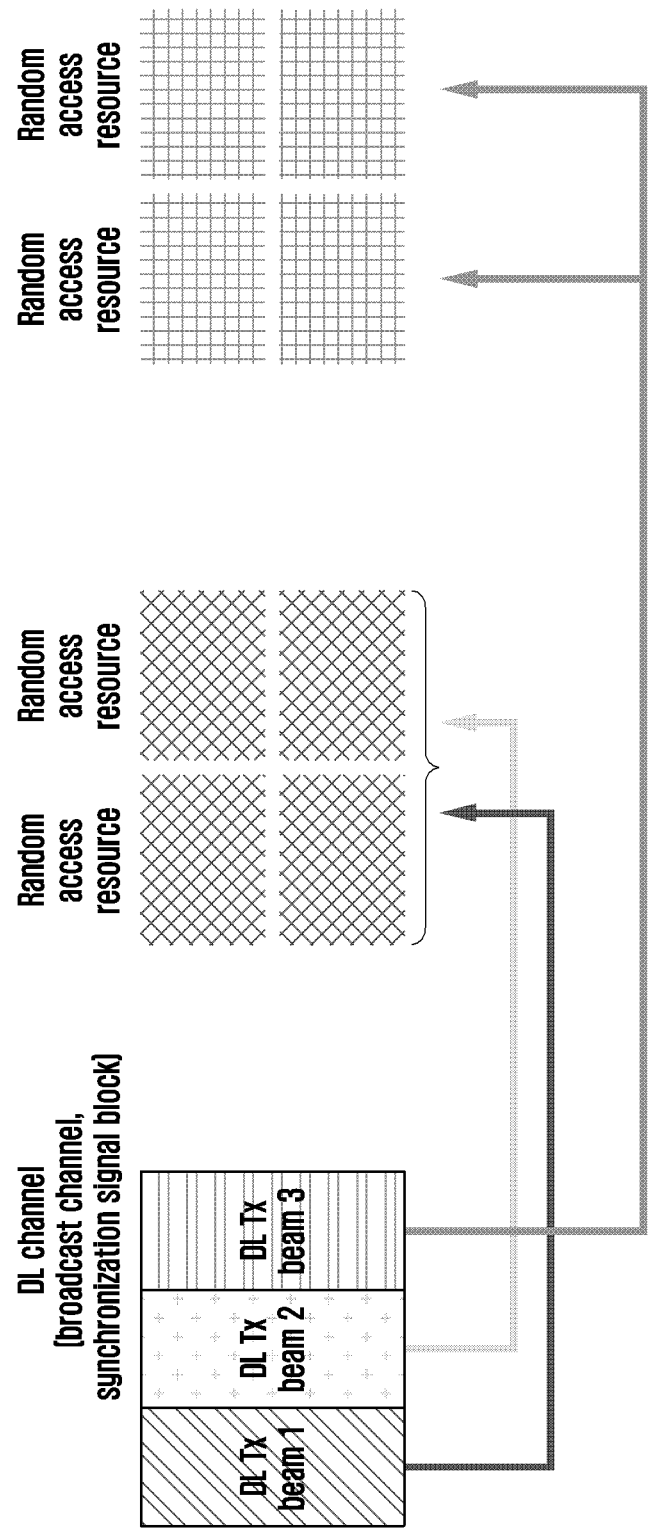
FIG. 8 is a schematic diagram illustrating a mapping relationship between DL transmission beams and random access time-frequency resources in embodiment one of the present disclosure.

Specifically, the base station may send broadcast messages and synchronization signals via different DL transmission beams, while different DL transmission beams may be bound to the designated random access resource. One situation may be that multiple DL transmission beams may be bound to the same random access time-frequency resource. As shown in FIG. 8, the DL transmission beam 1 and the DL transmission beam 2 may be mapped to the same random access time-frequency resource.

Then, different preamble sets may need to be grouped so that the base station may obtain the direction of the DL transmission beam selected by the user via the detection of the random access message 1. Suppose that X=64 available random access preambles may be set for the DL transmission beam 1 and DL transmission beam 2. The preamble set may be divided into two groups. Wherein, the group 0 may include A (A<64) preambles that may be bound with the DL transmission beam direction 1 and the group 1 may include B (B<64, A+B≤64) preambles that may be bound with the DL transmission beam direction 2. When a preamble detected by the base station on the corresponding random access resource belongs to the group 0, the base station may be implicitly notified of that the user transmitting the preamble may select the DL transmission beam 1. Similarly, when a preamble detected by the base station on the corresponding random access resource belongs to the group 1, the base station may be implicitly notified of that the user transmitting the preamble may select the DL transmission beam 2.

Figure 9:
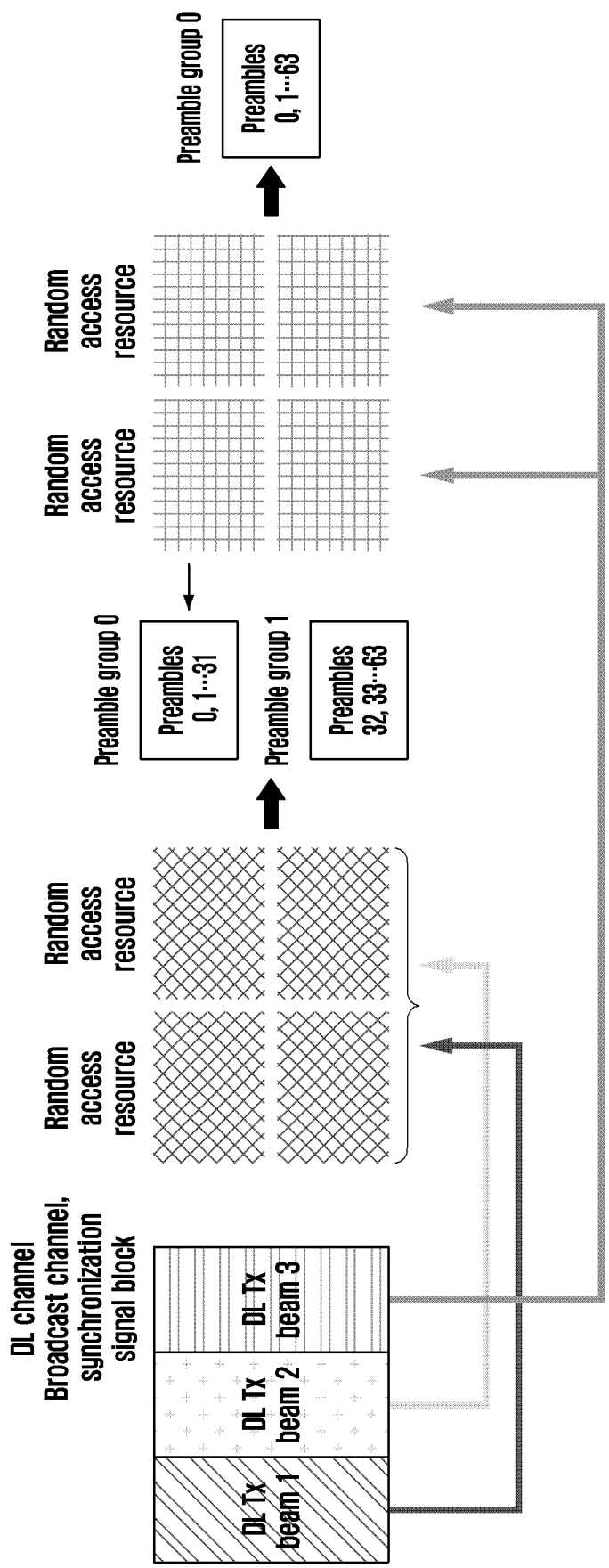
FIG. 9 is a schematic diagram illustrating preamble groups corresponding to random access resources in embodiment one.

It should be noted that the "corresponding random access resource" may be that the random access resource, into which the one or multiple DL beams may be mapped. In different random access resources, into which the same random access preamble may be mapped, the same random access preamble may belong to different preamble groups. As shown in FIG. 9, in the random access resources corresponding to the DL transmission beams 1 and 2, the preamble set may be divided into two groups. The preamble 32 may belong to a preamble group 1, while in the random access resource corresponding to the DL transmission beam 3, the preamble set may be divided into one group and the preamble 32 may belong to a preamble group 0.

When the base station successfully detects a random access preamble, the base station may need to transmit a RAR for the preamble and may need to perform a scrambling operation using the RA-RNTI when transmitting the RAR. For instance, the system may have made a configuration that one radio frame may include 10 sub-frames, t_id may identify a sub-frame index and may range from 0 to 9, that is, (0≤t_id<10). The frequency domain of the random access resource may have 6 PRBs, f_id may identify a PRB index and may range from 0 to 5, that is, (0≤f_id<6), the RA-RNTI may be calculated using the above equation, i.e., RA-RNTI=1+t_id+10*f_id+60*pg_id.

When the user detects that signal strength on the DL beam 2 is max (that is, Reference Signal Receiving Power (RSRP) measured on the DL transmission beam 2 may be max), the user may select the random access time-frequency resource corresponding to the DL beam 2. The starting location of the random access time-frequency resource may be the second sub-frame in time domain and the third PRB in the frequency domain and may be transmitted using the preamble 32 selected from the preamble group 1, that is, t_id=2, f_id=3, pg_id=1. Finally, the base station may successfully detect the random access preamble 32 from the random access time-frequency resource, the starting location of which may be the second sub-frame in time domain and the third frequency domain location in the frequency domain, make a RAR for the preamble 32, and execute the scrambling using the RA-RNTI. Then, the value of the RA-RNTI may be RA-RNTI=1+2+10*3+60*1=93.

At the same time, the user may use a same generation mode to generate the same RA-RNTI value. Therefore, the corresponding Physical Downlink Control Channel (PDCCH) may be descrambled and possible RARs therein may be searched.

It can be seen that in this embodiment, the random access resource may be determined according to the DL transmission beam selected by the UE based on the DL measurement. The random access preamble transmitted by the UE may be selected from a preamble group, which may correspond to the random access resource and may be bound with the DL transmission beam selected by the UE based on the DL measurement.

Embodiment Two

In this embodiment, corresponding to the random access resources, the available random access preambles may be grouped to obtain preamble groups and one-to-one binding relationship may be established between the preamble group and a physical broadcast signal or synchronization signal. Therefore, the random access preamble may be selected from the corresponding preamble group to perform random access according to the physical broadcast signal or synchronization signal selected by the user, so that the base station may distinguish the DL transmission beam selected by the UE according to the selected random access preamble.

Figure 10:
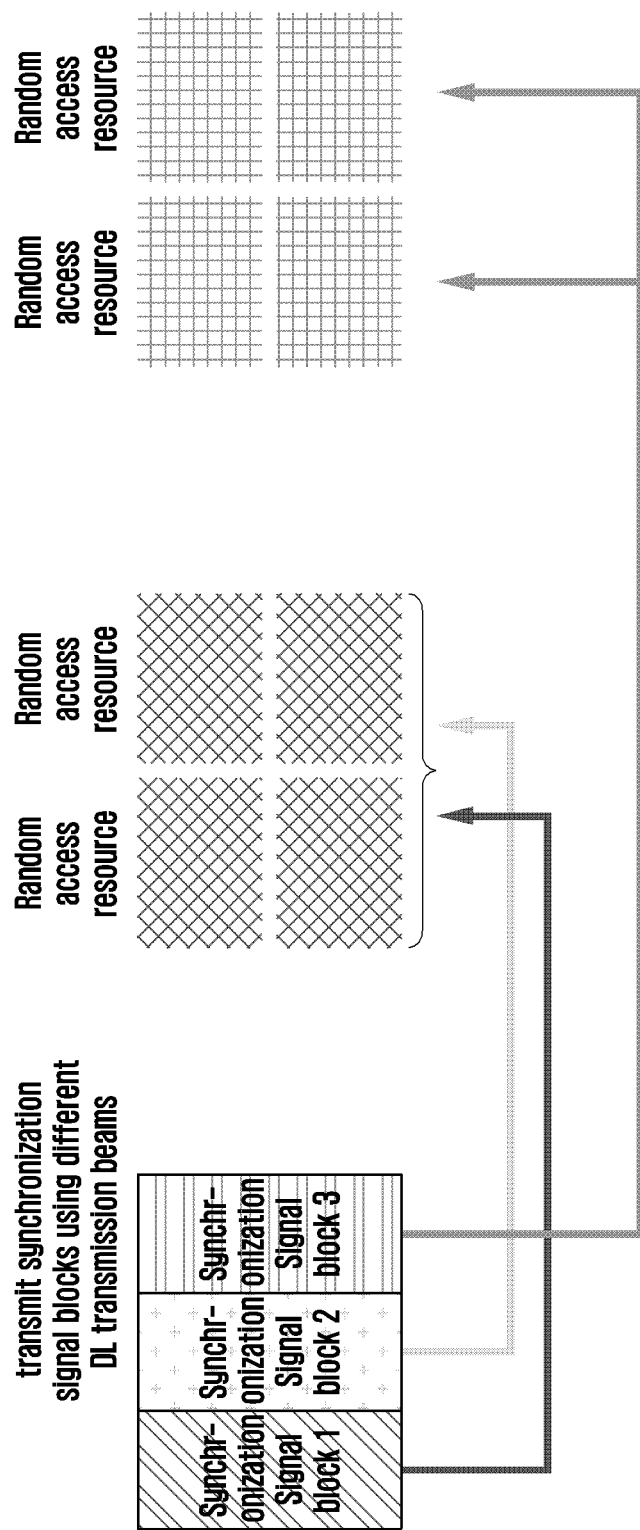
FIG. 10 is a schematic diagram illustrating a mapping relationship between synchronizing signal blocks and random access resources in embodiment two.

Then, the new RA-RNTI generation method based on the DL channel/signal (such as synchronization signal block, broadcast) provided by the present disclosure Specifically, the base station may send broadcast messages and synchronization signals via different DL transmission beams, while transmitted synchronization signal block or broadcast channel may be bound to a designated random access resource. One situation may be that multiple synchronization signal blocks may be bound to the same random access time-frequency resource. As shown in FIG. 10, the synchronization signal block 1 and the synchronization signal block 2 may be mapped to the same random access time-frequency resource.

Then, different preamble sets may need to be grouped so that the base station may obtain the direction of the DL transmission beam preferred by the user via the detection of the random access message 1. Suppose that X=64 available random access preambles may be set for the DL transmission beam 1 and DL transmission beam 2. The preamble set may be divided into two groups. Wherein, the group 0 may include A (A<64) preambles that may be bound with the synchronization signal block 1 and the group 1 may include B (B<64, A+B≤64) preambles that may be bound with the synchronization signal block 2. When a preamble detected by the base station on the corresponding random access resource belongs to the group 0, the base station may be implicitly notified of that the user transmitting the preamble may prefer the synchronization signal block 1, i.e., the DL transmission beam 1. Similarly, when a preamble detected by the base station on the corresponding random access resource belongs to the group 1, the base station may be implicitly notified of that the user transmitting the preamble may prefer the synchronization signal block 2, i.e., the DL transmission beam 2.

Figure 11:
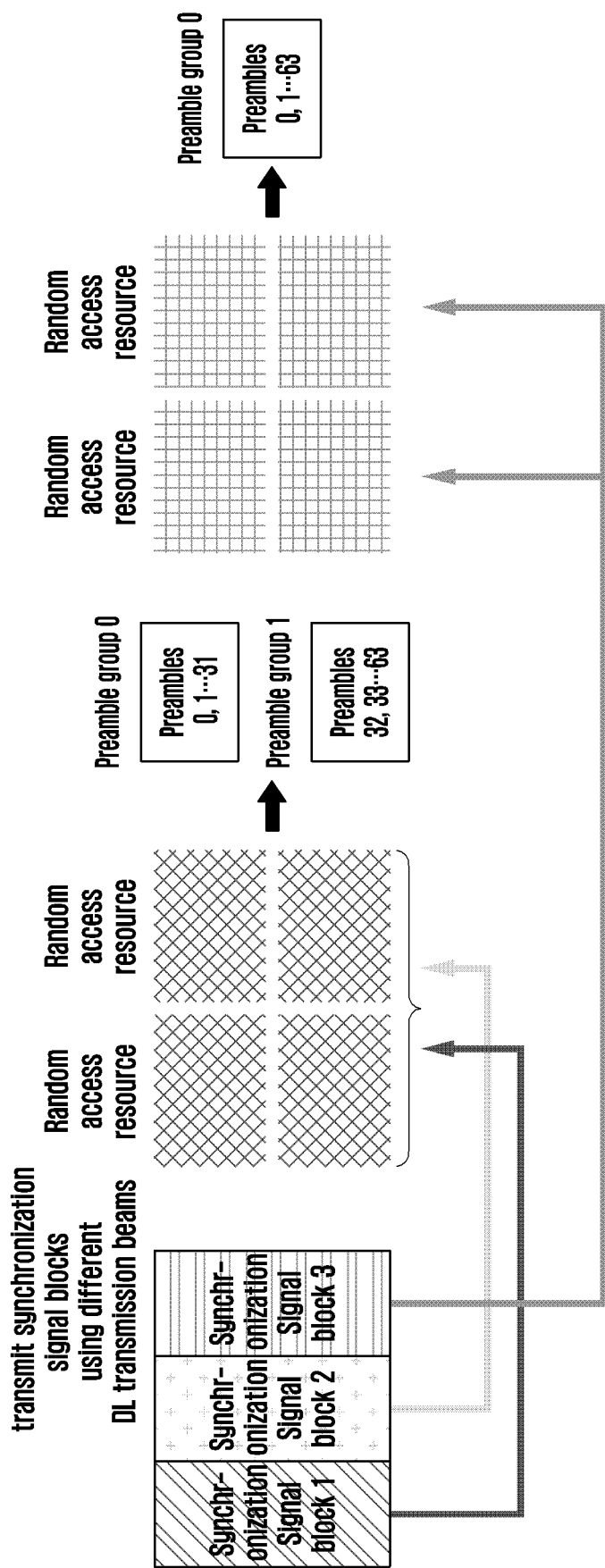
FIG. 11 is a diagram illustrating preamble groups corresponding to random access resources in embodiment two.

It should be noted that the "corresponding random access resource" may be that the random access resource, into which the one or multiple DL beams may be mapped. In different random access resources, into which the same random access preamble may be mapped, the same random access preamble may belong to different preamble groups. As shown in FIG. 11, in the random access resources corresponding to the synchronization signal blocks 1 and 2, the preamble set may be divided into two groups. The preamble 32 may belong to a preamble group 1, while in the random access resource corresponding to the synchronization signal block 3, the preamble set may be divided into one group and the preamble 32 may belong to a preamble group 0.

When the base station successfully detects a random access preamble, the base station may need to transmit a RAR for the preamble and may need to perform a scrambling operation using the RA-RNTI when transmitting the RAR. For instance, the system may have made a configuration that one radio frame may include 10 sub-frames, t_id may range from 0 to 9, that is, (0≤t_id<10). The frequency domain of the random access resource may have 6 locations, f_id may range from 0 to 5, that is, (0≤f_id<6), the RA-RNTI may be calculated using an equation (2), i.e., RA-RNTI=1+t_id+10*f_id+60*pg_id.

When the user detects that signal strength on the DL beam direction 2 is max, the user may select the random access time-frequency resource corresponding to the synchronization signal block 2. The starting location of the random access time-frequency resource may be the second sub-frame in time domain and the third PRB in the frequency domain and may be transmitted using the preamble 32 selected from the preamble group 1 corresponding to the random access resource, that is, t_id=2, f_id=3, pg_id=1. Finally, the base station may successfully detect the random access preamble 32 from the random access time-frequency resource, the starting location of which may be the second sub-frame in time domain and the third frequency domain location in the frequency domain, make a RAR for the preamble 32, and execute the scrambling using the RA-RNTI. Then, the value of the RA-RNTI may be RA-RNTI=1+2+10*3+60*1=93.

At the same time, the user may use a same generation mode to generate the same RA-RNTI value. Therefore, the corresponding Physical Downlink Control Channel (PDCCH) may be descrambled and possible RARs therein may be searched.

It can be seen that in this embodiment, the random access resource may be determined according to the physical broadcast signal and synchronization signal block selected by the UE based on the DL measurement. The random access preamble transmitted by the UE may be selected from a preamble group, which may correspond to the random access resource and may be bound with the physical broadcast signal or synchronization signal block selected by the UE based on the DL measurement.

Embodiment Three

This embodiment may introduce a grouping mode of the preamble groups and a valuing mode of the preamble group index. By combining the grouping mode and group index valuing mode in this embodiment and the calculation method of the RA-RNTI in the above embodiment one and embodiment two, more choices may be provided for calculating the RA-RNTI.

In the foregoing embodiments, the different preamble sets may be grouped. In this embodiment, besides directly grouping the preamble sets, since the preamble set may be formed by different preamble root sequence, or formed by the preamble sequence and different Orthogonal Cover Codes (OCC)s, or formed by the preamble sequence and different Cyclic Shifts (CS)s. The grouping of the preambles may be performed based on the preamble root sequence, OCC and CS. Therefore, the preamble group indexes may be different root sequence group indexes, OCC indexes or different CS indexes.

The base station may send broadcast messages and synchronization signals via different DL transmission beams, while different DL transmission beams may be bound to a designated random access resource. One situation may be that multiple DL transmission beams may be bound to the same random access time-frequency resource. As shown in FIG. 8, the DL transmission beam 1 and the DL transmission beam 2 may be mapped into the same random access time-frequency resource.

Then, different preamble sets may need to be grouped so that the base station may obtain the direction of the DL transmission beam preferred by the user via the detection of the random access message 1. The grouping of the preamble may include any of the following four scenarios:

1. The available random access preambles may be directly grouped.

For instance, suppose that with regard to the DL transmission beam 1 and the DL transmission beam 2, there may be X=64 available random access preambles. The preamble set may be grouped into two groups. Group 0 may include A (A<64) preambles, which may be bound with the DL transmission beam 1. Group 1 may include B (B<64, A+B≤64) preambles, which may be bound with the DL transmission beam 2. That is, when a preamble detected by the base station on the corresponding random access resource belongs to the group 0, the base station may be implicitly notified of that the user transmitting the preamble may prefer the DL transmission beam 1. Similarly, when a preamble detected by the base station on the corresponding random access resource belongs to the group 1, the base station may be implicitly notified of that the user transmitting the preamble may prefer the DL transmission beam 2.

2. The available random access preambles may be grouped according to root values of the preambles. Specifically, all preamble root sequences corresponding to the available random access preambles may be grouped. When the available random access preambles are grouped, the random access preambles generated by the preamble root sequences of the same group may be divided into one group. The index of the preamble group may include a root sequence group index of a group, at which the preamble root sequences used to generate the random access preambles may be located. That is, in this mode, the preamble group may be determined by the preamble root sequence group, to which the preamble root sequences used by the available random access preambles may belong. The random access preambles determined using the preamble root sequences of the same group may belong to the same preamble group.

For instance, suppose that with regard to the DL transmission beam 1 and the DL transmission beam 2, there may be X=64 available random access preambles and there may be X'=32 available preamble root sequences. The preamble set may be grouped into two groups based on the preamble root sequences. Group 0 may include A' (A'<32) preamble root sequences (at the same time, the preambles generated based on the A' root sequences in the all 64 preambles), which may be bound with the DL transmission beam 1. Group 1 may include B' (B'<32, A'±B'≤32) preamble root sequences (at the same time, the preambles generated based on the B' root sequences in the all 64 preambles), which may be bound with the DL transmission beam 2. That is, when a preamble detected by the base station on the corresponding random access resource belongs to the preamble root sequence group 0, the base station may be implicitly notified of that the user transmitting the preamble may prefer the DL transmission beam 1. Similarly, when a preamble detected by the base station on the corresponding random access resource belongs to the preamble root sequence group 1, the base station may be implicitly notified of that the user transmitting the preamble may prefer the DL transmission beam 2.

3. The available random access preambles may be grouped according to OCC. Specifically, each OCC corresponding to the available random access preambles may be grouped. When the available random access preambles are grouped, the random access preambles generated using the OCCs of the same group may be divided into a same group. The index of the preamble group may include an OCC group index of a group, at which the OCCs used to generate the random access preambles may be located. That is, in this mode, the preamble group may be determined by the OCC group, to which the OCCs used by the available random access preambles may belong. The random access preambles determined using the OCCs of the same group may belong to the same preamble group.

For instance, suppose that with regard to the DL transmission beam 1 and the DL transmission beam 2, there may be X=64 available random access preambles and there may be X'=8 available OCCs. The preamble set may be grouped into two groups based on the OCCs. Group 0 may include A' (A'<8) OCCs (at the same time, the preambles generated based on the A' OCCs in the all 64 preambles), which may be bound with the DL transmission beam 1. Group 1 may include B' (B'<8, A'+B'≤8) OCCs (at the same time, the preambles generated based on the B' OCCs in the all 64 preambles), which may be bound with the DL transmission beam 2. That is, when a preamble detected by the base station on the corresponding random access resource belongs to the OCC group 0, the base station may be implicitly notified of that the user transmitting the preamble may prefer the DL transmission beam 1. Similarly, when a preamble detected by the base station on the corresponding random access resource belongs to the OCC group 1, the base station may be implicitly notified of that the user transmitting the preamble may prefer the DL transmission beam 2.

4. The available random access preambles may be grouped according to Cyclic Shift (CS). Specifically, each CS value corresponding to the available random access preambles may be grouped. When the available random access preambles are grouped, the random access preambles generated using the cyclic shift values of the same group may be divided into a same group. The group index of the preamble group may include an index of a group, at which the CS values used to generate the random access preambles may be located. That is, in this mode, the preamble group may be determined by the CS group, to which the CS values used by the available random access preambles may belong. The random access preambles determined using the CS values of the same group may belong to the same preamble group.

For instance, suppose that with regard to the DL transmission beam 1 and the DL transmission beam 2, there may be X=64 available random access preambles and X'=6 available CSs. The preamble set may be grouped into two groups based on the CSs. Group 0 may include A' (A'<6) CSs (at the same time, the preambles generated based on the A' CSs in the all 64 preambles) which may be bound with the DL transmission beam 1. Group 1 may include B' (B'<6, A'+B'≤6) CSs (at the same time, the preambles generated based on the B' CSs in the all 64 preambles) which may be bound with the DL transmission beam 2. That is, when a preamble detected by the base station on the corresponding random access resource belongs to the CS group 0, the base station may be implicitly notified of that the user transmitting the preamble may prefer the DL transmission beam 1. Similarly, when a preamble detected by the base station on the corresponding random access resource belongs to the CS group 1, the base station may be implicitly notified of that the user transmitting the preamble may prefer the DL transmission beam 2.

It should be noted that the "corresponding random access resource" may be that the random access resource, into which the one or multiple DL beams may be mapped. In different random access resources, into which the same random access preamble may be mapped, the same random access preamble may belong to different preamble groups. As shown in FIG. 8, in the random access resources corresponding to the DL transmission beams 1 and 2, the preamble set may be divided into two groups. The preamble 32 may belong to a preamble group 1, while in the random access resource corresponding to the DL transmission beam 3, the preamble set may be divided into one group and the preamble 32 may belong to a preamble group 0.

When the base station successfully detects a random access preamble, the base station may need to transmit a RAR for the preamble and may need to perform a scrambling operation using the RA-RNTI when transmitting the RAR. For instance, the system may have made a configuration that one radio frame may include 10 sub-frames, t_id may identify a sub-frame index and may range from 0 to 9, that is, (0≤t_id<10). The frequency domain of the random access resource may have 6 PRBs, f_id may identify a PRB index and may range from 0 to 5, that is, (0≤f_id<6), the RA-RNTI may be calculated using the equation (2), i.e., RA-RNTI=1+t_id+10*f_id+60*pg_id.

When the user detects that signal strength on the DL beam 2 is max (that is, Reference Signal Receiving Power (RSRP) measured on the DL transmission beam 2 may be max), the user may select the random access time-frequency resource corresponding to the DL beam 2. The starting location of the random access time-frequency resource may be the second sub-frame in time domain and the third PRB in the frequency domain and may be transmitted using the preamble 32 selected from the preamble group 1, that is, t_id=2, f_id=3, pg_id=1. Finally, the base station may successfully detect the random access preamble 32 from the random access time-frequency resource, the starting location of which may be the second sub-frame in time domain and the third frequency domain location in the frequency domain, make a RAR to the preamble 32, and execute the scrambling using the RA-RNTI. Then, the value of the RA-RNTI may be RA-RNTI=1+2+10*3+60*1=93.

At the same time, the user may use a same generation mode to generate the same RA-RNTI value. Therefore, the corresponding Physical Downlink Control Channel (PDCCH) may be descrambled and possible RARs therein may be searched.

Embodiment Four

In the communication system, there may be no frequency-domain's difference between random access resources, which may be selected by the user. With regard to this kind of random access resource, a method for generating the RA-RNTI may be provided in this embodiment.

Figure 12:
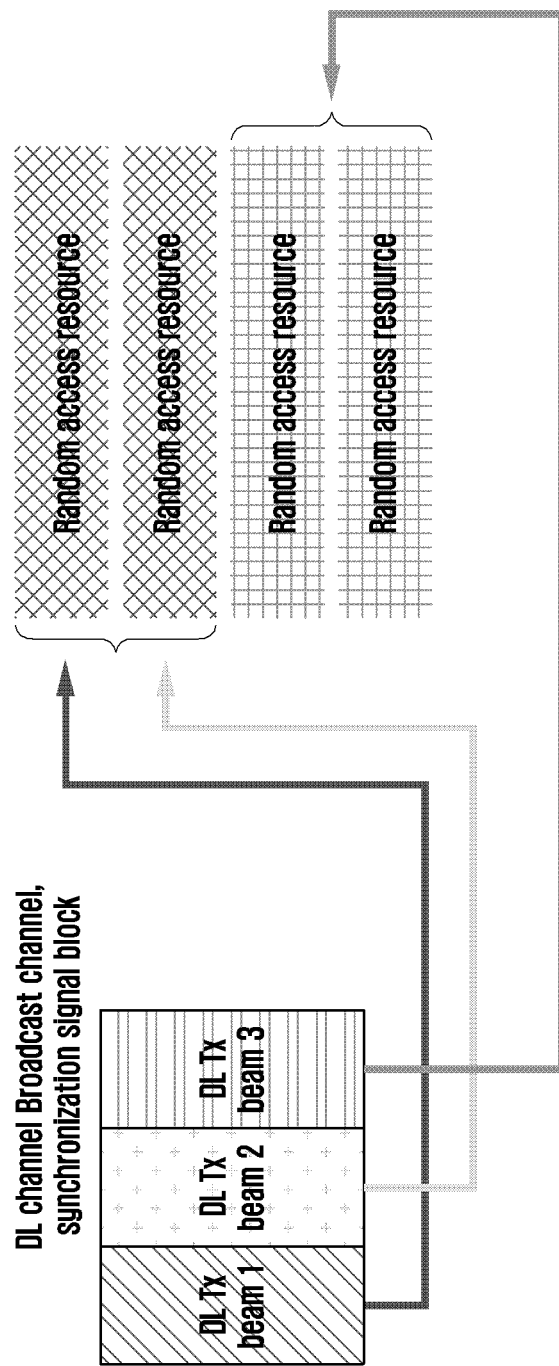
FIG. 12 is a diagram illustrating a mapping relationship between DL Transmission beams and random access time-frequency resources in embodiment four.

The base station may send broadcast messages and synchronization signals via different DL transmission beams, while different DL transmission beams may be bound to designated random access resources. One situation may be that multiple DL transmission beams may be bound to the same random access time-frequency resource. As shown in FIG. 12, the DL transmission beam 1 and the DL transmission beam 2 may be mapped to the same random access time-frequency resource. Meanwhile, a special situation may be that when the system is configured with no random access resource of different moments, that is, the random access time-frequency resources corresponding to the DL transmission beam may only differ on the frequency domain.

Then, different preamble sets may need to be grouped so that the base station may obtain the direction of the DL transmission beam selected by the user via the detection of the random access message 1. Suppose that X=64 available random access preambles may be set for the Dl transmission beam 1 and DL transmission beam 2. The preamble set may be divided into two groups. Wherein, the group 0 may include A (A<64) preambles that may be bound with the DL transmission beam direction 1 and the group 1 may include B (B<64, A+B≤64) preambles that may be bound with the DL transmission beam direction 2. When a preamble detected by the base station on the corresponding random access resource belongs to the group 0, the base station may be implicitly notified of that the user transmitting the preamble may prefer the DL transmission beam 1. Similarly, when a preamble detected by the base station on the corresponding random access resource belongs to the group 1, the base station may be implicitly notified of that the user transmitting the preamble may prefer the DL transmission beam 2.

Figure 13:
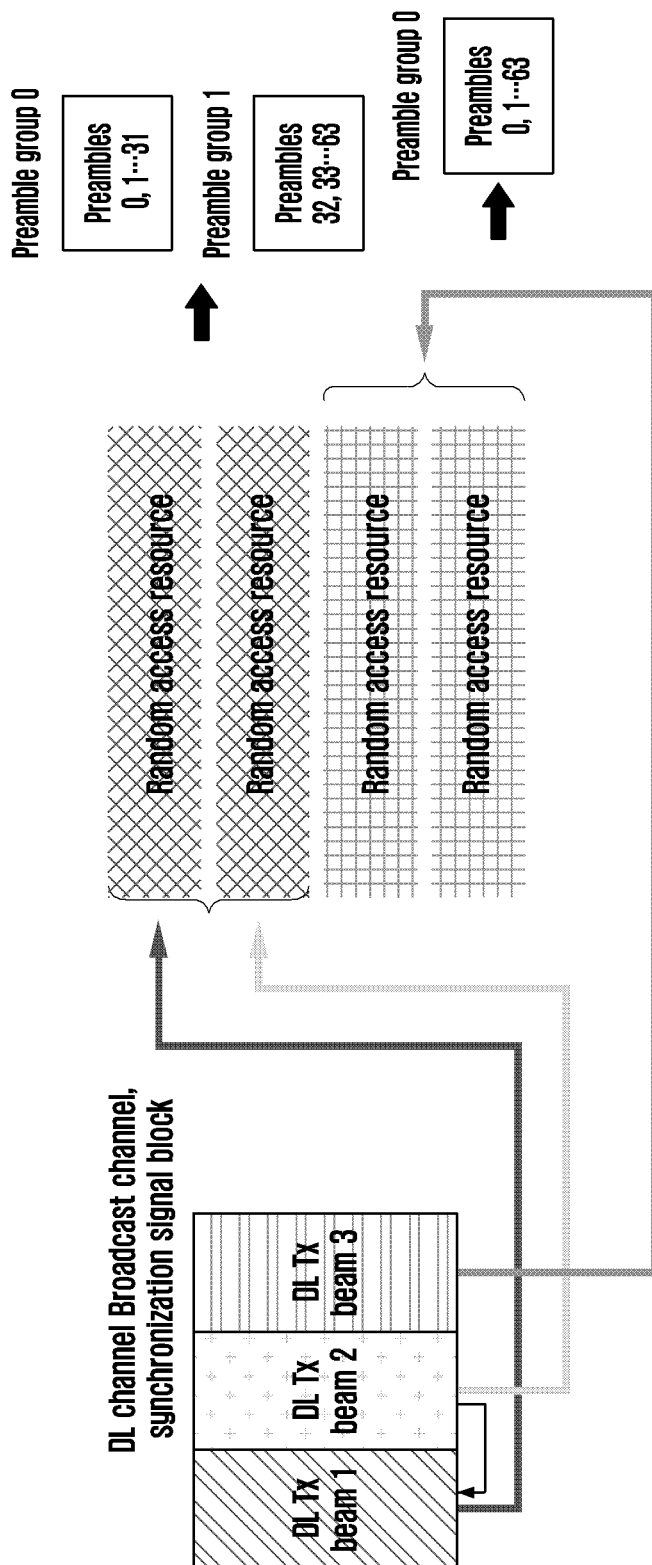
FIG. 13 is a diagram illustrating preamble groups corresponding to random access resources in embodiment four.

It should be noted that the "corresponding random access resource" may be that the random access resource, into which the one or multiple DL beams may be mapped. In different random access resources, into which the same random access preamble may be mapped, the same random access preamble may belong to different preamble groups. As shown in FIG. 13, in the random access resources corresponding to the DL transmission beams 1 and 2, the preamble set may be divided into two groups. The preamble 32 may belong to a preamble group 1, while in the random access resource corresponding to the DL transmission beam 3, the preamble set may be divided into one group and the preamble 32 may belong to a preamble group 0.

When the base station successfully detects a random access preamble, the base station may need to transmit a RAR for the random access preamble and may need to perform a scrambling operation using the RA-RNTI when transmitting the RAR. For instance, since the time locations (sub-frame index number) of the random access resources of the system are the same, different time locations may be used to calculate the RA-RNTI, that is, in the calculation provided by the above equation (1), t_id may be configured as 0. For instance, suppose that the frequency domain of the set random access resource of the system may have 6 PRBs, f_id may range from 0 to 5, that is, (0≤f_id<6), the RA-RNTI may be calculated using the above equation, i.e., RA-RNTI=1+f_id+6*pg_id.

RA-RNTI=1+3+6*1=10.

When the user detects that signal strength on the DL transmission beam 2 is max (that is, Reference Signal Receiving Power (RSRP) measured on the DL transmission beam 2 may be max), the user may select the random access time-frequency resource corresponding to the DL beam 2. The starting location of the random access time-frequency resource may be the third PRB in the frequency and may be transmitted using the preamble 32 selected from the preamble group 1, that is, f_id=3, pg_id=1. Finally, the base station may successfully detect the random access preamble 32 from the random access time-frequency resource, the starting location of which may be the third frequency domain location in the frequency domain, make a RAR to the preamble 32, and execute the scrambling using the RA-RNTI. Then, the value of the RA-RNTI may be RA-RNTI=1+3+6*1=10.

At the same time, the user may use a same generation mode to generate the same RA-RNTI value. Therefore, the corresponding Physical Downlink Control Channel (PDCCH) may be descrambled and possible RARs therein may be searched.

The grouping of the preambles and the indexing of the preambles in this embodiment may use that in the embodiment three. What are bound with the preamble groups may be the physical broadcast signals or synchronization signal blocks.

Embodiment Five

In the communication system, there may have time-domain's differences, but no frequency-domain's difference between different random access resources, which may be selected by the user. With regard to this kind of random access resource, a method for generating the RA-RNTI may be provided in this embodiment.

Figure 14:
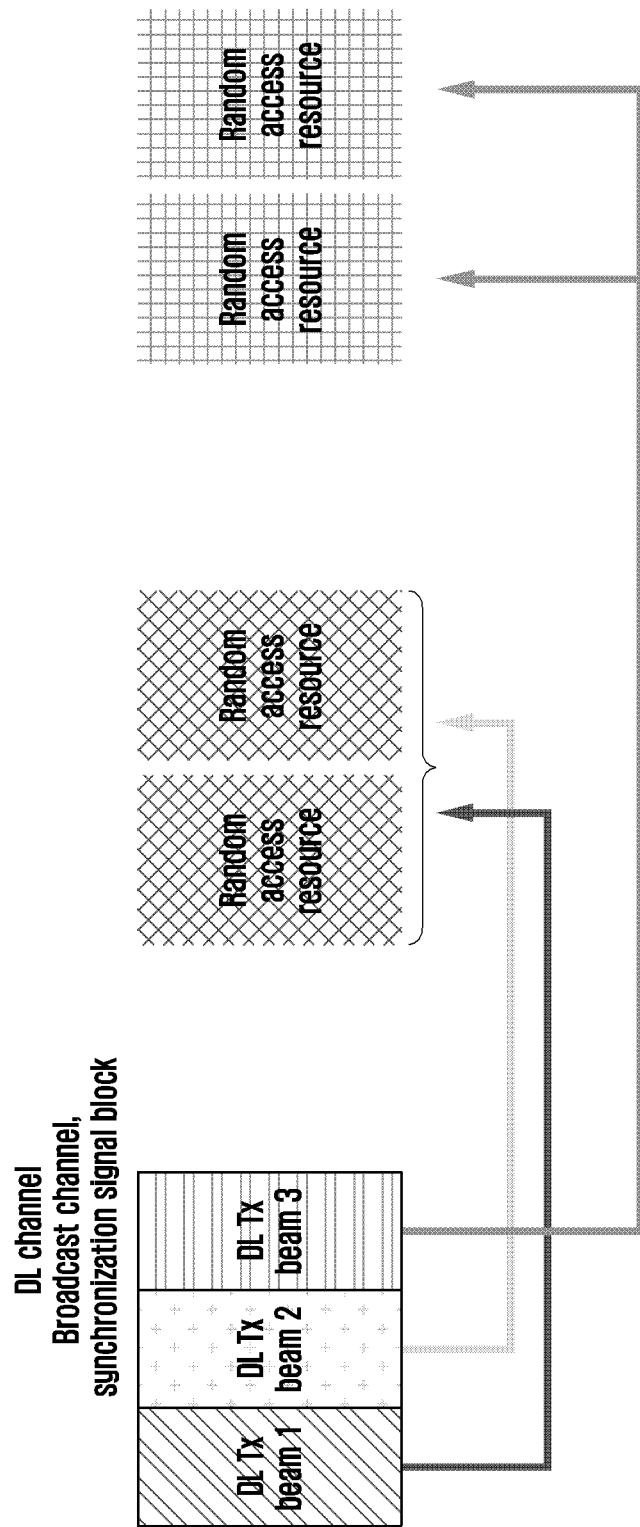
FIG. 14 is a diagram illustrating a mapping relationship between DL transmission beams and random access time-frequency resources in embodiment five.

The base station may send broadcast messages and synchronization signals via different DL transmission beams, while different DL transmission beams may be bound to designated random access resources. One situation may be that multiple DL transmission beams may be bound to the same random access time-frequency resource. As shown in FIG. 14, the DL transmission beam 1 and the DL transmission beam 2 may be mapped to the same random access time-frequency resource. Meanwhile, a special situation may be that when the system is configured with no random access resource of different frequency domain locations, that is, the random access time-frequency resources corresponding to the DL transmission beam may only differ on the time domain.

Then, different preamble sets may need to be grouped so that the base station may obtain the direction of the DL transmission beam selected by the user via the detection of the random access message 1. Suppose that X=64 available random access preambles may be set for the DL transmission beam 1 and DL transmission beam 2. The preamble set may be divided into two groups. Wherein, the group 0 may include A (A<64) preambles that may be bound with the DL transmission beam direction 1 and the group 1 may include B (B<64, A+B≤64) preambles that may be bound with the DL transmission beam direction 2. When a preamble detected by the base station on the corresponding random access resource belongs to the group 0, the base station may be implicitly notified of that the user transmitting the preamble may prefer the DL transmission beam 1. Similarly, when a preamble detected by the base station on the corresponding random access resource belongs to the group 1, the base station may be implicitly notified of that the user transmitting the preamble may prefer the DL transmission beam 2.

Figure 15:
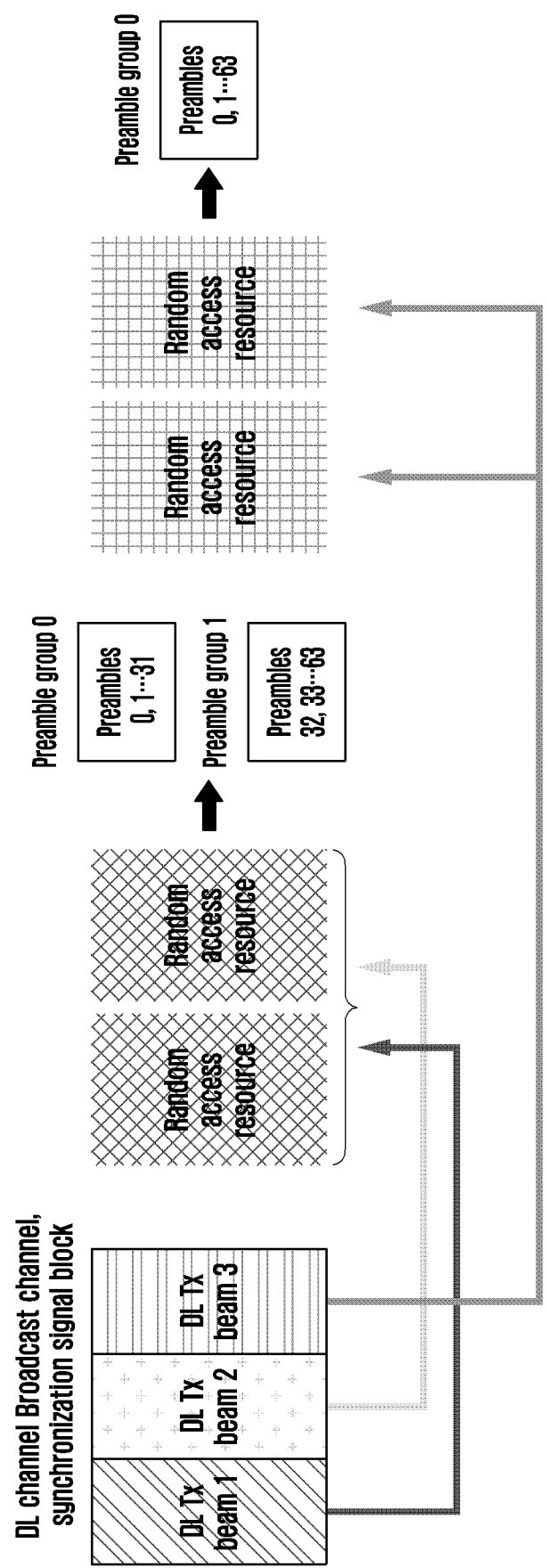
FIG. 15 is a diagram illustrating preamble groups corresponding to random access resources in embodiment five.

It should be noted that the "corresponding random access resource" may be that the random access resource, into which the one or multiple DL beams may be mapped. In different random access resources, into which the same random access preamble may be mapped, the same random access preamble may belong to different preamble groups. As shown in FIG. 15, in the random access resources corresponding to the DL transmission beams 1 and 2, the preamble set may be divided into two groups. The preamble 32 may belong to a preamble group 1, while in the random access resource corresponding to the DL transmission beam 3, the preamble set may be divided into one group and the preamble 32 may belong to a preamble group 0.

When the base station successfully detects a random access preamble, the base station may need to transmit a RAR for the preamble and may need to perform a scrambling operation using the RA-RNTI when transmitting the RAR. For instance, since the frequency domain locations (frequency domain index number) of the random access resource of the system are the same, different frequency domain locations may be used to calculate the RA-RNTI, that is, in the calculation provided by the above equation (1), f_id may be configured as 0. For instance, suppose that the configuration of the system may be that one radio frame may have 10 sub-frames, t_id may range from 0 to 9, that is, (0≤t_id<10), the RA-RNTI may be calculated using the above equation, i.e., RA-RNTI=1+t_id+10*pg_id.

When the user detects that signal strength on the DL transmission beam 2 is max (that is, Reference Signal Receiving Power (RSRP) measured on the DL transmission beam 2 may be max), the user may select the random access time-frequency resource corresponding to the DL beam 2. The starting location of the random access time-frequency resource may be the fifth sub-frame in the time domain and may be transmitted using the preamble 32 selected from the preamble group 1, that is, t_id=5, pg_id=1. Finally, the base station may successfully detect the random access preamble 32 from the random access time-frequency resource, the starting location of which may be the fifth sub-frame in the time domain, make a RAR to the preamble 32, and execute the scrambling using the RA-RNTI. Then, the value of the RA-RNTI may be RA-RNTI=1+5+10*1=16.

At the same time, the user may use a same generation mode to generate the same RA-RNTI value. Therefore, the corresponding Physical Downlink Control Channel (PDCCH) may be descrambled and possible RARs therein may be searched.

The grouping of the preambles and the indexing of the preambles in this embodiment may use that in the embodiment three. What are bound with the preamble groups may be the physical broadcast signals or synchronization signal blocks.

Embodiment Six

This embodiment may introduce a new method for generating the RA-RNTI based on the preamble index provided by the present disclosure via a specific flow. Specifically, in this embodiment, the preamble index may be taken as the preamble group index. In an alternative, it may be considered that when grouping the preambles, each available random access preamble may be grouped as one preamble group. In this situation, when the preamble group is bound with the DL transmission beam, one preamble group may be bound with one DL transmission beam or one preamble group may be bound with multiple DL transmission beams.

The base station may send broadcast messages and synchronization signals via different DL transmission beams, while different DL transmission beams may be bound to designated random access resources. One situation may be that multiple DL transmission beams may be bound to the same random access time-frequency resource. As shown in FIG. 7, the DL transmission beam 1 and the DL transmission beam 2 may be mapped to the same random access time-frequency resource.

Then, different preamble sets may need to be grouped so that the base station may obtain the direction of the DL transmission beam selected by the user via the detection of the random access message 1. Suppose that X=64 available random access preambles may be set for the Dl transmission beam 1 and DL transmission beam 2. The preamble set may be divided into two groups. Wherein, the group 0 may include A (A<64) preambles that may be bound with the DL transmission beam direction 1 and the group 1 may include B (B<64, A+B≤64) preambles that may be bound with the DL transmission beam direction 2. When a preamble detected by the base station on the corresponding random access resource belongs to the group 0, the base station may be implicitly notified of that the user transmitting the preamble may prefer the DL transmission beam 1. Similarly, when a preamble detected by the base station on the corresponding random access resource belongs to the group 1, the base station may be implicitly notified of that the user transmitting the preamble may prefer the DL transmission beam 2.

It should be noted that the "corresponding random access resource" may be that the random access resource, into which the one or multiple DL beams may be mapped. In different random access resources, into which the same random access preamble may be mapped, the same random access preamble may belong to different preamble groups. As shown in FIG. 7, in the random access resources corresponding to the DL transmission beams 1 and 2, the preamble set may be divided into two groups. The preamble 32 may belong to a preamble group 1, while in the random access resource corresponding to the DL transmission beam 3, the preamble set may be divided into one group and the preamble 32 may belong to a preamble group 0.

When the base station successfully detects a random access preamble, the base station may need to transmit a RAR for the preamble and may need to perform a scrambling operation using the RA-RNTI when transmitting the RAR. For instance, the system may have made a configuration that one radio frame may include 10 sub-frames, t_id may identify a sub-frame index and may range from 0 to 9, that is, (0≤t_id<10). The frequency domain of the random access resource may have 6 PRBs, f_id may identify a PRB index and may range from 0 to 5, that is, (0≤f_id<6). The calculation mode of the RA-RNTI may directly use the index of the preambles and this situation may be a special embodiment of the preamble grouping. That is, the total 64 preambles may be grouped into 64 groups, the 0th to 31th groups may indicate the DL transmission beam 1 (that is, the 0th to 31th groups may be bound with the DL transmission beam 1), the 32th to 63th groups may indicate the DL transmission beam 2 (that is, 32th to 63th groups may be bound with the DL transmission beam 2). Therefore, pg_id=preamble index, the calculation of RA-RNTI may be performed using equation (2), that is, RA-RNTI=1+t_id+ 10*f_id+60*preamble_id.

When the user detects that signal strength on the DL beam 2 is max (that is, Reference Signal Receiving Power (RSRP) measured on the DL transmission beam 2 may be max), the user may select the random access time-frequency resource corresponding to the DL beam 2. The starting location of the random access time-frequency resource may be the second sub-frame in the time domain and the third PRB in the frequency domain and may be transmitted using the preamble 32 selected from the preamble group, that is, t_id=2, f_id=3, preamble id=32. Finally, the base station may successfully detect the random access preamble 32 from the random access time-frequency resource, the starting location of which may be the second sub-frame in the time domain and the third frequency domain location in the frequency domain, make a RAR for the preamble 32, and execute the scrambling using the RA-RNTI. Then, the value of the RA-RNTI may be RA-RNTI=1+2+10*3+60*32=1952.

At the same time, the user may use a same generation mode to generate the same RA-RNTI value. Therefore, the corresponding Physical Downlink Control Channel (PDCCH) may be descrambled and possible RARs therein may be searched.

The grouping of the preambles and the indexing of the preambles in this embodiment may use that in the embodiment three. What are bound with the preamble groups may be the physical broadcast signals or synchronization signal blocks.

Embodiment Seven

The specific processing for generating the RA-RNTI using the method of the present disclosure in the EMTC system may be described in this embodiment.

When the user reads the configuration information of the random access via the DL channel, after obtaining the random access time frequency resources and the corresponding random access preamble (i.e., the random access preamble sequence) group, the random access preambles may be transmitted on the selected random access time frequency resources. After a period after the preambles are transmitted, the user may search a possible RAR according to length of a RAR window and the RAR may be indicated by the RA-RNTI. Different from the traditional calculation mode in the EMTC system, the calculation mode of the RA-RNTI provided by embodiments of the present disclosure may be associated with a time frequency resource location of a given Physical Random Access Channel (PRACH), an index (such as the index SFN_id of the first radio frame (index of the first radio frame of the given PRACH)) of a first first-time-unit, at which the PRACH may be located, and group indexes of available random access preamble groups on the PRACH.

The resource location of the PRACH may include an index (such as, the first radio frame index) of a first first-time-unit, at which the PRACH used by the transmitted random access preamble may be located, index information t_id (such as the sub-frame index) of a second time unit in the first time unit (such as radio frame), at which the PRACH may be located, and index information f_id of a starting frequency unit. The second time unit t_id in this embodiment may be the same as the t_id in the above embodiment, that is, t_id may be the index of the time unit or may be the combination of multiple different time unit indexes. For instance, when the t_id identifies the sub-frame, t_id may range from 0 to M, that is 0≤t_id<M+1. Wherein, f_id may be same as that in the above embodiment, such as, when the f_id identifies a Physical Resource Block (PRB) index of a PRB, f_id may range from 0 to N, and (0≤f_id<N+1). M and N may be nonnegative integers.

The group index of the random access preamble group may include pg_id of a random access preamble group, to which the transmitted random access preamble may belong. The random access preamble group may be only for random access time-frequency resources selected by the user and pg_id may range from 0 to P, (0≤pg_id<P+1), P is a nonnegative integer. It should be noted that since the preamble group may be used to notify the base station of the DL transmission beam selected by the user, the preamble group may be bound with the DL transmission beam. When the RA-RNTI is calculated, the preamble group index may be an index of a DL Transmission beam, or an index of a Synchronization Signal (SS) block, or an index of a Physical Broadcast Channel (PBCH). Further, besides directly grouping the preamble set, since the preamble set may be formed by different preamble root sequence groups, or formed by the preamble sequence and different Orthogonal Cover Codes (OCC)s, or formed by the preamble sequence and different Cyclic Shifts (CS)s. Therefore, the preamble group indexes may be different root sequence group indexes, OCC indexes or different CS indexes.

The calculation mode of the RA-RNTI may include:

$$\text{RA-RNTI}=1+a*t\_id+b*f\_id+c*(SFN\_id \bmod(W\max/10))+d*pg\_id.$$

Wherein, a, b, c, d may respectively be coefficients of t_id, f_id, (SFN_id mod(Wmax/10)) and pg_id. Values of a, b, c and d should satisfy a condition, that is, the RA-RNTI should only correspond to the value of {t_id, f_id, (SFN_id mod(Wmax/10)), pg_id}. The only value of the RA-RNTI may be calculated from the value of a group of {t_id, f_id, $$\left(SFN_{id}\bmod\left(\frac{W\max}{10}\right)\right),$$

pg_id}. On the contrary, the only value of {t_id, f_id, (SFN_id mod(Wmax/10)), pg_id} may be calculated from the value of the RA-RNTI. A feasible scheme may be that the value of a may be 1, the value of b may be the maximum value of (1+a*t_id), the value of c may be the maximum value of (1+a*t_id+b*f_id), the value of d may be the maximum value of (1+a*t_id+b*f_id+c*(SFN_id mod (Wmax/10))). Wmax may be the length of the maximum possible RAR window of the user, such as, Wmax=400, (SFN_id mod(Wmax/10)) may range from 0 to 39. That is, $$a=1,$$

$$b=\max\{1+a*t\_id\}=M+1,$$

$$c=\max\{1+a*t\_id+b*f\_id\}=(M+1)(N+1),$$

$$d=\max\{1+a*t\_id+b*f\_id+c*(SFN\_id \bmod(W\max/10))\}=(M+1)(N+1)*(W\max/10)$$

For instance, M=9, N=5, Wmax=400; the calculation mode of the RA-RNTI may be:

$$\text{RA-RNTI}=1+t\_id+10*f\_id+60*(SFN\_id \bmod(40))+2400*pg\_id.$$

Embodiment Eight

The specific processing for generating the RA-RNTI using the method of the present disclosure in the Narrow Band Internet of Things (NB-IOT) system may be described in this embodiment.

When the user reads the configuration information of the random access via the DL channel, after obtaining the random access time frequency resources and the corresponding random access preamble (i.e., the random access preamble sequence) group, the random access preambles may be transmitted on the selected random access time frequency resources. After a period after the preambles are transmitted, the user may search a possible RAR according to length of a RAR window and the RAR may be indicated by the RA-RNTI. Different from the traditional calculation mode in the NB-IOT system, the calculation mode of the RA-RNTI provided by embodiments of the present disclosure may be associated with an index (such as the index SFN_id of the first radio frame (index of the first radio frame of the given PRACH)) of a first first-time-unit, at which a given PRACH may be located, and group indexes of available random access preamble groups on the PRACH.

The index of the random access preamble group may include pg_id of a random access preamble group, to which the transmitted random access preamble may belong. The random access preamble group may be only for random access time-frequency resources selected by the user and pg_id may range from 0 to P, (0≤pg_id<P+1), P is a nonnegative integer. It should be noted that since the preamble group may be used to notify the base station of the DL transmission beam selected by the user, the preamble group may be bound with the DL transmission beam. When the RA-RNTI is calculated, the preamble group index may be an index of a DL Transmission beam, or an index of a Synchronization Signal (SS) block, or an index of a Physical Broadcast Channel (PBCH). Further, besides directly grouping the preamble set, since the preamble set may be formed by different preamble root sequence groups, or formed by the preamble sequence and different Orthogonal Cover Codes (OCC)s, or formed by the preamble sequence and different Cyclic Shifts (CS)s. Therefore, the preamble group indexes may be different root sequence group indexes, OCC indexes or different CS indexes.

The calculation method of the RA-RNTI may include:

$$\text{RA-RNTI}=1+a*\text{floor}(SFN\_id/4)+b*pg\_id$$

The value of floor(x) may be the largest integer, a and b may respectively be coefficients of floor(SFN_id/4) and pg_id, values of a and b should satisfy a condition, that is, the value of RA-RNTI should only correspond to that of the {floor(SFN_id/4), pg_id}. The only value of RA-RNTI may be calculated from the value of a group of {floor(SFN_id/4), pg_id}. On the contrary, the only value of the {floor (SFN_id/4), pg_id} may be calculated from the value of the RA-RNTI. A feasible scheme may be that the value of a may be 1, the value of b may be the maximum value of (1+a*floor(SFN_id/4)).

$$a=1,$$

$$b=\max\{1+a*\text{floor}(SFN\_id/4)\}=\text{floor}(SFN\_id/4)+1,$$

For instance, $SFN_{id}$=1024; the calculation method of the RA-RNTI may include:

$$\text{RA-RNTI}=1+\text{floor}(SFN\_id/4)+257*pg\_id.$$

Embodiment Nine

In the above embodiment, the calculation method of the RA-RNTI in embodiments of the present disclosure may be described by setting the t_id as the sub-frame index and setting the f_id as the PRB index. In this embodiment, the setting of extending t_id may be determined according to multiple time unit indexes, such as determined according to multiple of a sub-frame index, slot index, mini-slot index, symbol-group index and symbol index. The setting of extending f_id may be determined according to multiple frequency unit indexes, such as multiple of a PRB-group index, a PRB index, a subcarrier index and a subcarrier group index.

For instance, when the t_id represents index information of a timeslot, the index information may be a timeslot index value, or the index information may be determined according to the timeslot index and sub-frame index. When the index information is determined according to the timeslot index and sub-frame index, the sub-frame index t_sf ranges from 0 to M_1, and a timeslot index t_slot in a sub-frame ranges from 0 to M_2, the value of t_id may be t_id=t_slot+ (1+M_2)*t_sf and may range from 0 to M_1+(1+M_1) *M_2. In corresponding other embodiments, the maximum value of t id may be M=M_1+(1+M_1)*M_2. Preferably, there may be a one-to-one corresponding relationship between the value of t_id and the value of {t_sf, t_slot}. That is, the only value of {t_sf, t_slot} may be calculated from one t_id, vice versa. For instance, when M_1=9, M_2=1, t_id=t_slot+2*t_sf. For instance, when the value of t_id is 28, it may be calculated that t_slot=0, t_sf=14. When index combination of other time unit indexes is adopted, the setting of the t_id may be similarly calculated. Suppose that the t_id is formed by a (t_1) index, a (t_2) index, a (t_X) index, and value scopes thereof may respectively be 0–M_1, 0–M_2 . . . 0–M_X, the setting of t_id may be t_id=a1*t_1+ a2*t_2+ . . . +ax*t_X.

wherein, $a1=1;$ $a2=1+\max\{t\_1\}=1+M\_1;$ $a3=1+\max\{t\_1+a2*t\_2\}=(1+M\_1)(1+M\_2);$

. . .

$ax=1+\max(t\_1+a2*t\_2+ \ldots +(ax-1)*t\_(X-1)).$

Similarly, for instance, when the f_id represents the index information of the PRB and the index information may be the subcarrier index. In an alternative, the f_id may be determined according to the subcarrier index and PRB index f_prb. When the f_id is determined according to the subcarrier index and the PRB index, the ranging scope of the PRB index may be 0 to N_1. While the ranging scope of the subcarrier index in one PRB may be 0 to N_2, the value of f_id may be fl_id=f_sc+(1+N_2)*f_prb and the ranging scope of f_id may be o to N_1+(1+N_1)*N_2. In other corresponding embodiments, the maximum value of f_id may be N=N_1+(1+N_1)*N_2. Preferably, there may be a one-to-one corresponding relationship between the value of f_id and the value of {f_sc,f_prb}. That is, the only value of {f_sc,f_prb} may be calculated from one t_id, vice versa. For instance, when N_1=5, N_2=11, f_id=f_sc+12*f_prb. For instance, when the value of f_id is 42, it may be calculated that f_sc=6,f_prb=3. When index combination of other frequency unit indexes is adopted, the setting of the f_id may be similarly calculated. Suppose that the f_id is formed by a (f_1) index, a (f_2) index, . . . a (f_Y) index, and value scopes thereof may respectively be 0–N_1, 0–N_2 . . . 0–N_Y, the setting of f_id may be f_id=b1*f_1+ b2*f_2+ . . . +by*f_Y.

wherein $b1=1;$ $b2=1+\max\{f\_1\}=1+N\_1;$ $b3=1+\max\{f\_1+b2*f\_2\}=(1+N\_1)(1+N\_2);$

. . .

$by=1+\max(f\_1+b2*f\_2+ \ldots +(by-1)*f\_(Y-1)).$

Figure 16:
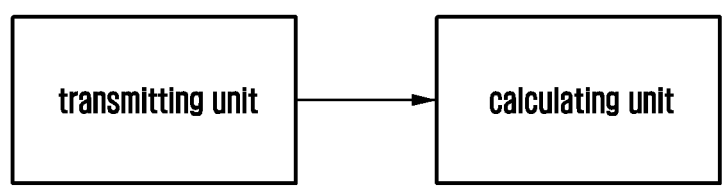
FIG. 16 is a diagram illustrating basic structure of a UE for generating information in accordance with an embodiment of the present disclosure.

The above may be specific implementation of the information generation methods in the present disclosure. Embodiments of the present disclosure may further provide a UE for generating the information and a base station for generating the information, which may be used to implement the information generation method. FIG. 16 is a schematic diagram illustrating structure of the UE for generating the information. As shown in FIG. 16, the device may include: a transmitting unit and a calculating unit.

The transmitting unit may be to send a random access preamble to a base station. The calculating unit may be to calculate a Random Access-Radio Network Temporary Identifier (RA-RNTI) according to an index of a preamble group, to which the transmitted random access preamble belongs, and a resource location of a random access resource bearing the random access preamble; wherein the preamble group may be a group of available random access preambles corresponding to the random access resource.

Figure 17:
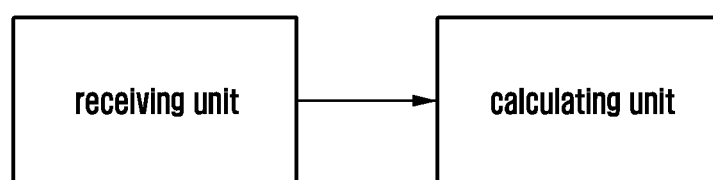
FIG. 17 is a diagram illustrating basic structure of a base station for generating information in accordance with an embodiment of the present disclosure.

FIG. 17 is a schematic diagram illustrating structure of a base station for generating information. As shown in FIG. 17, the device may include: a receiving unit and a calculating unit.

The receiving unit may be to receive a random access preamble from a User Equipment (UE). The calculating unit may be to calculate a Random Access-Radio Network Temporary Identifier (RA-RNTI) according to an index of a preamble group, to which the received random access preamble belongs, and a resource location of a random access resource bearing the random access preamble. The preamble group may be a group of available random access preambles corresponding to the random access resource.

It can be seen from the above that in the information generation method and device provided by embodiments of the present disclosure, the RA-RNTI may be calculated and generated using time-frequency resource locations used by the random access and an index of a group, at which the selected preamble may be located. Therefore, when the user searches the possible RARs, RARs that use the same time-frequency resource and belong to different preamble groups may be automatically excluded via the generated RA-RNTI to save users' search overhead and delay. While the base station may distinguish and select users of different DL transmission beams using different RA-RNTIs in the RAR via the detected random access preambles. Meanwhile, the generation method may be applied to the eMTC and NBIot systems.

Embodiment Ten

In this embodiment, a random access method for a UE will be described. Specifically, a method for reporting a number of beams that the UE has by the UE in a random access procedure will be introduced in combination with a specific system. In this embodiment, in the random access procedure, a Message 3 carries information on the number of the beams that the UE has. Specific procedure of the random access method of the UE is as follows.

Step 0: The UE obtains a random access configuration information, including a random access channel configuration and a preamble sequence resource pool information, in a System Information Block (SIB).

Step 1: The UE determines a random access channel and a preamble sequence according to the random access channel configuration and the preamble sequence resource pool information, and transmits the preamble sequence on the random access channel. The preamble sequence is randomly selected from a preamble sequence resource pool configured by the base station in an equal probability.

Step 2: After transmitting the preamble sequence, the UE detects a random access response in a random access response window. If the random access response is successfully detected and a preamble sequence identifier matching the transmitted preamble sequence is detected in the random access response, it is considered that the random access response is successfully detected, and information on an uplink grant, a timing advance, a Temporary Cell-Radio Network Temporary Identifier (TC-RNTI), etc, for the Message 3 are obtained from the random access response. If the random access response is not successfully detected in the random access response window or the preamble sequence identifier detected in the random access response does not match the transmitted preamble sequence, it is considered that this random access is not successful, the random access attempt is repeated after a power or transmitting beams are adjusted.

Step 3: If the random access response is successfully detected and the preamble sequence identifier matching the transmitted preamble sequence is detected in the random access response, the UE transmits the Message 3 on a time-frequency resource specified by the uplink grant. Wherein the message 3 includes an unique identifier of the UE and an indication of the number of beams that the UE has.

Step 4: After transmitting the Message 3, the UE detects contention resolution information. If the unique identifier of the UE included in the contention resolution information matches the unique identifier of the UE, the contention resolution of the UE is successful and the random access succeeds. If the Message 3 fails to be sent or the unique identifier of the UE included in the contention resolution information does not match the unique identifier of the UE, the contention resolution of the UE is failed, and the random access is reattempted after the power or the transmitting beams is adjusted.

In an embodiment, if the contention resolution succeeds, the UE detects user-specific CSI-RSs or SRSs information configured by the base station, and receives the configured CSI-RSs or SRSs. The CSI-RSs or SRSs are configured for the UE by the base station according to an indication of the number of beams reported by the UE.

Correspondingly, behaviors at the base station side can be described as follows.

Step 0: The base station transmits the random access configuration information, which includes the random access channel configuration and the preamble sequence resource pool information, in the system information block (SIB).

Step 1: The base station detects the transmission of the preamble sequence on the configured random access channel.

Step 2: If the base station detects the transmission of the preamble sequence, the base station determines various parameters in the random access response according to the detected preamble sequence, information on delay of the detected preamble sequence, and etc., and transmits the random access response on a downlink shared channel at a fixed or configured timing after detecting the random access channel of the preamble sequence.

Step 3: After transmitting the random access response, the base station detects the Message 3 on an uplink shared channel indicated by the resource allocation information in the uplink grant allocated in the random access response, and obtains the number of beams that the UE has in the Message 3.

Step 4: The base station transmits the contention resolution information according to a competition result.

Figure 18:
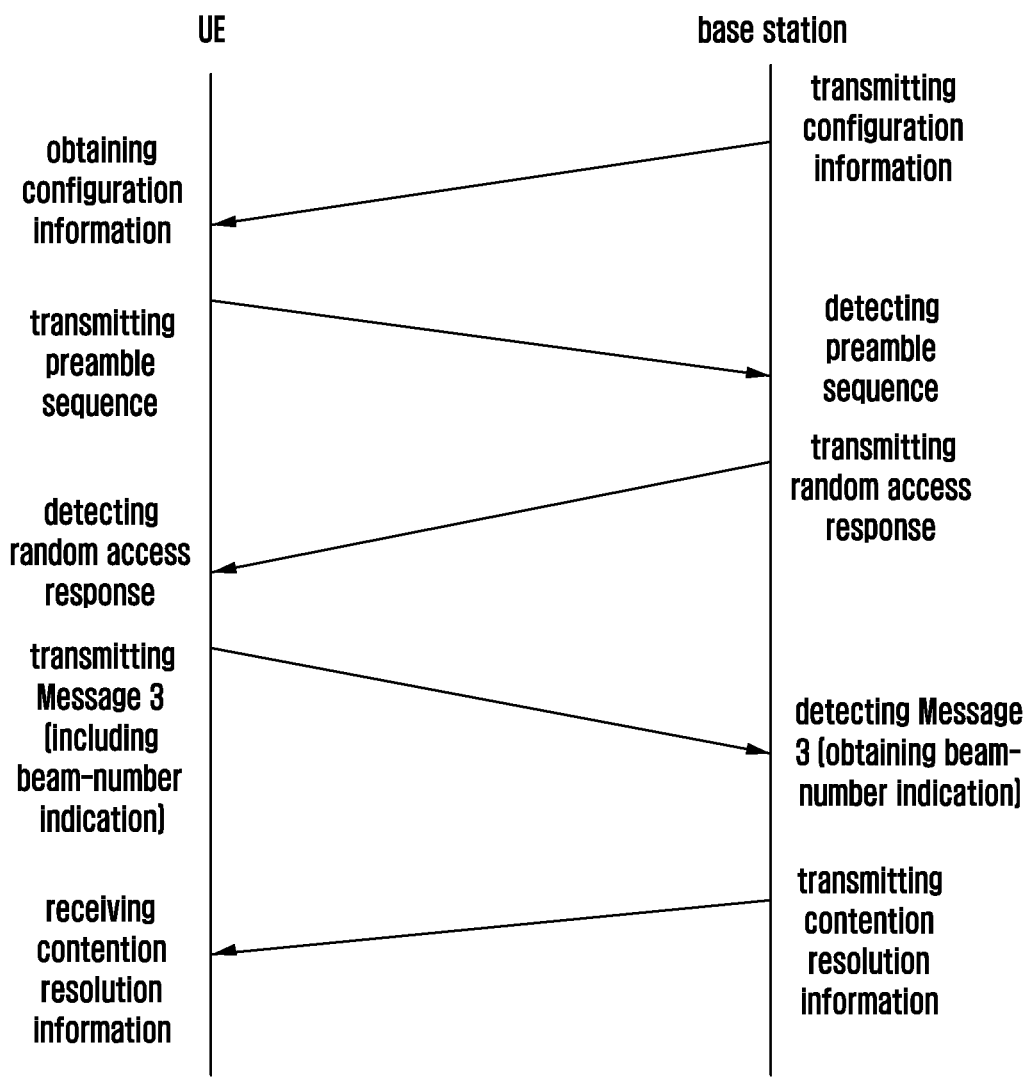
FIG. 18 shows a process of interaction between a base station and a UE in Embodiment ten.

The above process may be described using FIG. 18. FIG. 18 shows a process of an interaction between a base station and a UE in the embodiment 1.

Figure 32:
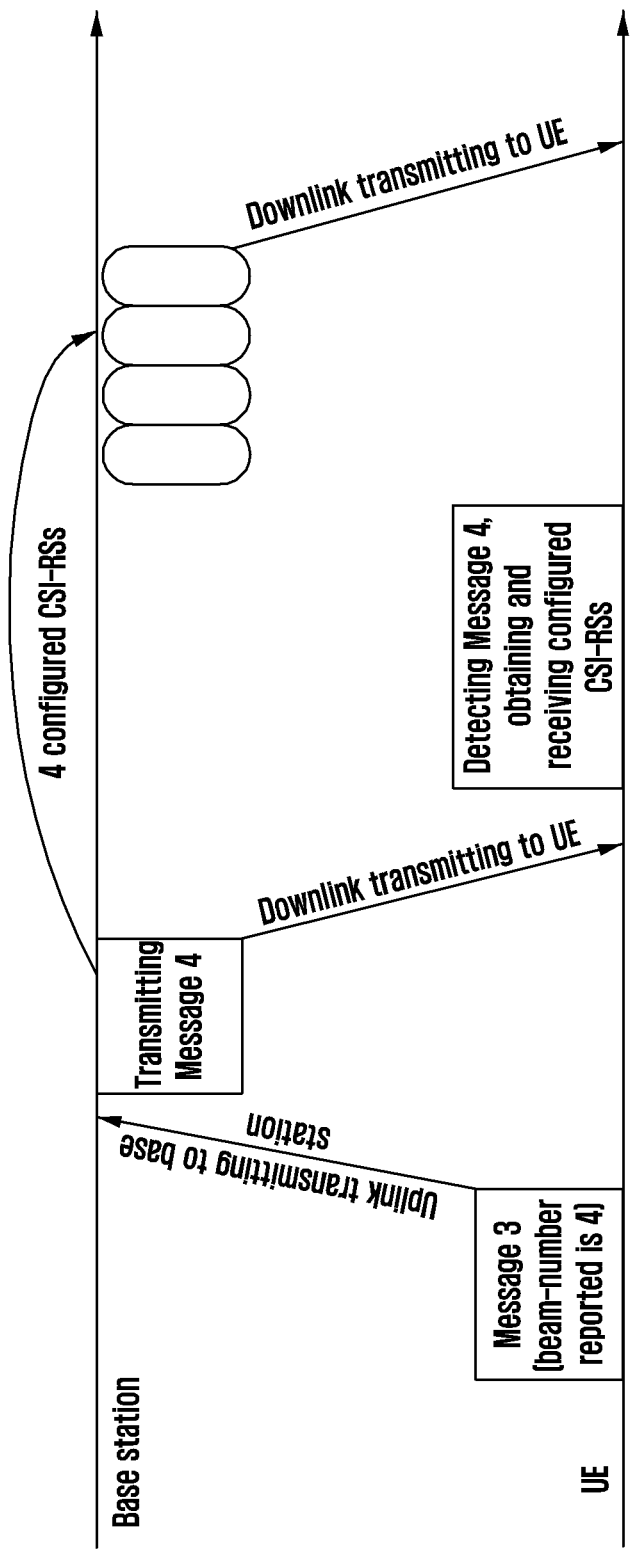
FIG. 32 is a schematic diagram of configuring a CSI-RS by a base station according to a reported beam number.

In another embodiment, in the above step 4, the base station may include the contention resolution information together with the CSI-RSs or SRSs configured for the UE in a Message 4 and transmit the Message 4 to the UE. Specifically, the base station configures the UE with the CSI-RSs or SRSs corresponding to the beam-numbers of the UE, according to the beam-numbers of the UE detected in the Message 3. FIG. 32 is an example diagram illustrating CSI-RSs configured by the base station according to the reported beam-numbers. As shown in FIG. 32, if the number of beams reported by the UE in Message 3 is 4, the base station configures 4 CSI-RSs or SRSs corresponding to the beam-numbers 4 of UE for the UE, wherein the number of the CSI-RSs or SRSs indicates a number of times that the same CSI-RS or SRS is repeatedly transmitted on time-frequency resources. Wherein, 1. The base station may use different beams to transmit the configured CSI-RSs for a downlink beam management or correction; or 2. The base station may use the same beam to transmit the configured CSI-RS for an uplink beam management or correction.

In still another embodiment, the base station may further notify the CSI-RSs or SRSs configured for the UE through the downlink channel (a downlink control channel or a downlink shared channel) for the uplink/downlink beam management or correction, after the random access is completed, The number of the CSI-RSs or SRSs configured by the base station is determined according to the beam-number of the UE reported by the UE in Message 3.

In the above random access procedure, an indication of the beam-number of the UE is added in the Message 3. The indication of the beam-number is used to inform the base station of the number of the beams that the UE has. A possible manner is that the indication of the beam-number is indicated by N (N>0) bit indication information, for example, if N=4, the UE may notify the base station of possible 0 to 15 beams that the UE (for example, the UE) has by reporting 16 values of 0000 to 1111. The indication of the beam-number is determined according to a maximum number of the beams that the UE has or a maximum number of the beams which can be processed by the base station. For example, a particular type of the UE has very a very strong beam capability and has 128 beams, but the maximum number of the beams which can be processed by the base station is 32, then the number of bits indicated in a preset indication of the beam-number is 5. A possible indication manner is as shown in Table 1, assuming that N=3, that is, the indication of the beam-number has 3 bits:

TABLE 1

| Exemplary Beam Number Capability Indication (beginning from 0) | |
| --- | --- |
| Bit indication | Meaning of Value (Number of Beams) |
| 000 | 0 |
| 001 | 1 |
| 010 | 2 |
| 011 | 3 |
| 100 | 4 |
| 101 | 5 |
| 110 | 6 |
| 111 | 7 |

In another case, by default, a user has a capability of at least one beam, and another meaning of the values of the exemplary table of the indication of the beam-number may be 1 to 2 N beams, that is, if N=3, there are 1 to 8 beams, as shown in Table 2.

TABLE 2

Exemplary Beam Number Capability Indication (beginning from 1)

| Bit Indicaion | Meaning of Value (Number of Beam) |
|---|---|
| 000 | 1 |
| 001 | 2 |
| 010 | 3 |
| 011 | 4 |
| 100 | 5 |
| 101 | 6 |
| 110 | 7 |
| 111 | 8 |

The configuration (number of bits) of the indication of the beam-number may be:
1. a preset fixed value;
2. notified through a downlink control channel;
3. notified through a downlink shared channel;
4. notified through a broadcast channel; or
5. carried in the random access configuration information in the system information and notified to the UE.

The foregoing Message 3 carries the beam number indication in the following manners.

Manner 1: In the Message 3, a new field is directly added for transmitting the indication of the beam-number. That is, when the random access procedure is used for an initial access, the Message 3 includes at least the beam number indication, an RRC connection request, etc. In this manner, a structure of the Message 3 transmitted on the uplink shared channel is shown in FIG. 19, and FIG. 19 is the structure of the Message 3 adopting the manner 1.

Figure 19:
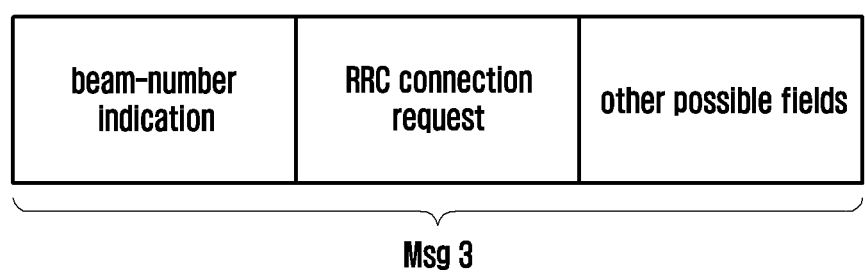
FIG. 19 shows the structure of Message 3 using Mode 1.

It should be noted that, the structure shown in FIG. 19 is only an example, and actual positions of respective field may change.

Manner 2: A new field is added to the RRC connection request in the Message 3 to notify the beam-number capability of the UE. The existing RRC connection requests include: a UE identity information (ue-Identity), an establishment cause information (establishmentCause), and reserved fields. The UE identity information is selected from two values: a s-TMSI of the UE or a random value. The establishment cause information includes: emergency, high priority access (highPriorityAccess), mobile UE access (mt-Access), mobile originating signaling(mo-signaling), mobile originating data (mo-data), delay tolerant access (delayTolerantAccess-v1020), mobile originating voice communication (mo-VoiceCall-v1280), etc.

Based on these fields, the indication of the beam-number is added. For example, one possible parameter for the indication of the beam-number is ue-beamNum, represented by BIT STRING of N bits.

In the foregoing manner, the RRC connection request is written as follows, where the value of N is the number of bits of the indication of the beam-number:

```
RECConnectionRequest ::=    SEQUENCE {
    ue-Identity                 InitialUE-Identity,
    establishmentCause          EstablishmentCause,
    ue-beamNum                  BIT STRING (SIZE (N) )
    spare                       BIT STRING (SIZE (1) )
}
InitialUE-Identity ::=      CHOICE {
    s-TMSI                      S-TMSI,
    randomValue                 BIT STRING (SIZE (40) )
}
EstablishmentCause ::=      ENUMERATED {
                                emergency, highPriorityAccess,
                                mt-Access, mo-Signalling,
                                mo-Data, delayTolerantAccess-v1020,
                                mo-VoiceCall-v1280, spare1)
```

This embodiment provides an apparatus for random access of a UE, wherein the apparatus explicitly notifies abeam-number of a UE by using a Message 3, and the apparatus comprises the following modules:

a configuration information obtaining module for obtaining random access configuration information carried in a main information block in a broadcast channel or a system information block indicated by the main information block;

a preamble sequence transmitting module for determining a random access channel and a preamble sequence according to the random access configuration information, and transmitting the preamble sequence on the random access channel;

a random access response detection module for detecting a random access response transmitted by a base station;

a Message 3 generating and transmitting module for generating and transmitting a Message 3 according to the detected random access response and an indication of the number of beams that the UE has, wherein the Message 3 includes the indication of the number of the beams that the UE has; and a contention resolution receiving module for receiving contention resolution information and completing a random access procedure.

In addition, the contention resolution receiving module may further receive CSI-RS or SRS signals configured by the base station. The number of the CSI-RS or SRS signals configured by the base station is determined according to the number of the beams that the UE has, which is reported by the UE in the Message 3.

Wherein the preamble sequence transmitting module determines the random access channel and the preamble sequence according to the random access channel configuration and the preamble sequence resource pool information, and transmits the preamble sequence on the random access channel.

Wherein the transmitted preamble sequence is randomly selected at an equal probability by the preamble sequence transmitting module from the preamble sequence resource pools configured by the base station.

Wherein if the random access response is successfully detected and a preamble sequence identifier matching the transmitted preamble sequence is detected in the random access response, the Message 3 generating and transmitting module generates and transmits the Message 3 on a time-frequency resource designated by an uplink grant.

Figure 20:
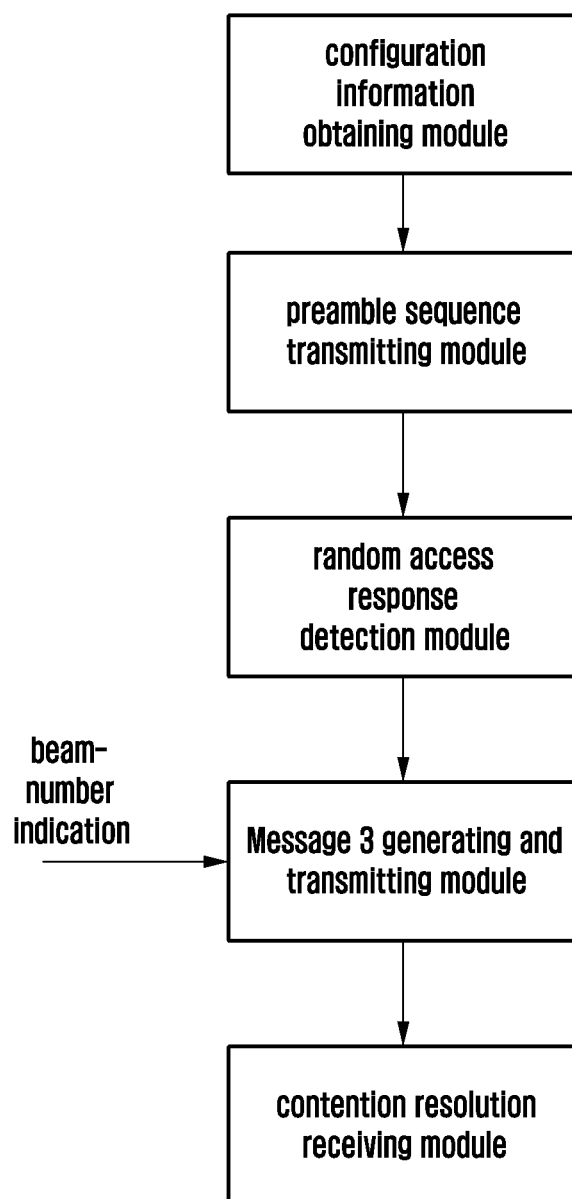
FIG. 20 is a schematic diagram of an apparatus for random access of a UE in Embodiment ten.

The apparatus for random access of a UE provided in this embodiment is as shown in FIG. 20, and FIG. 20 is a schematic diagram for the apparatus for random access of a UE in Embodiment ten.

This embodiment provides an apparatus for random access of a base station, where the apparatus obtains a beam number indication of a UE by detecting a Message 3, where the apparatus comprises the following modules:

a random access resource configuration transmitting module for transmitting a random access resource configuration information in a main information block in a broadcast channel or the system information block indicated by the main information block, the random access resource configuration information including a configured random access channel resource and a random access preamble sequence resource;

a preamble sequence detection module for detecting a possible transmitted preamble sequence on the random access channel according to the configured random access configuration information;

a random access response transmitting module for generating and transmitting a random access response for the detected random access preamble sequence, wherein the uplink grant of the Message 3 is configured;

a Message 3 detection module for detecting a possible Message 3 transmission according to the configured uplink grant of the Message 3, wherein the Message 3 contains an indication of the number of beam that the UE has; and a contention resolution transmitting module for generating and transmitting contention resolution information if the Message 3 is successfully detected, and completing the random access procedure.

In addition, the contention resolution transmitting module may also transmit CSI-RSs or SRSs configured for the UE. The number of the CSI-RSs or SRSs configured by the base station is determined according to the indication of the number of the beams of the UE that the UE reports in the Message 3.

Figure 33:
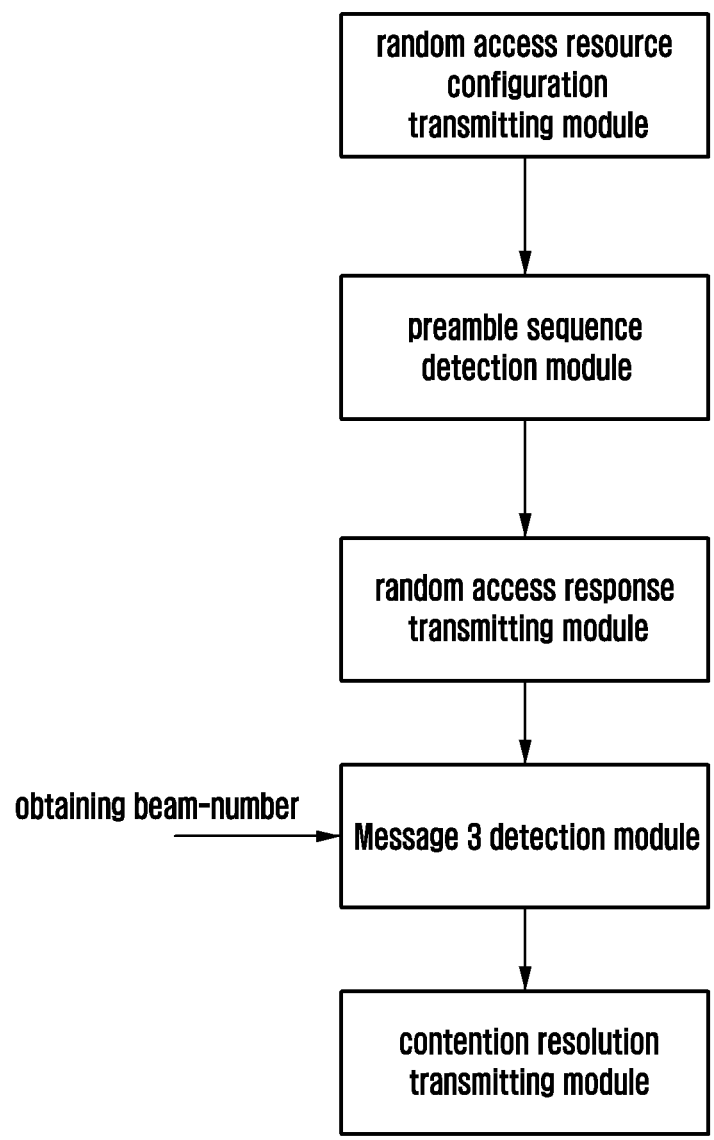
FIG. 33 is a schematic diagram of an apparatus for random access of a base station according to this embodiment.

An apparatus for random access of a base station provided in this embodiment is shown in FIG. 33, and FIG. 33 is a schematic diagram of an apparatus for random access of a base station provided in this embodiment.

Embodiment Eleven

In this embodiment, a method for random access of a UE is described. Specifically, a method for notifying the number of the beams of the UE (or the UE) in a random access procedure will be introduced in combination with a specific system. In this embodiment, the number of the beams of the UE is implicitly notified by a used random access resource(s).

The system pre-defines that a maximum number of the beams that the UE can support or the system can process is M, and M>0. According to M, the base station divides the random access resources (including the random access channel time-frequency resources and the random access preamble sequences) into M mutually-disjoint resources.

Figure 21:
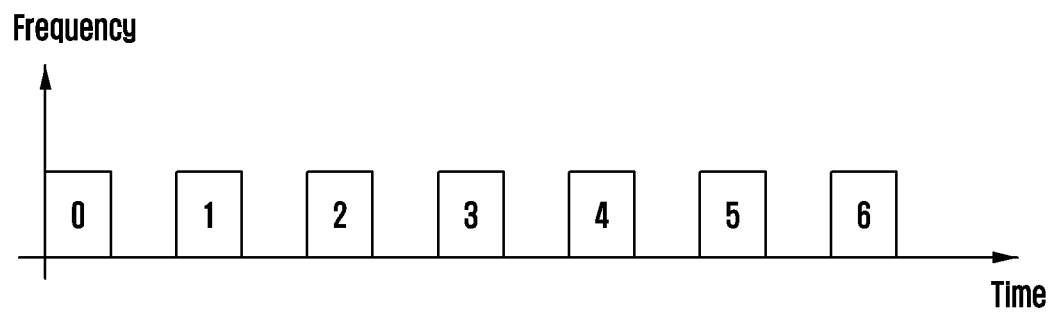
FIG. 21 is a schematic diagram of a possible resource allocation (time domain distinction).
Figure 22:
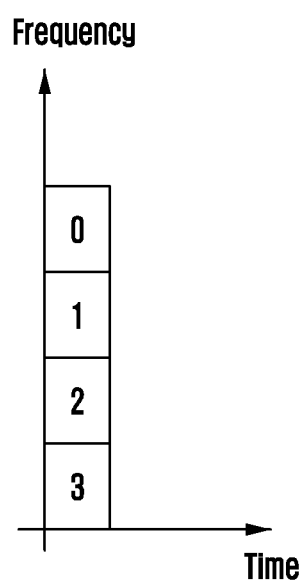
FIG. 22 is a schematic diagram of a possible resource allocation (frequency domain distinction).
Figure 23:
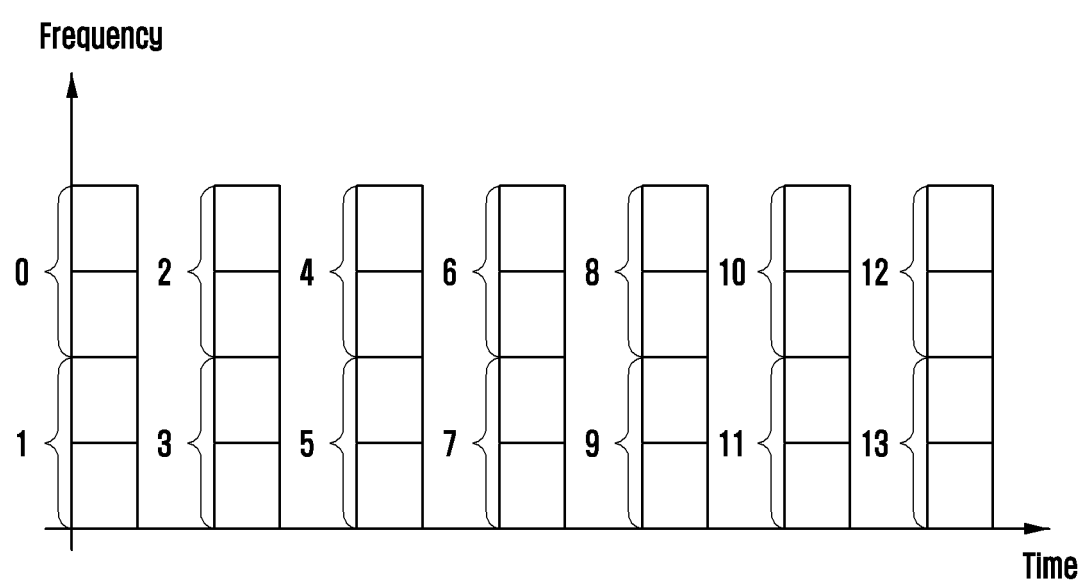
FIG. 23 is a schematic diagram of a possible resource allocation (time-frequency distinction).

Division of the Random access resource includes following two types:

1. The random access channel time-frequency resources are divided into M non-overlapping subsets, each of which corresponds to one of the beam-numbers. The base station notifies the UE of the M subsets of random access channel time-frequency resources through the broadcast channel, the main information block in the broadcast channel, or the system information block indicated by the main information block in the broadcast channel. With this type of resource division manner, a system resource allocation may be distinguished as follows.

a) In the time domain, as shown in FIG. 21. FIG. 21 is a possible resource allocation diagram (time domain distinction). M=7 non-overlapping time-frequency resources correspond to 0 to 6 beams respectively. For the UE, when the beam-number of the UE is between 0 and 5, the time-frequency resource corresponding to the beam-number of the UE is directly selected, and when the beam-number of the UE is 6 or more, the time-frequency resource corresponding to the beam-number 6 is selected.

b) In the frequency domain, as shown in FIG. 22. FIG. 22 is a possible resource allocation diagram (frequency domain distinction). M=4 non-overlapping time-frequency resources correspond to 0 to 3 beams respectively. Similarly, when the beam-number of the UE is between 0 and 2, the time-frequency resource corresponding to the beam-number of the UE is directly selected, and when the beam-number of the UE is 3 or more, the time-frequency resource corresponding to the beam-number 3 is selected.

c) In both time and frequency domains, as shown in FIG. 23. FIG. 23 is a schematic illustration of possible resource allocation (time-frequency distinction). M=14 non-overlapping time-frequency resources represent 0 to 13 beams, respectively. Similarly, when the beam-number of the UE is between 0 and 12, the time-frequency resource corresponding to the beam-number is directly selected, and when the beam-number of the UE is 13 or more, the time-frequency resource corresponding to the beam-number 13 is selected. Especially, the time-frequency resources corresponding to the respective beams may have different sizes.

It should be noted that, when the with different numbers of beams are distinguished by the time-frequency resources, the UEs with different numbers of beams may use the same preamble sequence resource pool, which is also called a preamble sequence resource set.

2. The random access preamble sequence pool (also referred to as preamble sequence resource pool or preamble sequence resource set) is divided into M disjoint subsets, each subset corresponding to one beam-number. The base station notifies the UE of the M subsets of the preamble sequences through the broadcast channel, the main information block in the broadcast channel, or the system information block indicated by the main information block in the broadcast channel. Possible notification methods are as follows.

a) The index range of possible preamble sequences in each preamble sequence subset is notified by indicating a starting preamble sequence index of the first subset and a number of the preamble sequences in each subset. A number of the subsets, NBN, may also be notified together with the configuration of the preamble sequence subset. FIG. 24 shows a possible notification method, and FIG. 24 shows a possible preamble sequence resource pool configuration and notification method. In FIG. 24, contents in the dashed box, that is, the number of the subsets, M, may be notified together with the preamble sequence resource pool information, or may be separately notified in the random access configuration information.

b) The index range of the possible preamble sequences in each preamble sequence subset is notified by indicating the starting preamble sequence index of each subset and a total number of the preamble sequences. FIG. 25 shows a possible notification method, and FIG. 25 shows another possible preamble sequence configuration and notification method.

In addition to the above two methods, the configuration notification method of the preamble sequence subset further includes: notifying the starting preamble sequence index of the first preamble sequence subset and the last preamble sequence index of each preamble sequence subset; or notifying the starting index of the each preamble sequence subset and the number of the preamble sequences in the each preamble sequence subset; or notifying the starting preamble sequence index of the each preamble sequence subset and the last preamble sequence index.

Figure 26:
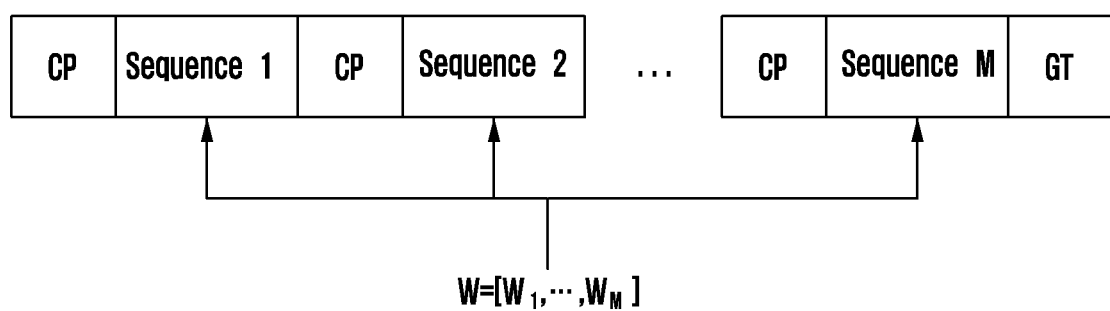
FIG. 26 shows the structure of the preamble sequence using the covering code.

In another possible configuration of the preamble sequence, the preamble sequence is generated by using a basic sequence and covering codes. FIG. 26 shows a possible preamble sequence structure in this case. FIG. 26 is a preamble sequence structure using the covering codes. In the structure of FIG. 26, one preamble sequence is composed of the same or different sequences, a Cyclic Prefix (CP) is added before each sequence, and a Guard Time (GT) is added after all the sequences. A preamble sequence consisting of N sequences is processed with a covering code w=[w1, . . . , wM] of length M, wherein each element in the mth sequence is multiplied with the mth element wM in the covering code.

In this case, a possible configuration for the preamble sequence subset is as follows: all preamble sequence subsets have the same basic sequence pool and different preamble sequence subsets adopt different covering codewords. That is, for the M subsets, M covering codes and a basic sequence resource pool are defined or preset. The mth preamble sequence subset consists of the base sequence resource pool and the mth covering code. At this time, when the preamble sequence resource is configured, it is required to notify the first sequence index in the basic sequence resource pool, the number of sequences in the basic sequence pool and an index range of available covering codes. When using this configuration method, the configuration is shown in FIG. 27, and FIG. 27 is the configuration of the preamble sequence using the covering codes. If a form of the covering code is defined in advance, there is no need to notify the index range of the covering codes, and only the number of the subsets, M, needs to be notified.

It should be noted that, for a case where the UEs with the different beam-numbers are distinguished by the preamble sequences, the time-frequency resources of the random access channel of the UE may be uniformly configured, that is, the UEs with the different beam-numbers may use the same random access channel time frequency resources. The UEs with the different beam-numbers may also use the different random access channel time-frequency resources. One possible way is that the random access channel time-frequency resources are configured for the all UEs and the UEs with the different beam-numbers use the different preamble sequence subsets. That is, the UE selects the preamble sequence from the preamble sequence subset corresponding to its own beam-number according to the beam-number, and transmits the selected preamble sequence on the random access channel, and then the base station determines which preamble sequence subset the received preamble sequence belongs to, so as to determine the beam-number of the UE transmitting the preamble sequence according to the determined preamble sequence subset.

Another possible way is that a plurality of the random access channel time-frequency resources are configured in the random access channels and UEs with the different beam-numbers select random access occasions, which are consecutive but whose numbers are different, for transmitting the preamble sequences, in order to facilitate the UEs to scan transmission beams. In particular, the UE may transmit the same preamble sequence selected as above using a plurality of different beam directions on the plurality of different random access channels.

For a case where the beam-number is notified through different resources implicitly, the behaviors at the UE are as follows.

Step 0: The UE obtains the random access configuration information including the configuration of the random access resource subsets corresponding to the different beam-numbers, wherein the random access configuration information includes random access channel time-frequency resources allocated to the UEs with the different beam-numbers, or preamble sequence resource pool information allocated to the UEs with the different beam-numbers.

Step 1: The UE selects the corresponding random access resource according to its own beam-number, including the time-frequency resource of the random access channel suitable for the UE with the beam-number or the preamble sequence resource suitable for the UE with the beam-number, and generates the preamble sequence. Specifically, the different random access resource subset corresponds to the different beam-numbers. That is, if the beam-numbers are different, the corresponding subsets of random access resources are different. When the beam-numbers of the UEs are different, the random access time-frequency resources (also called as the random access channels) selected by the UEs are different, or the random access preamble sequences selected by the UEs are different. The UE then transmits the preamble sequence on the corresponding random access channel.

Step 2: The UE detects the random access response.

Step 3: The UE generates and transmits the Message 3 if the correct random access response is detected.

Step 4: The UE detects the contention resolution message.

Corresponding to the behaviors at the UE side, for the case where the beam-number is notified through different resources implicitly, the behaviors at the base station side is as follows.

Step 0: The base station allocates the random access resources for the UEs with the different beam-numbers, including the different random access channel time-frequency resources or the different preamble sequence resources.

Step 1: The base station detects the transmission of the preamble sequence and determines the beam-number corresponding to the corresponding resource (the random access channel time-frequency resource or the preamble sequence).

Step 2: The base station generates and transmits a random access response for the detected preamble sequence.

Step 3: The base station detects the transmission of the Message 3.

Step 4: The base station generates and transmits the contention resolution message.

Figure 28:
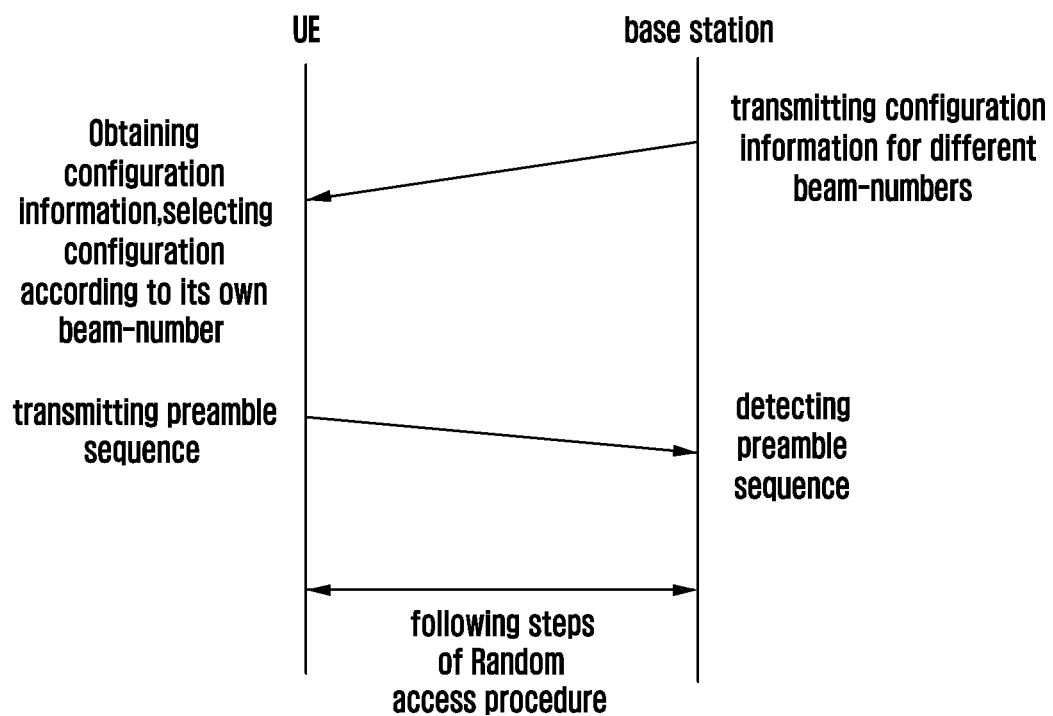
FIG. 28 is a schematic diagram of an interaction process between a base station and a UE in Embodiment eleven.

The interaction process between the base station and the UE would be described with reference to FIG. 28. FIG. 28 is a schematic diagram of the interaction process between the base station and the UE in the Embodiment eleven.

In another embodiment, in the above step 4, the base station may include the contention resolution information in a Message 4 together with the CSI-RSs or SRSs configured for the UE and transmit the Message 4 to the UE. Specifically, the base station configures for the UE the CSI-RSs or SRSs whose number corresponds to the determined beam-number of the UE according to the determined beam-number of the UE. If the beam-number of the UE determined by the base station is 4, the base station configures for the UE 4 CSI-RSs or SRSs corresponding to the beam-number 4 of the UE, wherein the number of the CSI-RSs or SRSs indicates the number of times that the same CSI-RS or SRS is repeatedly transmitted on the time-frequency resources. Wherein, 1. The base station may use different beams to transmit the configured CSI-RSs for the downlink beam management or correction; or 2. The base station may use a same beam to transmit the configured CSI-RSs for the uplink beam management or correction.

In still another embodiment, the base station may also notify the CSI-RSs or SRSs configured for the UE through a downlink channel (a downlink control channel or a downlink shared channel) for the uplink/downlink beam management, after the random access procedure is completed, wherein the number of the CSI-RSs or SRSs configured by the base station is determined according to the beam-number of the UE determined by the base station.

With the solution in this embodiment, the base station may adjust in real time a proportion of random access resources allocated to the UEs with the different beam reciprocity capability, according to a proportion of UEs with the different beam-numbers in a current cell.

Specifically, if the UEs with the different beam-numbers are distinguished by using the random access channel time-frequency resources described above, a density of the random access channel time-frequency resources allocated to the UEs with the different beam-numbers may be adjusted, so as to adjust the proportion of the random access resources assigned to the UEs with the different beam-numbers. For example, a time domain density of the time-frequency resource subsets of the respective random access channels, for example, a number of occurrences of the time-frequency resource subsets of the random access channel allocated to the UEs with the different beam-numbers in one subframe and the like, is adjusted. Such parameters may be notified through random access channel configuration parameters, that is, the different random access channel time-frequency resource subsets have the different random channel configuration parameters.

Figure 29:
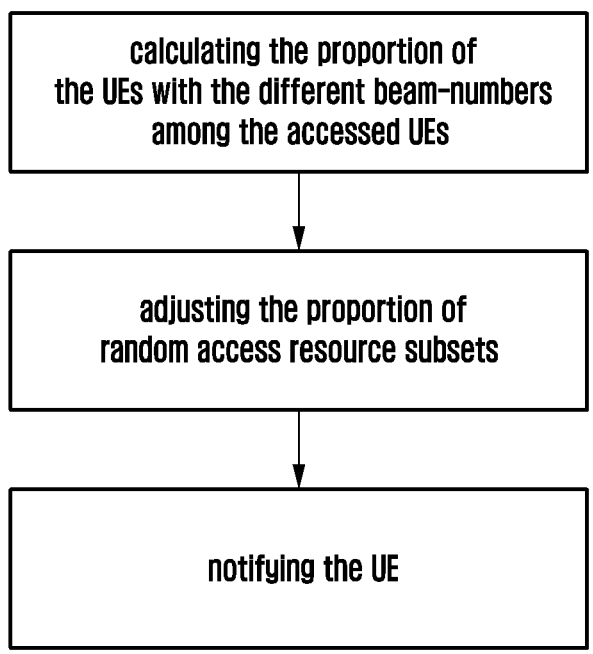
FIG. 29 is a flowchart of a base station adjusting a random access resource allocated to UEs having different numbers of beams in real time.

If the UEs with the different beam-numbers are distinguished by using the preamble sequences as above, the proportion of random access resources allocated to the UEs with the different beam-numbers may be adjusted by adjusting the numbers of preamble sequences included in the different preamble sequence resource subsets. Such parameters may be adjusted by changing the numbers of the preamble sequences in the preamble sequence subsets. A flowchart for adjusting random access resources allocated to UEs with the different beam-numbers by the base station is shown in FIG. 29. FIG. 29 is a flowchart for adjusting random access resources allocated to UEs with the different beam-numbers in real time by the base station.

For the foregoing flow, the base station may periodically calculate the proportion of the UEs with the different beam-numbers among the accessed UEs and determine whether the random access resources need to be adjusted. The adjustment of the random access resources will lead to the change of the system information carrying the random access configuration information, and thus triggering a system information change process. If the UE is in a connected state, a new system information is obtained according to a system information change indication. If the UE is in a disconnected state (e.g., an idle state), the random access configuration information is obtained before each random access attempt.

This embodiment provides an apparatus for a random access of a UE. The apparatus implicitly reports the beam-number of the UE, that is, the apparatus implicitly notifies the base station of the beam-number of the UE by determining the random access resource (the time-frequency resource or the preamble sequence resource), and the apparatus comprises the following modules:

a configuration information obtaining module for obtaining a random access configuration information from a main information block in a broadcast channel or a system information block indicated by the main information block, wherein the configuration information includes random access resources (time-frequency resources or preamble sequence resources) allocated to the UEs with the different beam-numbers;

a random access resource selection module for selecting the random access resource (the time-frequency resource or the preamble sequence resource) according to the beam-number of the UE;

a preamble sequence transmitting module for generating a preamble sequence and transmitting the generated preamble sequence on the corresponding time-frequency resource, according to the selected random access resource;

a random access response detection module for detecting the random access response transmitted by the base station;

a Message 3 generating and transmitting module for generating and transmitting the Message 3 according to the detected random access response and the indication of the beam-number of the UE; and a contention resolution receiving module for receiving a contention resolution information.

Figure 30:
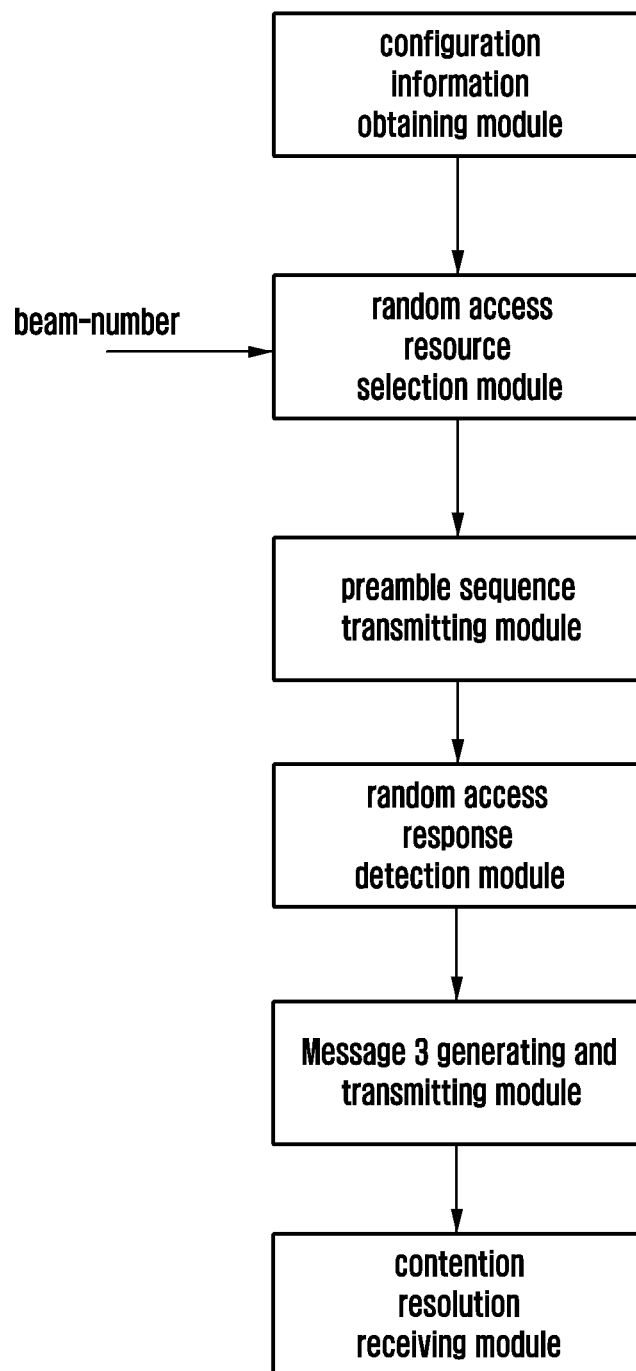
FIG. 30 is a schematic diagram of an apparatus for random access of a UE according to Embodiment eleven.

The foregoing apparatus for a random access of a UE is shown in FIG. 30. FIG. 30 is a schematic diagram of the apparatus for a random access of a UE provided in Embodiment eleven.

In addition, the contention resolution receiving module may further receive CSI-RS or SRS signals configured by the base station. The number of the CSI-RS or SRS signals configured by the base station is determined according to the beam-number of the UE determined by the base station.

The present disclosure provides an apparatus for allocating a random access resource of a base station, the apparatus comprising the following modules:

a UE beam-number calculation module for calculating the proportions of the UEs with the different beam-numbers among accessed UEs;

a random access resource allocation adjustment module for adjusting random access resources (time-frequency resources or preamble sequence resources) allocated to the UEs with the different beam-numbers, according to the proportions of the UEs with the different beam-numbers obtained by the calculation module; and a resource allocation information notification module for notifying the UE of the adjusted random access resource allocation information through the main information block in the broadcast channel or the system information block indicated by the main information block.

Figure 31:
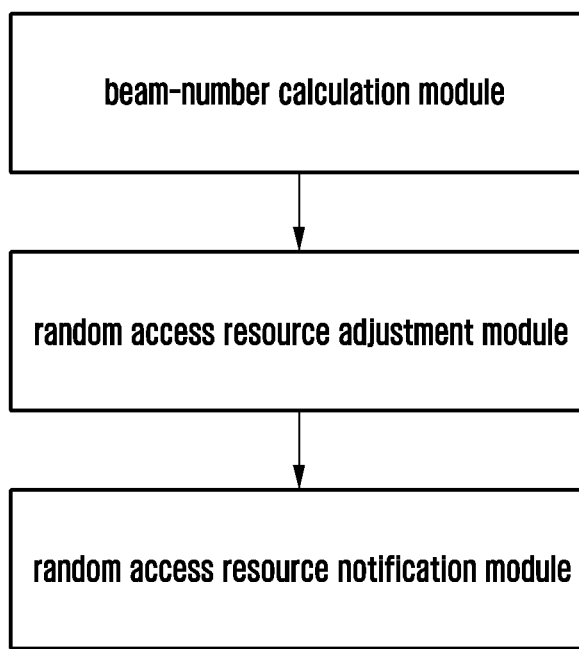
FIG. 31 is a schematic diagram of an apparatus for allocating random access resources of a base station according to Embodiment eleven.

The above apparatus would be described with reference to FIG. 31. FIG. 31 is a schematic diagram of an apparatus for allocating a random access resource of a base station according to Embodiment eleven.

The present disclosure provides a way of reporting information. The UE can report the beam-number of the UE when the random access procedure is completed, by transmitting the Message 3 in the random access procedure or selecting the random access resources, so that the base station can know the information on the beam-number of the UE as early as possible. After learning this information, the base station can perform subsequent procedures such as scheduling, resource allocation, beam management and beam correction more effectively. With the method provided by the present disclosure, an operation efficiency of the system can be improved, and the procedures of resource allocation, beam management and beam correction can be more effective.

In the prior art, the method for notifying a user equipment (UE) of time information in LTE (Long Term Evolution) needs to separately consider beam indication information and timing advance (TA) information, and is possible to require an extra signaling overhead to notify the UE, which can cause unnecessary signaling overhead. Furthermore, in LTE, for a non-random access process, there is only one indication value of 6 bits in size which may not be able to satisfy the situation that the variation value of the TA due to beam switching in a beamforming system is relatively large.

The embodiments of the present invention provide a way for notifying time information. The BS can notify the UE of a new TA or TA adjustment in a beam indication. By combining with the beam indication, the new TA or TA adjustment can indicate whether there is a beam variation or not, and can indicate beam adjustment values with different sizes.

Figure 34:
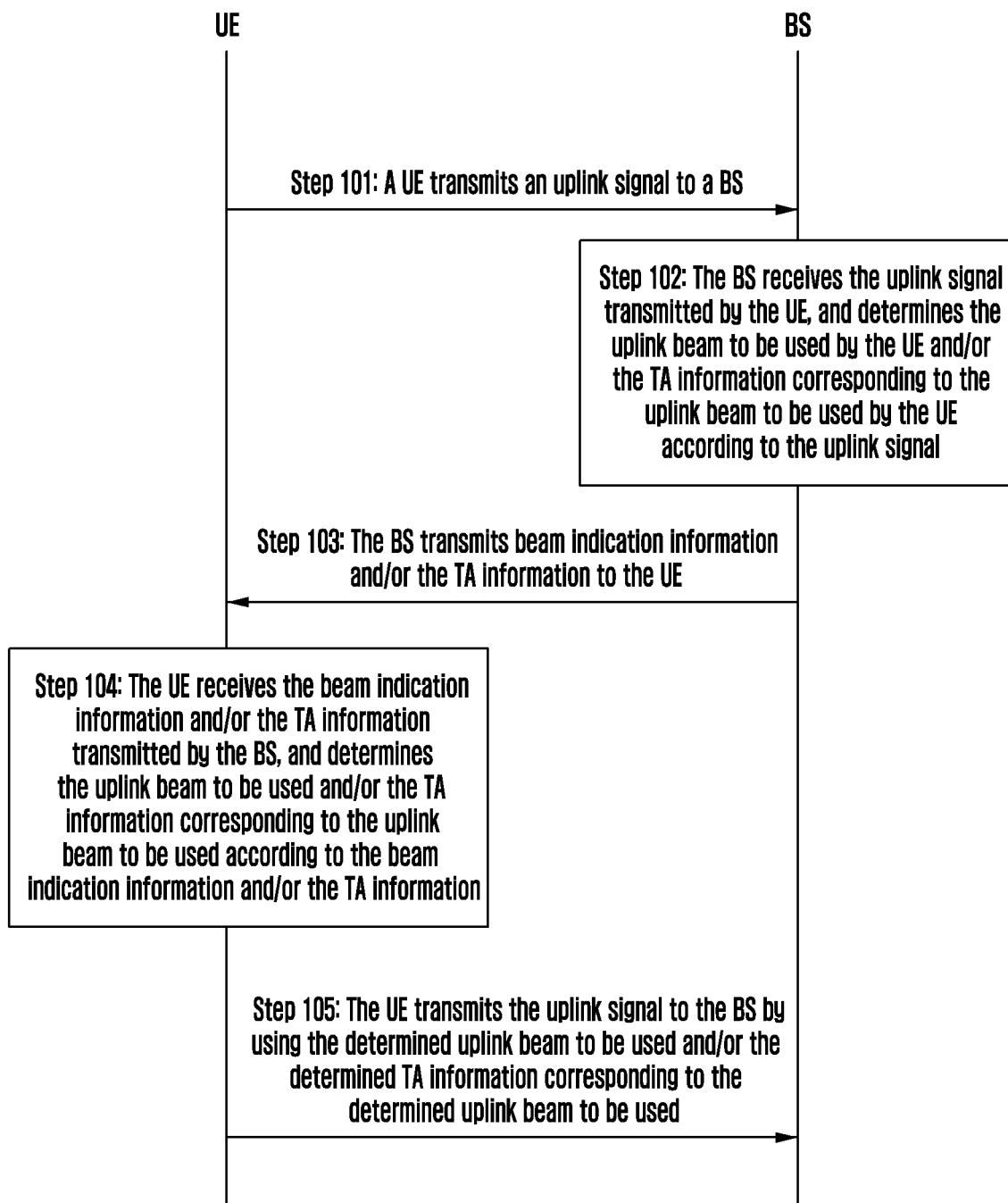
FIG. 34 is a flowchart of a method for notifying information according to an embodiment of the present invention.

FIG. 34 is a schematic flowchart of notifying information provided by one embodiment of the present invention.

Step 101: A UE transmits an uplink signal to a BS; step 102: The BS receives the uplink signal transmitted by the UE, and determines the uplink beam to be used by the UE and/or the TA information corresponding to the uplink beam to be used by the UE according to the uplink signal; step 103: the BS transmits beam indication information and/or the TA information to the UE; step 104: the UE receives the beam indication information and/or the TA information transmitted by the BS, and determines the uplink beam to be used and/or the TA information corresponding to the uplink beam to be used according to the beam indication information and/or the TA information; step 105: The UE transmits the uplink signal to the BS by using the determined uplink beam to be used and/or the determined TA information corresponding to the determined uplink beam to be used.

Wherein, the beam indication information indicates the uplink beam to be used by the UE, and the TA information indicates the TA information corresponding to the uplink beam to be used by the UE.

Further, in step 103, the BS transmits beam indication information and/or the TA information to the UE, which comprises at least one of steps 1031-1032 (not marked in the figures):

Step 1031: The BS transmits beam indication information and/or the TA information to the UE through downlink control information (DCI).

Wherein, a content indication indicating the type of information carried in the DCI is further provided in the DCI.

Wherein, the TA information comprises: a TA or a TA adjustment.

Step 1032: The BS transmits beam indication information and/or the TA information to the UE through a same Medium Access Control control-element (MAC CE).

Wherein, content indication indicating the type of information carried in the MAC CE is further provided in the MAC CE.

Wherein, the MAC CE comprises a TA group identifier (ID) of a first predetermined bit, beam indication information of a second predetermined bit, a TA adjustment of a third predetermined bit and a padding bit value of a fourth predetermined bit. The sum of the first predetermined bit, the second predetermined bit, the third predetermined bit and the fourth predetermined bit is an integral multiple of the seventh predetermined bit value, and the TA group ID is used to identify the corresponding TA group. And/or, the MAC CE comprises the TA group ID of the first predetermined bit, the beam indication information of the second predetermined bit, the TA of the fifth predetermined bit and the padding bit value of the sixth predetermined bit, and the sum of the first predetermined bit, the second predetermined bit, the fifth predetermined bit and the sixth predetermined bit is an integral multiple of the eighth predetermined bit value.

Wherein, the seventh predetermined bit value and the eighth predetermined bit value can be identical or not, which is not limited in the embodiments of the present invention.

Further, in step 104, the step that the UE receives the beam indication information and/or the TA information transmitted by the BS specifically comprises: the UE receives a DCI carrying the beam indication information and/or the TA information, which is transmitted by the BS; and/or the UE receives a MAC CE carrying the beam indication information and/or the TA information, which is transmitted by the BS.

Further, when receiving the DCI carrying the beam indication information and/or the TA information, which is transmitted by the BS, the UE determines the type of information carried in the DCI according to the number of bits of the received DCI and/or the situation that the predetermined DCI includes the content indication, and the situation comprises: the predetermined DCI format includes the content indication or the predetermined DCI format does not include the content indicator.

Specifically, the step of determining the type of information carried in the DCI according to the situation that the predetermined DCI includes the content indication comprises:

determining the type of information carried in the DCI according to the content indication when the predetermined DCI format includes the content indication; determining the type of information carried in the DCI according to the predetermined DCI format when the predetermined DCI format does not include the content indication.

Further, when the MAC CE carrying the beam indication information and/or the TA information, which is transmitted by the BS, is received, determining the type of information carried in the MAC CE according to the situation that the predetermined MAC CE includes the content indication. The situation that the predetermined MAC CE includes the content indication comprises: the predetermined MAC CE format includes the content indication, or the predetermined MAC CE format does not include the content indication.

Specifically, the step of determining the type of information carried in the MAC CE according to the situation that the predetermined MAC CE includes the content indication comprises:

determining the type of information carried in the MAC CE according to the content indication when the predetermined MAC CE format includes the content indication;

determining the type of information carried in the MAC CE according to the predetermined MAC CE format when the predetermined MAC CE format does not include the content indication.

Further, the UE acquires the beam indication information and/or the TA information according to the carried type of information.

Further, in step 102, the step that the BS determines the uplink beam to be used by the UE and/or the TA information corresponding to the uplink beam to be used by the UE according to the uplink signal comprises: determining the individual beam quality information corresponding to each uplink beam based on the received uplink signal; determining the uplink beam to be used by the UE according to the individual beam quality information corresponding to each uplink beam, and determines the TA information corresponding to the uplink beam to be used by the UE according to BS timing reference information.

Wherein, the beam quality information comprises: the received power of the corresponding uplink beam and/or the signal interference noise ratio (SINK) of the received signal.

Further, recording, by the BS, the individual beam quality information and/or the individual TA information corresponding to each uplink beam available for the UE; and/or, determining one from multiple uplink beam available for the UE as a first uplink beam and recording the beam quality information and/or TA information corresponding to the first uplink beam and relative beam quality information and/or relative TA information of each of the other uplink beams with respect to the beam quality information and TA information of the first uplink beam by the BS, when multiple uplink beams exist.

Further, updating recorded beam quality information and/ or corresponding TA information corresponding to a relevant uplink beam when it is detected by the BS that beam quality information and/or TA information corresponding to any one of the uplink beams changes.

Further, the BS determines the TA information corresponding to the uplink beam to be used according to the TA information; and the step of transmitting the uplink signal to the BS by using the TA information corresponding to the uplink beam to be used comprises the following steps a-b (not marked in the figures):

Step a: if the TA information is a TA, the UE determines that the TA information corresponding to the uplink beam to be used is a TA and transmits the uplink signal to the BS by using the determined TA information corresponding to the uplink beam to be used.

Step b: if the TA information is a TA adjustment, the UE determines the TA information corresponding to the uplink beam to be used according to the TA adjustment and transmits the uplink signal to the BS by using the determined TA information corresponding to the uplink beam to be used.

Further, step 105 specifically comprises: the UE transmits an uplink signal to the BS by using the determined uplink beam to be used and/or the determined TA information corresponding to the determined uplink beam to be used, according to a predetermined time interval or a time interval configured by the BS.

Further, when the time unit of uplink signal transmitted by using the determined TA information corresponding to the uplink beam to be used and a previous time unit is overlapping, determining the priority of the service data carried in each time unit; and transmitting preferentially the service data carried in the time unit with the highest service data priority or transmitting preferentially the service data carried in the previous time unit.

Wherein, the time unit comprises at least one of the following: a symbol, a group of symbols, a slot, a group of slots, a mini slot, a group of mini-slots, a radio frame, a group of radio-frames, a system frame and a group of system-frames.

The embodiments of the present invention provide a method for notifying information. Compared with the prior art, the UE in the embodiments of the present invention transmits an uplink signal to a BS. The BS can determine the uplink beam to be used by the UE and/or TA information corresponding to the uplink beam to be used according to the uplink signal, and transmit the beam indication information carrying the uplink beam to be used and/or the TA information corresponding to the uplink beam to be used to the UE so that the UE can transmit the uplink signal according to the uplink beam and/or the corresponding TA information (i.e. the uplink beam corresponding to the UE which can be determined by the BS and/or the TA information changed as the uplink beam changes), and can notify the UE of the determined uplink beam and/or the corresponding TA information, so that the UE can be informed about the new TA information.

Embodiment Twelve

The present invention provides a way for notifying information. In a beamforming communication system, a UE in a connected state transmits an uplink signal (for example, a sounding reference signal (SRS), a Demodulation Reference Signal (DMRS) in a Physical Uplink Shared Channel (PUCCH) or in a Physical Uplink Shared Channel (PUSCH), or directly the PUCCH or PUSCH data signal) to the BS. Therefore, the BS can decide whether the beam currently used by the UE is a good beam, from detecting the uplink signal to obtain the quality (for example, the size of the received power of each uplink beam, or the level size of the SINR of the received signal of each uplink beam) of the uplink beam of the UE. If the BS finds that there is another uplink beam with better quality for this UE, the BS can notify the UE of converting the used uplink beam. However, at this time, it is possible to cause a large change of the TA due to the conversion of the beam. By detecting the uplink signal from the UE, the BS can further obtain the TA of the corresponding uplink beam and notify the UE of a TA adjustment, or a new TA together with beam indication information, which helps the UE to perform more accurate uplink signal transmission.

The invention mainly comprises steps 1-3 (not marked in the figures):

Step 1: A UE transmits an uplink signal through uplink resources (including time-frequency resources, DMRS configuration, SRS configuration and/or so on) configured by a BS.

Step 2: The BS measures the received power of the corresponding uplink beam or the SINR of the uplink beam of the received signal through the uplink signal received from the UE, to determine the uplink beam that should be used by the UE.

Meanwhile, the TA of the corresponding beam of the UE is determined with reference to the timing reference measured by the BS. Then, the BS notifies a user of the new beam indication information and the TA information through a downlink channel (for example, a downlink control channel, a downlink shared channel and a downlink broadcast channel).

1. The BS can notify the UE by placing the beam index information (for example, Sounding Reference Signal resource indicator (SRI)) and TA information (for example, N bits of TA, or TA adjustment) into the DCI.

2. The BS can transmit a Medium Access Control Control-element (MAC CE) composed of the beam index information (for example, SRI) and the TA information (for example, N bits of TA, or the TA adjustment) to the UE.

Wherein, in the notification information transmitted to the UE by the BS, the BS can further reserve a content indication of M bits in the DCI or the MAC CE to notify the UE of the type of information contained in the corresponding DCI or the MAC CE. If the content indication occupies 1 bit, "0" indicates that the DCI or the MAC CE carries a TA adjustment of 6 bits; and "1" indicates that the DCI or the MAC CE carries a TA of 11 bits.

Step 3: The UE receives the beam indication information transmitted by the B S, and reads new beam index information and/or TA information therefrom.

1. The UE converts the uplink beam into the uplink beam indicated by the BS according to the indicated beam index information. The UE applies the new uplink beam according to a predetermined time interval or a time interval configured by the BS, for example, the system preconfigures to use the new uplink beam to perform uplink date transmission after T1 subframes.

2. The UE determines a new TA according to the indicated TA adjustment or TA to transmit the uplink signal, and applies the new TA according to a predetermined time interval or a time interval configured by the BS. For example, the system is preconfigured to use the new TA after T2 subframes to perform the uplink date transmission; or can be preconfigured to use the new TA according to the same time interval that the application is configured with the new uplink beam, that is, it is preconfigured to use the new TA after T1 subframes to use the uplink signal.

In addition, after the determined new TA is used, this will result in an overlap between the previous subframe and the subframe after the previous subframe. At this time, the UE decides which subframe will be preferentially completed about data transmission according to the data priority carried by the two overlapping subframes.

Figure 35:
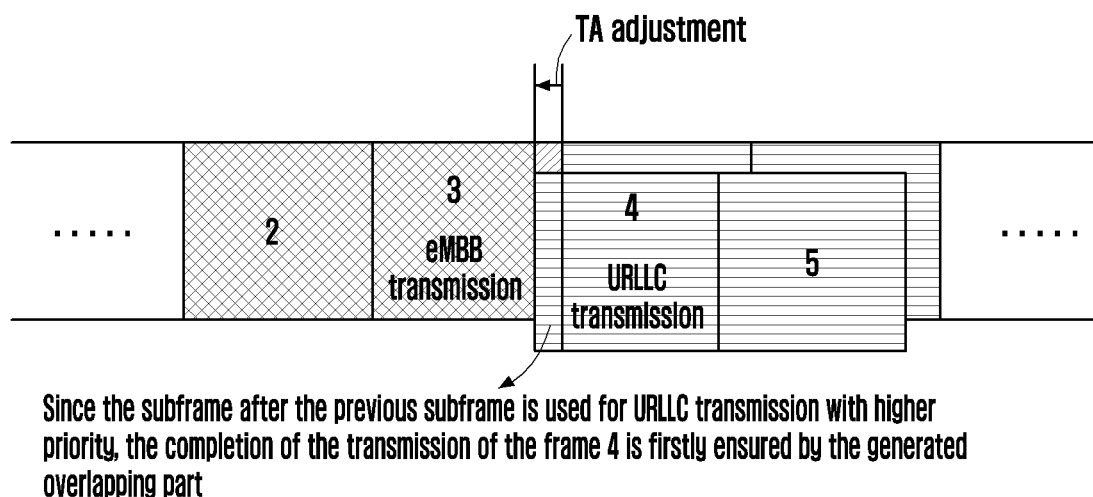
FIG. 35 is an exemplary diagram that there is an overlap between services with different priorities.

For Example:

1. when the subframe after the previous subframe is a service with a higher priority relative to the previous subframe, as shown in FIG. 35. For example, when the subframe after the previous subframe will transmit URLLC service data with high reliability and low latency and the previous subframe transmits normal eMBB data, then when there is an above-mentioned case of the overlap between the subframe after the previous subframe and the previous subframe, the UE can execute a) and/or b):
   a) Preferentially ensure to achieve the transmission of the complete URLLC service;
   b) Preferentially ensure to achieve the transmission of the complete service of the previous subframe.

Figure 36:
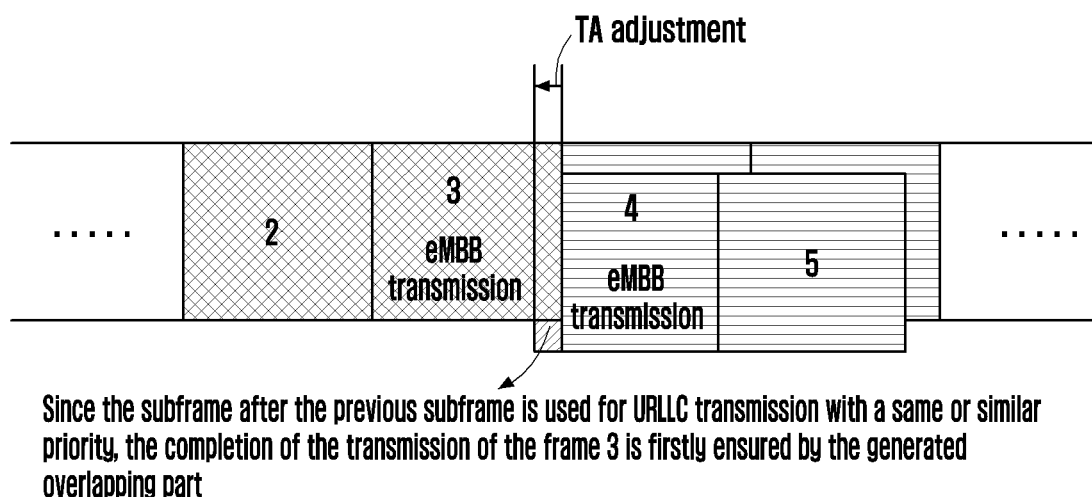
FIG. 36 is an exemplary diagram that there are overlaps between services with a same priority.

2. When the subframe after the previous subframe is a service with a same or similar priority or lower priority relative to the previous subframe, as shown in FIG. 36. If the transmission of both the previous and the subframe after the previous subframes are service data of eMBB, then when there is an above-mentioned case of the overlap between the subframe after the previous subframe and the previous subframe, the UE can preferentially ensure to achieve the transmission of the service of the previous subframe.

Wherein, the subframe here is used as an example of a time unit, which can also be replaced by other time units, for example, a symbol, a slot, a mini slot, a radio Frame, etc., and combination of one or more of the above time units.

Embodiment Thirteen

This embodiment will introduce changes of the used beam and possible TA which are used for notifying a user by constructing an MAC CE or a DCI format. In a beamforming communication system, a UE in a connected state transmits an uplink signal (for example, an SRS, a DMRS in a PUCCH or a PUSCH, or directly a PUCCH or PUSCH data signal) to a BS. Therefore, the BS can obtain the quality (for example, the size of the received power of each uplink beam for receiving signal, or the level size of the SINR of the received signal of each uplink beam) of the uplink beam of the UE from detecting the uplink signal to obtain the quality, so as to determine whether the beam currently used by the UE is a good beam. For example, if finding that there is another uplink beam with better quality for this UE, the BS can notify the UE of converting the used uplink beam. However, at this time, it is possible to cause a large change of the TA due to the conversion of the beam. By detecting the uplink signal from the UE, the BS can further obtain the TA of the corresponding uplink beam and notify the UE of a TA adjustment, or a new TA together with beam indication information, which helps the UE to perform more accurate uplink signal transmission.

The main steps of the embodiments of the present invention are as follows:

Step 1: A UE transmits an uplink signal through uplink resources (including time-frequency resources, DMRS configuration, SRS configuration and/or so on) configured by a BS.

Step 2: The BS measures the received power of the corresponding uplink beam or the SINR of the uplink beam of the received signal through the uplink signal received from the UE, to determine the uplink beam that should be used by the UE. Meanwhile, the TA of the corresponding beam of the UE is determined with reference to the timing reference measured by the BS. Then, the BS notifies a user of the new beam indication information and the TA information through a downlink channel (for example, a downlink control channel, a downlink shared channel and a downlink broadcast channel).

Wherein, in a multi-beam system, the UE may have multiple uplink transmitting beams. Therefore, the BS may be required to maintain and record the beam quality and TA of each beam for the multiple different uplink beams, and possible ways are as follows:

1. The BS independently maintains and records the beam quality and/or TA of each uplink beam of the UE. If the UE has 3 uplink beams, at the BS side, the BS respectively records the beam quality and/or TA of the three beams. The old beam quality and/or TA are replaced by the updated new beam quality and/or TA obtained after the next new uplink signal measurement.

2. The BS relatively maintains and records the beam quality and/or TA of the uplink beam of the UE. For example, if the UE has 3 uplink beams, which are beams 1, 2 and 3, respectively. At the BS side, the BS selects and records the beam quality and/or TA of one of the beams (for example, the beam 1), and the selection can be based on a random selection of equal probabilities or according to the quality of the beams. For example, selecting the beam with the highest beam quality or recording the beam with lowest beam quality; and recording the relative beam quality values and/or relative TAs of the beam 2 and beam 3 relative to the beam 1. When there is updated beam quality and/or TA measurement value after the next new uplink signal measurement, the old beam quality and/or TA are replaced. Meanwhile, the relative beam quality and/or relative TA of the beam 2 and beam 3 relative to the beam 1 are further updated, to replace the old relative beam quality and/or relative TA relative to the beam 1.

In addition, the way in which the BS notifies the UE can be:

1. DCI; the UE can be notified by placing the beam index information and TA information into the DCI.

2. MAC CE; it can be transmitted to the UE by placing the beam index information and/or TA information into the same MAC CE.

Wherein, a) Beam index information, that is, by which the resource index of the uplink beam can be identified, such as the SRI.

b) TA information, that is, the TA of $N_{ta}$ bits of the uplink transmission of the UE or the TA adjustment of the $N_{ta\text{-}adjust}$ bits relative to the old TA can be identified. For example, similar to that in a LTE system, the TA is a complete $N_{ta}$=11 bits, the UE can directly convert the 11 bits into the TA of the uplink transmission; or the UE can use the TA adjustment of $N_{ta\text{-}adjust}$=6 bits, and then the UE needs to calculate the new TA based on the old TA.

When downlink control information is used for transmission, the corresponding DCI format can be:

The content indication can be 1 or 2 bits. The meaning of this content indication is:

If the size of the content indication is 1 bit:
When the content indication is "0", it is characterized what the DCI carries is the beam indication information and the TA (or the TA adjustment); the beam indication information identifies that the UE uses the uplink beam different from the previous uplink beam.
When the content indication is "1", it indicates that the DCI carries the TA (or the TA adjustment) and does not carry the beam indication information. The meaning of not carrying the beam indication information indicates that the UE uses the same uplink beam as the previous uplink beam.

Or,
When the content indication is "0", it indicates that the DCI carries the beam indication information and the TA; the beam indication information identifies the uplink beam should be used by the UE, which may be the same as or different from the uplink beam used previously.
When the content indication is "1", it indicates that the DCI carries the beam indication information and the TA adjustment. The beam indication information identifies the uplink beam should be used by the UE, which may be the same as or different from the uplink beam used previously.

Or,
If Size_dci is less than or equal to a predetermined threshold value, then when the content indication is "0", it indicates what the DCI carries is a TA adjustment; when the content indication is "1", it indicates what the DCI carries is a TA; in both cases, no beam indication information is carried in the DCI, that is, it indicates that the UE uses the same uplink beam as the previous uplink beam.

Wherein, the Size_dci is characterized that the size of the DCI received by the UE, such as the number of bits after the CRC being removed, or the number of bits including the CRC.

If Size_dci is greater than a predetermined threshold value, then when the content indication is "0", it indicates that the DCI carries the beam indication information and the TA adjustment; when the content indication is "1", it indicates that the DCI carries the beam indication information and the TA; in both cases, the DCI has the beam indication information, which indicates that the UE uses the uplink beam different from the previous uplink beam.

Wherein, the Size_dci indicates the size of the DCI received by the UE, such as the number of bits after the CRC is removed or the number of bits including the CRC.

It is worth noting that the meanings of the above "0" and "1" can be exchanged, which will not be limited in the embodiments of the present invention.

If the size of the content indication is 2 bits (as shown in Table 3):
When the content indication is "00", it is characterized what the DCI carries is a TA adjustment; wherein, the meaning of not carrying the beam indication information is characterized that the UE uses the same uplink beam as the previous uplink beam.
When the content indication is "01", it is characterized what the DCI carries is a TA; wherein, the meaning of not carrying the beam indication information is characterized that the UE uses the same uplink beam as the previous uplink beam.
When the content indication is "10", it is characterized what the DCI carries is beam indication information and a TA adjustment; and the beam indication information is characterized that the UE uses the uplink beam different from the previous uplink beam.
When the content indication is "11", it is characterized what the DCI carries is beam indication and a TA; and the beam indication information is characterized that the UE uses the uplink beam different from the previous uplink beam.

It should be noted that the meanings of the above "00", "01", "10" and "11" can be exchanged, which will not be limited in the embodiments of the present invention.

TABLE 3

Meaning example of bit content indication

| Content indication value | Meaning (contents carried in DCI) |
|---|---|
| 00 | No beam indication information and there is a TA adjustment |
| 01 | No beam indication information and carrying a TA |
| 10 | There are beam indication information and a TA adjustment |
| 11 | There are beam indication information and a TA |

Figure 37:
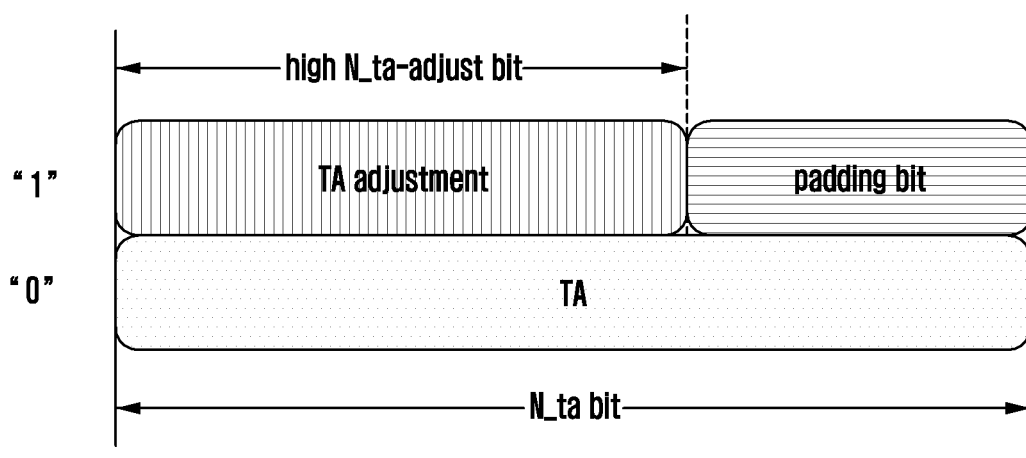
FIG. 37 is an exemplary diagram that fixed sizes respectively indicates TA or TA adjustment.

Specifically, when the part of the TA (or the adjustment value) carried in the DCI is with a fixed size (such as being fixed as N_ta bits), the UE can perform different processing on the received TA (or TA adjustment) according to the different content indications, for example:

If the size of the content indication is 1 bit, then:
When the content indication is "0", it is characterized what the DCI carries is beam indication information and a TA; at this time, N_ta represents the complete TA, and the UE reads the complete N_ta bits to obtain a new TA. What the beam indication information identifies is the uplink beam that should be used by the UE, which may be the same as or different from the uplink beam used previously.
When the content indication is "1", it is characterized what the DCI carries is beam indication information and a TA adjustment. At this time, the high or low N_ta-adjust of the N_ta is characterized as the complete TA. The UE reads high or low N_ta-adjust bits to obtain a new TA adjustment and calculate a new TA. What the beam indication information identifies is the uplink beam that should be used by the UE, which is possible to be the same as or different from the uplink beam previously used; as shown in the example of FIG. 37, the padding bits can be all 0 bit or all 1 bit or any bit.

Or,
When Size_dci is less than or equal to a predetermined threshold value, similar to the last way, the content indication can also be used to indicate different processing performed by the UE on the received TA information. The processing way is similar to the above and will not be described in detail again. The DCI does not carry beam indication information, which indicates that the UE uses the same uplink beam as the previous uplink beam.

Wherein, the Size_dci is characterized that the size of the DCI received by the UE, such as the number of bits after the CRC being removed, or the number of bits including the CRC.

When Size_dci is greater than a predetermined threshold value, similarly to the last way, the content indication can also be used to indicate different processing performed by the UE on the received TA content. The processing way is similar to the above and will not be described in detail again. The DCI carries beam indication information, which indicates that the UE uses the uplink beam different from the previous uplink beam.

Wherein, the Size_dci is characterized that the size of the DCI received by the UE, such as the number of bits after the CRC being removed, or the number of bits including the CRC.

It is worth noting that the meanings of the above "0" and "1" can be exchanged, which will not be described in detail again.

If the size of the content indication is 2 bits, a similar configuration can also be used as following:

When the content indication is "00", it is characterized what the DCI carries is a TA adjustment; the UE reads high or low N_ta-adjust of the N_ta bits to obtain a new TA adjustment; the meaning of not carrying the beam indication information is characterized that the UE uses the same uplink beam as the previous uplink beam;

When the content indication is "01", it is characterized what the DCI carries is a TA; the UE reads a complete N_ta bits to obtain a new TA; the meaning of not carrying the beam indication information is characterized that the UE uses the same uplink as the previous uplink beam;

When the content indication is "10", it is characterized what the DCI carries is beam indication information and a TA adjustment; the UE reads high or low N_ta-adjust bit among the N_ta bits to obtain a new TA adjustment; the beam indication information is characterized that the UE uses the uplink beam different from the previous uplink beam;

When the content indication is "11", it is characterized what the DCI carries is beam indication information and a TA; the UE reads the complete N_ta bits to obtain a new TA; the beam indication information is characterized that the UE uses the uplink beam different from the previous uplink beam;

It should be noted that the meanings of the above "00", "01", "10" and "11" can be exchanged.

The content indication can be N_bi bits, and this content indicates the uplink beam index information used by the UE, which is indicated by the BS;

and/or

The TA adjustment is Nta-adjust bits, and the contention indicates the offset used by the UE relative to the old TA (which can be represented as TA_old), which is indicated by the BS; for example, TA_new=f(TA_old, TA_adjust).

and/or

The TA is Nta bits, and the content indicates the new TA (which can be represented as TA_new) used by the UE, which is indicated by the BS;

Specifically, when content indication is not included in a DCI design, the UE is notified by selecting the beam indicator with a fixed format and/or TA information (TA or TA adjustment).

For the embodiments of the present invention, when MAC CE is used for transmission, the corresponding MAC CE format can be:

This beam and TA indication command MAC CE is determined by a corresponding logical channel ID (LCID) in the MAC PDU subheader. For example, when LCID=01011, as shown in the following Table 4, which is characterized of the beam and the TA indication command. Or, the index of the TA command in LTE can be extended, that is, the LCID of the TA command in LTE is reused to identify the beam and the TA indication command.

TABLE 4

Example Table of the LCID Value for a downlink shared channel

| Value of LCID | Meaning of a logical channel |
|---|---|
| . . . | . . . |
| 01011 | Beam and TA Indication Command |
| 11011 | Activate/deactivate |
| 11100 | UE contention-resolution ID |
| . . . | . . . |

For the embodiments of the present invention, the MAC CE has a fixed size, and the number of bits contained therein is an integer multiple of 8 bits, that is, being aligned with Octet.

Mode 1: The MAC CE includes a TA group ID of Ntagid bits, a beam indication information of N_bi bits, and a TA adjustment TAcommand of Nta-adjust bits, where N_macce=Ntagid+N_bi+Nta-adjust+N_paddingbit;

wherein, N_paddingbit is used to complement the number of bits of the MAC CE so that it can satisfy the integer multiple of 8 bits, where N_paddingbit=8*

$$\left\lceil \frac{Ntagid + N\_bi + \text{N\_ta} - \text{adjust}}{8} \right\rceil$$

−(Ntagid+N_bi+Nta-adjust); ⌈x⌉ represents the smallest integer greater than x; and the padding bits can be all 0 bits or all 1 bits.

Figure 38:
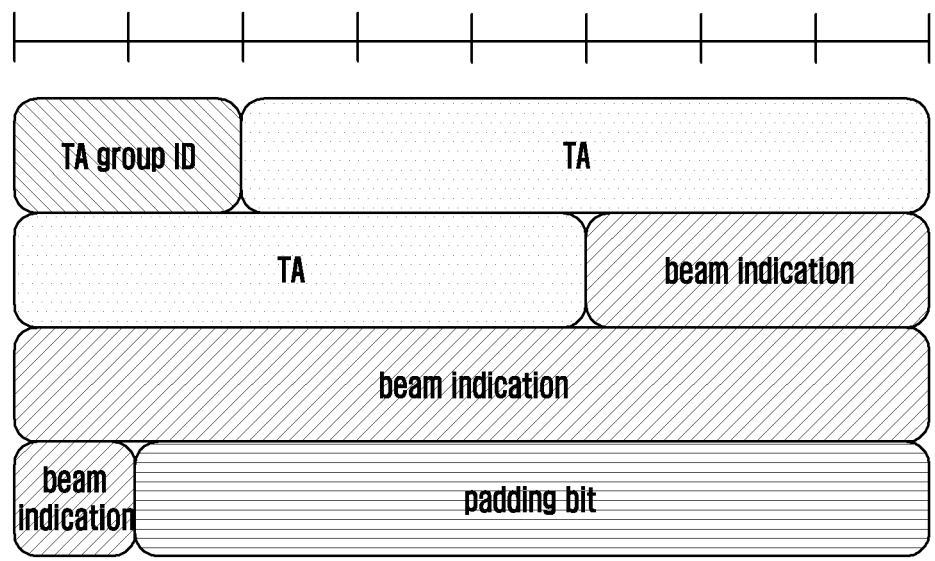
FIG. 38 is an exemplary diagram that an MAC CE includes a TA.

Mode 2: The MAC CE includes the TA group ID of Ntagid bits, the TA indication information of N_bi bits and the TA of Nta bits, where N_macce=Ntagid+N_bi+Nta+N_paddingbit;

wherein, N_paddingbit is used to complement the number of bits of the MAC CE so that it can satisfy an integer multiple of 8 bits. N_paddingbit=8*⌈(N_{tagid}+N_bi+N_{ta})/8⌉−(Ntagid+N_bi+Nta); ⌈x⌉ represents the smallest integer greater than x; the padding bits can be all 0 bits or all 1 bits; as shown in FIG. 38, for example, if the TA group ID of Ntagid=2 bit, the beam indication information of N_bi=12 bits and the TA of Nta=11 bit, then N_paddingbit=8*⌈(2+12+11)/8⌉−(2+12+11)=8*4−25=7; then N_macce=32.

For the embodiments of the present invention, for the same UE, a TA group ID can have multiple serving cells. For example, in the scenario of carrier aggregation CA, it is possible that there are several carriers (may also be called as cells) has the same TA, which forms a TA group and shares the same TA value, and different TA groups can have different TA values; different TA values can also be allocated for different carriers, and the TA values allocated to the UEs in different cells can also be different.

Figure 39:
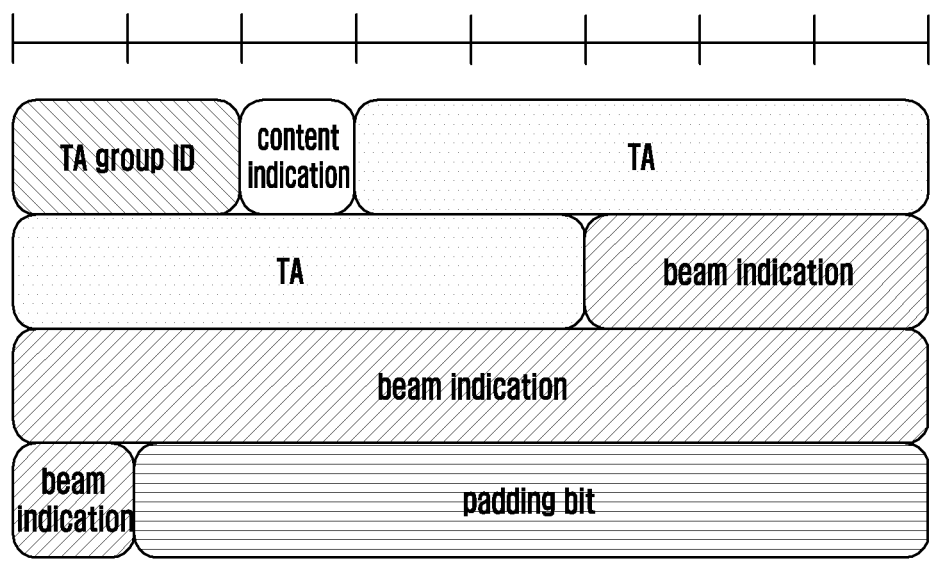
FIG. 39 is an exemplary diagram that an MAC CE includes a content indication.

For the embodiments of the present invention, in the notification information to the UE, the content indication of M bits can also be reserved in the MAC CE to notify of the type of information contained in the corresponding MAC CE. As shown in FIG. 39, the content indication is 1 bit, "0" is characterized that the MAC CE carries the TA adjustment of N_ta-adjust bits, "1" is characterized that the MAC CE carries the TA of N_ta bits; meanwhile, similar to the above description, the UE can read the high or low N_ta-adjust bits among the timing information bits according to the different content indications to obtain the TA adjustment, or read the complete TA of N_ta bits.

It should be noted that the position of each information field in the MAC CE in FIG. 39 can be exchanged. And it will not be described in detail again in the embodiments of the present invention.

Step 3: The UE receives the beam indication information and the TA information transmitted by the BS, and reads the new beam index information and/or TA information therefrom.

1. Converting the uplink beam into the uplink beam indicated by the BS according to the indicated beam index information; and applying a new uplink beam according to a predetermined time interval or the time interval configured by the BS, for example, the system preconfigures to use a new beam after T1 subframes to perform uplink data transmission.

2. Determining the new TA value according to the indicated TA adjustment or the TA value for uplink signal transmission; and applying a new TA value according to the predetermined time interval or a time interval configured by the BS, for example, the system preconfigures to use the new TA after T2 subframes to perform the uplink date transmission; or can the system preconfigures to use a new TA value according to the same time interval with the new uplink beam, that is, preconfigures to use the new TA value after T1 subframes to perform the uplink signal transmission.

In addition, after the determined new TA is used, this will result in an overlap between the previous subframe and the subframe after the previous subframe. At this time, the UE decides which subframes will be preferentially completed about data transmission according to the data priority carried by the two overlapping subframes.

For Example:

1. When the subframe after the previous subframe is a service with a higher priority, as shown in FIG. 35. For example, when the subframe after the previous subframe will transmit URLLC service data with high reliability and low latency and the previous subframe transmits normal eMBB data, then when there is an above-mentioned case of the overlap between the subframe after the previous subframe and the previous subframe, the UE can:
    a) Preferentially ensure to achieve the transmission of the complete URLLC;
    b) Preferentially ensure to achieve the transmission of the complete service of the previous subframe.
2. When the subframe after the previous subframe is a service with a same or similar priority or lower priority relative to the previous subframe, as shown in FIG. 36. If the transmission of both the previous and subframe after the previous subframes is service data of eMBB, then when there is an above-mentioned case of the overlap between the subframe after the previous subframe and the previous subframe, the UE can preferentially ensure to achieve the transmission of the service of the previous subframe.

It is worth noting that subframes herein can be used as an example of a time unit, and can also be replaced by other time units, such as a symbol, a group of symbols, a slot, a group of slots, a mini slot, a mini slot group, a radio frame, a radio frame group, a system frame and a system frame group, etc., and a combination of one or more of the above time units.

Figure 40:
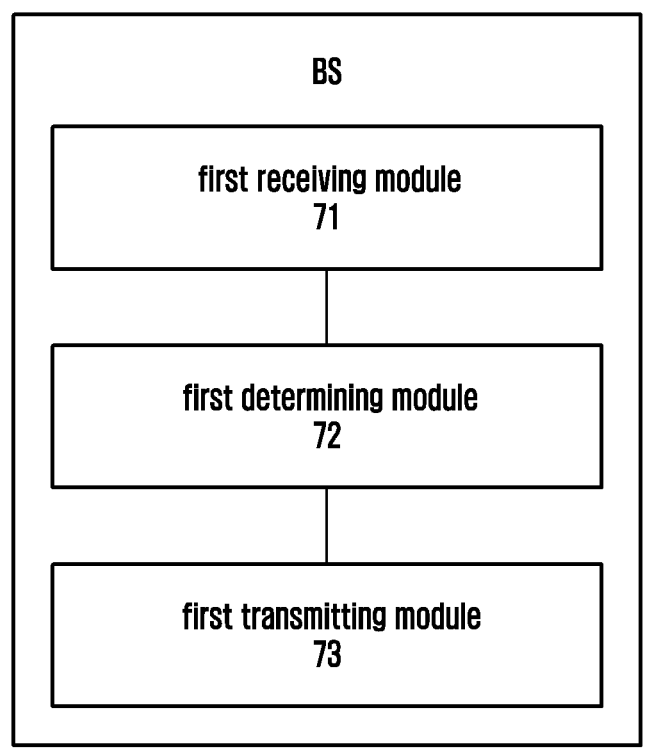
FIG. 40 is an apparatus structure diagram of a base station in an embodiment of the present invention.

An embodiment of the present invention provides a base station (BS). As shown in FIG. 40, the BS comprise: a first receiving module 71, a first determining module 72 and a first transmitting module 73, wherein, The first receiving module 71 is configured to receive an uplink signal transmitted by a user equipment (UE).

The first determining module 72 is configured to determine the uplink beam to be used by the UE and/or timing advance (TA) information corresponding to the uplink beam to be used by the UE according to the uplink signal received by the first receiving module 71.

The first transmitting module 73 is configured to transmit the beam indication information and/or the TA information determined by the first determining module 72 to the UE.

Wherein, the beam indication information indicates the uplink beam to be used by the UE, and the TA information indicates the TA information corresponding to the uplink beam to be used by the UE.

According to the BS provided in this embodiment of the present invention, compared with the prior art, a UE in the present invention transmits an uplink signal to a BS, and the BS can determine an uplink beam to be used by the UE and/or TA information corresponding to the uplink beam to be used according to the uplink signal, and transmit the beam indication information carrying the uplink beam to be used and/or the TA information corresponding to the uplink beam to be used to the UE, so that the UE can transmit the uplink signal according to the uplink beam and/or the corresponding TA information (i.e. the uplink beam corresponding to the UE which is can be determined by the BS and/or the TA information changed as the uplink beam changes), and can notify the UE of the determined uplink beam and/or the corresponding TA information, so that the UE can be notified of the new TA information.

The BS provided in this embodiment of the present invention can implement the foregoing method embodiments. For the specific function implementation, please refer to the explanation in the method embodiments, and will not be described here.

Figure 41:
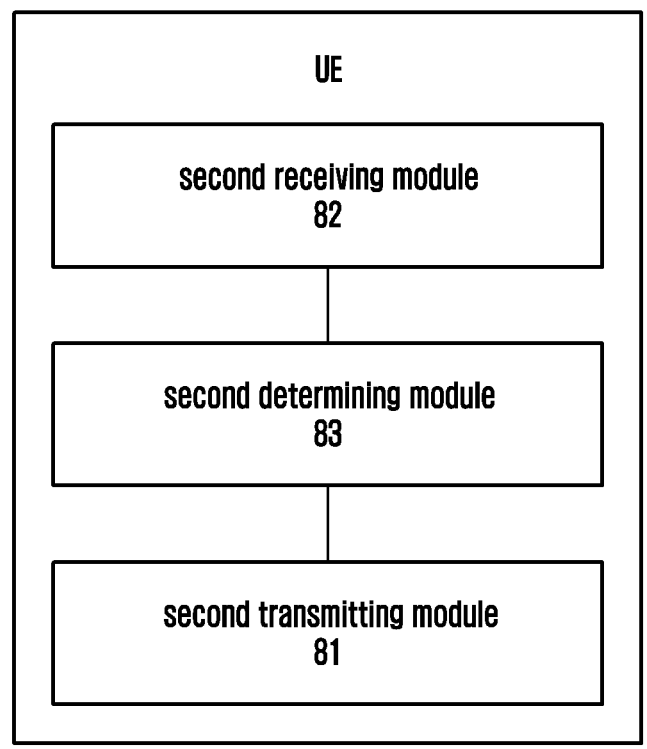
FIG. 41 is an apparatus structure diagram of a user equipment in an embodiment of the present invention.
Figure 42:
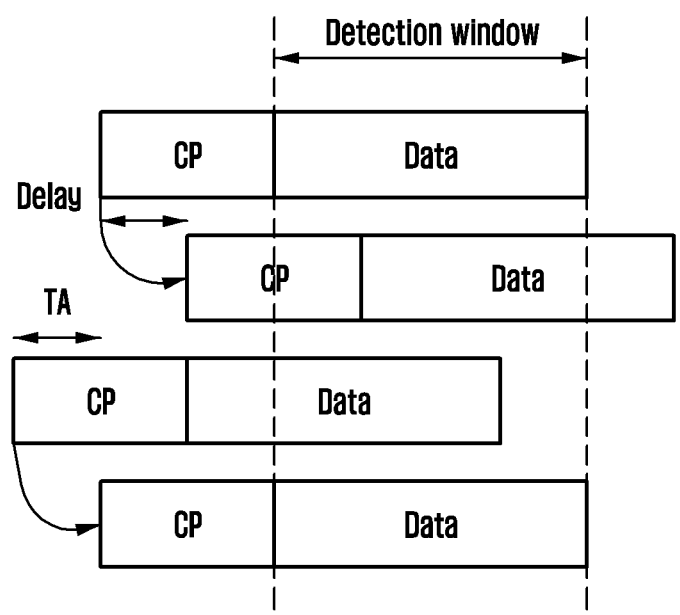
FIG. 42 is a schematic diagram of the purpose of Timing Advance (TA) in the prior art.

An embodiment of the present invention provides a user equipment (UE). As shown in FIG. 41, the UE comprises a second transmitting module 81, a second receiving module 82 and a second determining module 83, wherein, The second transmitting module 81 is configured to transmit an uplink signal to a base station (BS).

The second receiving module 82 is configured to receive beam indication information and/or timing advance (TA) information transmitted by the BS.

The second determining module 83 is configured to determine an uplink beam to be used and/or TA information corresponding to the uplink beam to be used according to the beam indication information and/or TA information received by the second receiving module 82.

The second transmitting module 81 is further configured to transmit the uplink signal to the BS by using the determined uplink beam to be used and/or the determined TA information corresponding to the determined uplink beam to be used determined by the second determining module 83.

According to the UE provided in this embodiment of the present invention, compared with the prior art, a UE in the present invention transmits an uplink signal to the BS, and the BS can determine an uplink beam to be used by the UE and/or TA information corresponding to the uplink beam to be used according to the uplink signal, and transmit the beam indication information carrying the uplink beam to be used and/or the TA information corresponding to the uplink beam to be used to the UE, so that the UE can transmit the uplink signal according to the uplink beam and/or the corresponding TA information (i.e. the uplink beam corresponding to the UE which is can be determined by the BS and/or the TA information changed as the uplink beam changes), and can notify the UE of the determined uplink beam and/or the corresponding TA information, so that the UE can be notified of the new TA information.

The UE provided in this embodiment of the present invention can implement the foregoing method embodiments. For a specific function implementation, please refer to the explanation of the method embodiment and will not be repeated in detail herein.

Wherein, the timing advance configuration information is specifically timing advance configuration precision information or timing advance configuration unit information.

Figure 43:
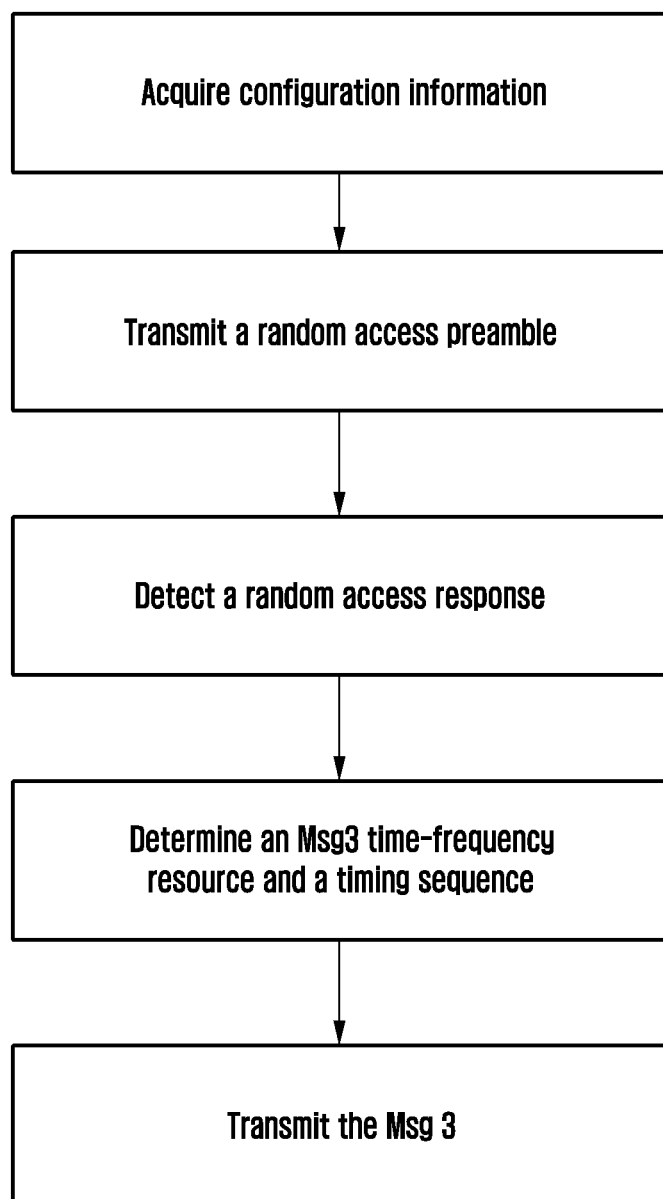
FIG. 43 is a schematic flowchart of a method for configuring TA according to the present invention.

The method for acquiring configuration of timing advance according to the present invention, the procedures of which are shown in FIG. 43, comprises steps of:

acquiring, by a terminal, random access configuration information for random access, the random access configuration information including a random access preamble format, random access preamble resource pool information, random access channel configuration information, etc.;

determining, by the terminal, a random access channel and a random access preamble according to the random access channel configuration information;

transmitting, by the terminal, the random access preamble on the determined random access channel;

detecting a random access response, and acquiring timing advance configuration information carried in the random access response and uplink authorization information, by the terminal;

determining, by the terminal, timing advance configuration granularity information according to the random access preamble format; and selecting an Msg3 time-frequency resource according to the uplink authorization information and the determined timing advance configuration granularity information, determining a timing sequence, and transmitting the Msg3, by the terminal.

Figure 44:
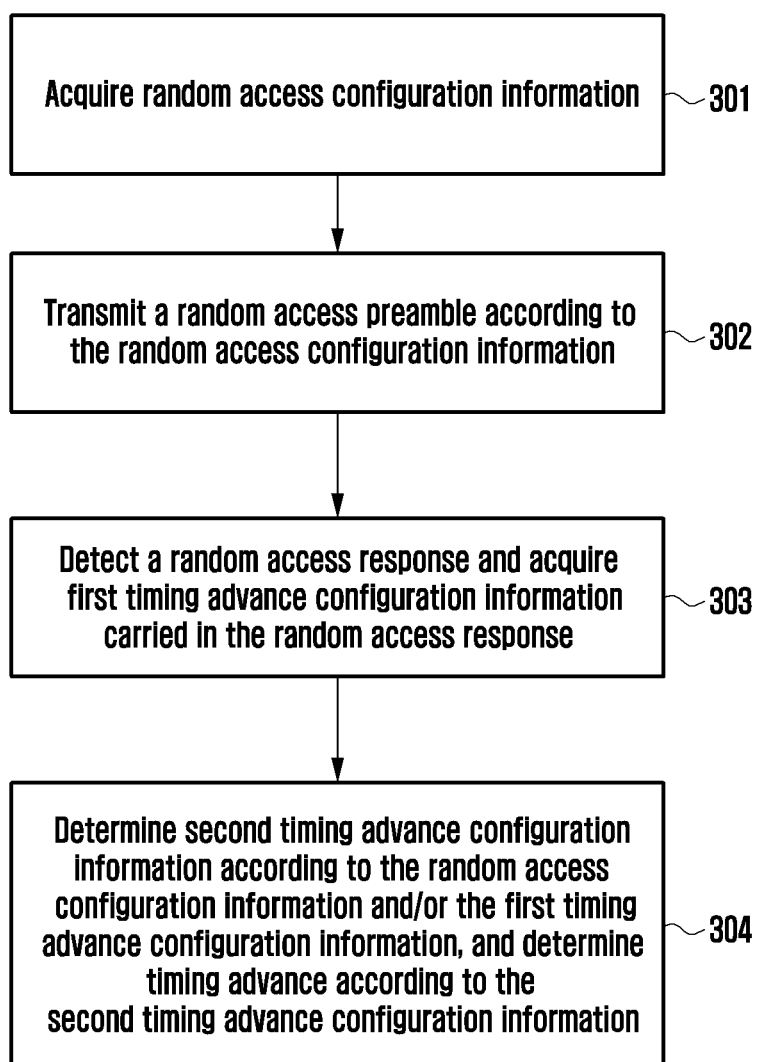
FIG. 44 is a detailed schematic flowchart of a method for acquiring configuration of TA on a terminal side according to the present invention.

The method for acquiring configuration of timing advance will be specifically explained by the process on the terminal side and the process on the base station side, respectively. FIG. 44 shows the process on the terminal side. The method specifically comprises the following steps.

S301: Random access configuration information is acquired.

Wherein, random access channel configuration information is carried in the random access configuration information.

S302: A random access preamble is transmitted according to the random access configuration information.

Specifically, a random access channel and a random access preamble are determined according to the random access channel configuration information, and the random access preamble is transmitted on the random access channel.

S303: A random access response is detected and first timing advance configuration information carried in the random access response is acquired.

S304: Second timing advance configuration information is determined according to the random access configuration information and/or the first timing advance configuration information, and a timing advance is determined according to the second timing advance configuration information.

In this step, specifically, there are following several ways to determine second timing advance configuration information according to the random access configuration information and/or the first timing advance configuration information:

1) wherein, random access preamble configuration information is carried in the random access configuration information, and the determining second timing advance configuration information according to the random access configuration information and/or the first timing advance configuration information comprises steps of:

determining timing advance interval configuration information according to the random access preamble configuration information; and determining second timing advance configuration information according to the timing advance interval configuration information and/or the first timing advance configuration information.

Further, timing advance interval configuration information is determined according to the random access preamble configuration information, wherein the random access preamble configuration information and the timing advance interval configuration information satisfy a predetermined mapping rule.

Further, a mapping rule between reference random access preamble configuration information and timing advance interval configuration information is preconfigured, and the timing advance interval configuration information is determined according to a proportional relation between the random access preamble configuration information and the reference random access preamble configuration information and the mapping rule; and the random access preamble configuration information is random access preamble subcarrier interval information.

2) first index information is carried in the random access configuration information, and the determining second timing advance configuration information according to the random access configuration information and/or the first timing advance configuration information comprises steps of:

inquiring a first index table according to the first index information to acquire timing advance interval configuration information corresponding to the first index information in the first index table; and determining second timing advance configuration information according to the timing advance interval configuration information and/or the first timing advance configuration information.

3) random access preamble configuration information is carried in the random access configuration information, and the determining second timing advance configuration information according to the random access configuration information and/or the first timing advance configuration information comprises steps of:

determining timing advance configuration bit length information according to the random access preamble configuration information; and determining second timing advance configuration information according to the timing advance configuration bit length information and/or the first timing advance configuration information.

Further, timing advance configuration bit length information is determined according to the random access preamble configuration information, wherein the random access preamble configuration information and the timing advance configuration bit length information satisfy a predetermined mapping rule.

4) second index information is carried in the random access configuration information, and the determining second timing advance configuration information according to the random access configuration information and/or the first timing advance configuration information comprises steps of:

inquiring a second index table according to the second index information to acquire timing advance configuration bit length information corresponding to the second index information in the second index table; and determining second timing advance configuration information according to the timing advance configuration bit length information and/or the first timing advance configuration information.

Further, the determining timing advance according to the second timing advance configuration information comprises a step of:

determining timing advance according to the first timing advance configuration information, the determined timing advance configuration bit length information, and the timing advance interval configuration information determined according to the random access configuration information.

This step further comprises steps of:

receiving timing advance adjustment indication information transmitted by a base station, and determining timing advance adjustment amount configuration information according to the timing advance adjustment indication information and preconfigured uplink data transmission subcarrier spacing information;

determining timing advance adjustment amount information according to the uplink data transmission subcarrier spacing information and the determined timing advance adjustment amount configuration information; and wherein the preconfigured uplink data transmission subcarrier spacing information is specifically uplink data transmission subcarrier spacing information preconfigured by a terminal or received uplink data transmission subcarrier spacing information which is preconfigured and then transmitted by a base station.

Wherein, determining timing advance adjustment amount information according to the uplink data transmission subcarrier spacing information and the determined timing advance adjustment amount configuration information specifically comprises steps of:

inquiring a third associative mapping list according to the uplink data transmission subcarrier spacing information to acquire timing advance adjustment amount interval information corresponding to the uplink data transmission subcarrier spacing information in the third associative mapping list; and calculating timing advance adjustment amount information according to the timing advance adjustment amount interval information and the timing advance adjustment amount configuration information.

This step further comprises a step of:

determining the adjusted timing advance according to the timing advance adjustment amount information and the determined timing advance.

Wherein, the random access preamble configuration information is specifically random access preamble format information and/or random access preamble subcarrier spacing information.

Still further, Msg3 is transmitted according to uplink authorization information carried in the random access response and the determined timing advance.

In this step, Msg3 is transmitted according to uplink authorization information carried in the random access response and the determined timing advance, comprising:

determining an Msg3 time-frequency resource and a timing sequence according to the uplink authorization information and the determined timing advance; and transmitting the Msg3 by the Msg3 time-frequency resource on the timing sequence.

Wherein, the process in the random access process mentioned in the above steps is specifically the process in the contention-free random access process.

Figure 45:
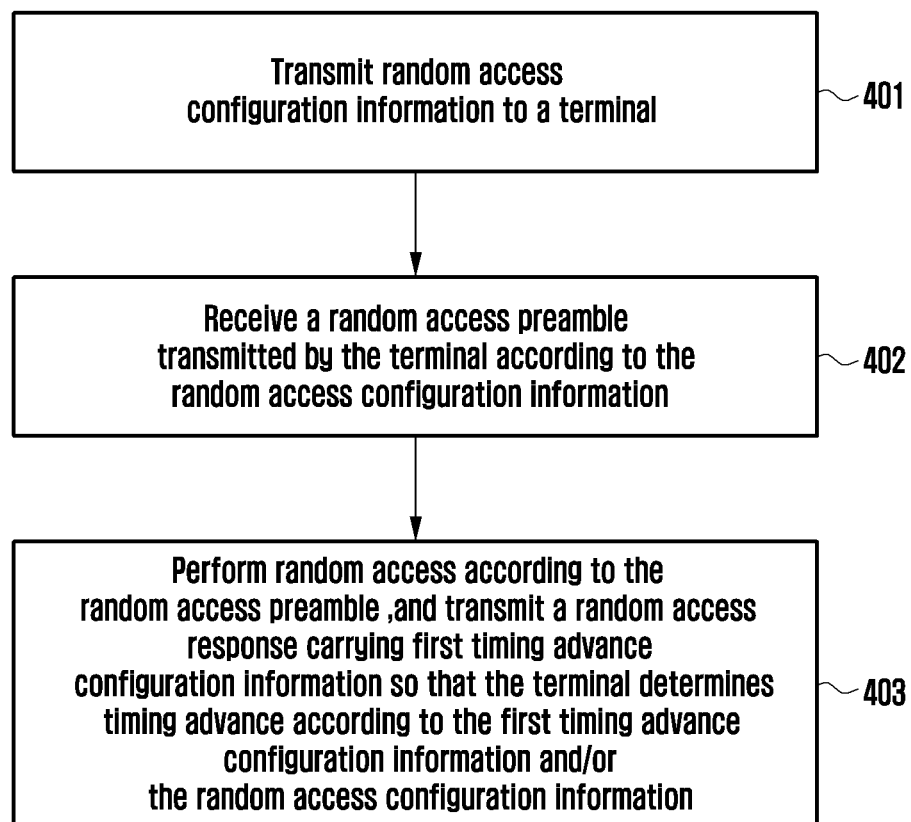
FIG. 45 is a detailed schematic flowchart of a method for configuring TA on a base station side according to the present invention.

FIG. 45 shows the process on the base station side. The method specifically comprises the following steps.

S401: Random access configuration information is transmitted to a terminal.

S402: A random access preamble transmitted by the terminal according to the random access configuration information is received.

S403: Random access process is performed according to the random access preamble, and a random access response carrying first timing advance configuration information is transmitted so that the terminal determines timing advance according to the first timing advance configuration information and/or the random access configuration information.

During this process, specifically:

(1) first index information is carried in the random access configuration information; and (2) second index information is carried in the random access configuration information; and The method for acquiring configuration of timing advance according to the present invention will be specifically explained below by four embodiments.

Embodiment Fourteen

In Embodiment fourteen, a method for acquiring configuration of timing advance will be described below in combination with a specific system. The system supports several random access preamble formats, and different random access preamble formats supports different cell radiuses. The random access preamble formats and other configuration information necessary for the random access process are transmitted in Remaining Minimum System Information (RMSI) or Other System Information (OSI). Meanwhile, the timing advance configuration granularity information can be predetermined or configured by the system in the RMSI or OSI.

One possible way of determining timing advance configuration granularity information is to establish, by means of predetermining, a relation between the random access preamble format and the timing advance configuration granularity information. For example, the unit of timing advance is specified. As the unit, sampling intervals Ts may be used. One possible example is shown in Table 5.

TABLE 5

Relation between the random access preamble format
and the timing advance configuration unit information

| Random access preamble format | Timing advance configuration unit information (Ts) |
|---|---|
| 0 | A1 |
| 1 | A2 |
| 2 | A3 |
| ... | ... |

Under the consideration that there is a direct relation between a random access preamble format and a supported cell radius, and due to different application scenarios, several random access preamble formats may provide similar cell radius supporting capacity. Therefore, same timing advance configuration unit information may be configured for the several random access preamble formats.

For example, one possible way is to define the size of Ts (value related to the sampling rate) and determine the timing advance configuration unit information (an integral multiple of Ts) according to a random access preamble format and a supported cell radius. One simple example is shown in Table 6, where Ts=1/(64*30.72*106).

TABLE 6

Relation between the random access preamble formats and
the timing advance configuration unit information

| Random access preamble format | Timing advance configuration unit information (Ts) | Supported cell radius (km) |
|---|---|---|
| A0, B0, B1 | 1*32 | 5 |
| A1, B2, B3 | 1*64 | 10 |
| A2, A3, B4 | 2*64 | 20 |
| ... | ... | |

In the above way of configuring TA, it is assumed that the random access preamble format contains subcarrier spacing information. In other ways, the random access preamble format and the subcarrier spacing are configured separately. That is, the random access preamble format is defined with reference to the subcarrier spacing, and parameter adjustment is performed on the random access preamble format in an equal proportion when the subcarrier spacing changes. For example, when the subcarrier spacing is 15 kHz, random access preamble formats A0-A3, B0-B4, C0-C1 or more are defined. When the subcarrier spacing is an integral multiple of 15 kHz, time-domain parameters (including CP length, sequence length, etc.) are scaled down in an equal proportion according to the integral multiple. Meanwhile, the supported cell radius will also be scaled down in an equal proportion according to the integral multiple.

In this case, the TA configuration unit information may still be determined in the way shown in Table 6, by means of establishing a corresponding relation between the timing advance configuration unit information and the random access preamble plus the subcarrier spacing. By this method, one simple example is shown in Table 7, where Ts=1/(64*30.72*106).

TABLE 7

Relation between the random access preamble formats and
the timing advance configuration unit information

| Random access preamble format | Subcarrier spacing (kHz) | Timing advance configuration unit information (Ts) | Supported cell radius (km) |
|---|---|---|---|
| A0, B0, B1 | 15 | 1*32 | 5 |
| A1, B2, B3 | 15 | 1*64 | 10 |
| A2, A3, B4 | 15 | 2*64 | 20 |
| A0, B0, B1 | 30 | 1*16 | 2.5 |
| A1, B2, B3 | 30 | 1*32 | 5 |
| A2, A3, B4 | 30 | 1*64 | 10 |
| ... | | ... | |

It is to be noted that, in the practical notification and configuration ways, the supported cell radius may not be configured, preset and notified, and instead, only the random access preamble format, the subcarrier spacing and the timing advance configuration unit information are notified, preset and configured.

In other processing ways, the timing advance configuration unit information corresponding to the random access preamble format at a reference subcarrier spacing is defined. At other subcarrier spacings, the timing advance configuration unit information is acquired by scaling in an equal proportion. One simple example is that, at a reference subcarrier spacing of 15 kHz, the relation between the random access preamble format and the timing advance configuration unit information is shown in Table 6. At other subcarrier spacings SCS=m*15 (kHz), wherein m is a positive integer, the timing advance configuration unit information corresponding to a certain random access preamble format is the timing advance configuration unit information corresponding to the certain random access preamble format at reference subcarrier spacing of 15 kHz divided by m. For example, if the timing advance configuration unit information corresponding to a random access preamble format K at a reference subcarrier spacing is K0, the timing advance configuration unit information corresponding to the random access preamble format K at the subcarrier spacing which is m multiple of the reference subcarrier spacing is: K0/m or $\lfloor K0/m \rfloor$ or $\lceil K0/m \rceil$, where symbol $\lfloor \cdot \rfloor$ means floor, and symbol $\lceil \cdot \rceil$ means ceiling.

Besides, a relation may be directly established between the subcarrier spacing for the random access preamble and the timing advance configuration unit information, regardless of the influence on the cell radius by the specific random access preamble format. One simple example is that, as shown in Table 8, a relation is established between the subcarrier spacing for the random access preamble and the timing advance configuration unit information, and the timing advance configuration unit information is obtained from the subcarrier spacing for the random access preamble, wherein Ts=1/(64*30.72*106).

TABLE 8

Relation between the random access preamble formats and
the timing advance configuration unit information

| Subcarrier spacing for the random access preamble (kHz) | Timing advance configuration unit information (Ts) | Supported cell radius (km) |
|---|---|---|
| 15 | 1*32 | 5 |
| 30 | 1*64 | 10 |

TABLE 8-continued

Relation between the random access preamble formats and
the timing advance configuration unit information

| Subcarrier spacing for the random access preamble (kHz) | Timing advance configuration unit information (Ts) | Supported cell radius (km) |
|---|---|---|
| 60 | 2*64 | 20 |
| ... | ... | |

It is to be noted that, in the practical notification and configuration ways, the supported cell radius may not be configured, preset and notified, and instead, only the random access preamble format, the subcarrier spacing and the timing advance configuration unit information are notified, preset and configured.

With this configuration way, the action of determining timing advance for Msg3 on the terminal side can be simply described as follows:

A terminal reads random access configuration information, including the random access preamble format, random access channel configuration, random access preamble resource pool information, and subcarrier spacing for the random access channel (it is to be noted that the subcarrier spacing for the random access channel may be considered as the subcarrier spacing for the random access preamble described above).

The terminal determines a random access channel and a random access preamble according to the random access configuration information and the preset rule, and transmits the random access preamble on the random access channel.

The terminal starts the detection of a random access response after a fixed timing sequence, after completing the transmission of the random access preamble. If a random access response is detected successfully, the TA configuration information and the uplink authorization information in the random access response are read.

The terminal determines the TA interval configuration information according to the random access preamble format and/or subcarrier spacing by the predetermined rule, and determines the specific TA information according to the TA configuration information.

The terminal transmits the Msg3 according to the TA information and the uplink authorization information.

In this way, the base station implicitly informs the terminal of the specific configuration way, by establishing a relation between the random access preamble and/or subcarrier spacing for the random access preamble and the TA interval configuration information. In another configuration way, the base station directly informs the terminal of the TA interval configuration information by an index table. One possible way is to establish an index table as shown in Table 9.

TABLE 9

Index table for timing advance configuration unit information

| Index | Timing advance configuration unit information (Ts) |
|---|---|
| 0 | K0 |
| 1 | K1 |
| 2 | K2 |
| ... | ... |

The base station carries, in the configuration information of RMSI or OSI, an index for the timing advance configuration unit information. Upon receiving the RMSI or OSI, the terminal determines the timing advance configuration unit information according to the index information.

At last, it is to be noted that, in this embodiment, it may be assumed that the number of bits of TA configuration information in the random access response will not change with the change in the random access preamble format or subcarrier spacing for the random access preamble.

In this embodiment, the received TA configuration information in the random access response is $N_{TA}$, and the TA configuration unit information determined according to the random access preamble format and/or subcarrier spacing for the random access preamble is K, then the timing advance for uplink data transmission is $N_{TA}K$ seconds. It is to be noted that K has contained sampling intervals Ts.

Embodiment Fifteen

In Embodiment fifteen, a method for acquiring configuration of timing advance will be described in combination with a specific system. The system supports several random access preamble formats, and different random access preamble formats supports different cell radiuses. The random access preamble formats and other configuration information necessary for the random access process are transmitted in RMSI or OSI. In Embodiment fourteen, a way of adjusting the TA by changing the TA configuration unit information (i.e., TA configuration granularity information) without changing the TA configuration bit length has been provided. In this embodiment, a way of adjusting the TA configuration bit length information will be described.

One possible way of determining timing advance configuration bit length information is to establish, by means of predetermining, a relation between the random access preamble format and/or subcarrier spacing and the timing advance configuration bit length information. Configuration is performed by an index table. That is, the terminal can determine the corresponding timing advance configuration bit length information according to the configured random access preamble format and/or subcarrier spacing.

Table 10 shows a simple example where a relation is established between the subcarrier spacing for the random access preamble and the TA configuration bit length information.

TABLE 10

The number of bits of timing advance configuration

| Subcarrier spacing for the random access preamble (kHz) | Timing advance configuration bit length information |
|---|---|
| 15 | 11 |
| 30 | 10 |
| 60 | 9 |
| ... | ... |

Upon successfully detecting and receiving a random access response, the terminal determines the bit length information of the TA configuration information $N_{TA}$ in the random access response according to the random access preamble format and/or subcarrier spacing, and obtains the specific TA configuration information.

In other processing ways, the terminal is explicitly informed of the TA configuration bit length information by an index table. For example, an index table for the TA configuration information is established, and an index for the TA configuration bit length information is transmitted in the RMSI or OSI. The terminal determines the TA configuration bit length information according to the bit length index in the received RMSI or OSI.

In addition, the TA configuration bit length information corresponding to different preamble formats at a reference subcarrier spacing may be defined. At other subcarrier spacings, the TA configuration bit length information corresponding to a corresponding preamble format is correspondingly adjusted. For example, the subcarrier spacing of 15 kHz for a preamble is defined as the reference subcarrier spacing, and the TA configuration bit length information corresponding to a preamble format is defined. For a subcarrier spacing of 15*m kHz for a preamble, wherein m is a positive integer, if the TA configuration bit length information corresponding to a preamble format A at the reference subcarrier spacing is n, then the TA configuration bit length information corresponding to a same preamble format at the subcarrier spacing of 15*m kHz is n-m.

It is to be noted that, in the way as described in this embodiment, the TA configuration unit information (i.e., TA configuration granularity information) can be fixed, or configured and notified in the way as described in Embodiment fourteen.

In this embodiment, the received TA configuration information in the random access response is $N_{TA}$, and the TA configuration unit information determined according to the random access preamble format and/or subcarrier spacing for the random access preamble is K, then the timing advance for uplink data transmission is $N_{TA}K$ seconds. It is to be noted that K has contained sampling intervals Ts.

Embodiment Sixteen

In Embodiment sixteen, a method for acquiring configuration of timing advance will be described in combination with a specific system. In the above two embodiments, the used method is to determine timing advance according to the random access preamble and the random access channel configuration parameter. In this embodiment, a way of determining timing advance adjustment amount information according to the subcarrier spacing for an allocated uplink channel will be described.

In this embodiment, the timing advance configuration information has been determined in the way as described in Embodiment fourteen or fifteen, and the terminal has completed the random access process and starts to perform data communication with the base station. During the data communication process, due to the movement of the terminal or the change of the wireless communication environment, the terminal will adjust the TA according to a TA adjustment command from the base station. Since the used subcarrier spacing is different, the TA adjustment amount configuration granularity information is different.

By establishing a relation between the subcarrier spacing for uplink data transmission and the TA adjustment amount configuration granularity information (i.e., TA adjustment amount interval configuration information), the change in the TA adjustment amount configuration granularity information, which is caused by the change in the subcarrier spacing, is adjusted.

Specifically, an index table shown in Table 11 can be used to establish a relation between the subcarrier spacing for uplink data transmission and the TA adjustment amount configuration granularity information, wherein Ts=1/(64*30.72*106).

TABLE 11

| TA adjustment amount configuration granularity information | |
|---|---|
| Subcarrier spacing for uplink data transmission (kHz) | TA adjustment amount configuration granularity information (Ts) |
| 15 | K0 |
| 30 | K1 |
| 60 | K2 |
| . . . | . . . |

In this table, K0, K1 and K2 in the TA adjustment amount configuration granularity information means that the TA adjustment amount configuration granularity information is K0*Ts, K1*Ts, K2*Ts at this subcarrier spacing.

In this way provided in this embodiment, the terminal calculates new timing advance $N_{TA\_new}$ according to the old timing advance $N_{TA\_old}$ and the TA adjustment amount information, specifically:

The terminal reads a TA adjustment amount command transmitted by the base station through a high-layer signaling or downlink control channel, and determines the TA adjustment amount information according to the relation between the subcarrier spacing for uplink data transmission and the TA adjustment amount configuration granularity information. If the TA adjustment amount command is $N_{TA\_off}$ and the TA adjustment amount configuration granularity information corresponding to the subcarrier spacing for uplink data transmission scheduled by the base station is K, the TA adjustment mount is $N_{TA\_adjust}=N_{TA\_off}*K$.

The terminal calculates new TA according to the existed TA and the TA adjustment amount information:

$$N_{TA\_new}=N_{TA\_old}+N_{TA\_adjust}$$

It is to be noted that, according to the above description, both the $N_{TA\_old}$ and the $N_{TA\_adjust}$ have contained sampling intervals Ts. That is, they are an integral multiple of sampling intervals Ts.

Embodiment Seventeen

In Embodiment seventeen, a method for acquiring configuration of timing advance will be described in combination with a specific system. In this embodiment, contention-free random access will be taken into consideration.

The contention-free transmission can be used for cell handover or a process in which connection to a primary cell base station has been established and connection to a small cell base station is to be further established. Since different cells use different bands, subcarrier spacings and supported cell radiuses, in different cells, the TA configuration granularity information and the desired range are different.

The terminal is informed of the configuration information for the contention-free random access process by a high-layer signaling (for example, a cell handover process) or a downlink control channel (for example, PDCCH command). The terminal determines the TA configuration granularity information according to the random access preamble format and/or the subcarrier spacing for the random access preamble in the received contention-free random access configuration information, and determines a TA command for subsequent data transmission according to the TA configuration information in the random access response. Wherein, the determination of the TA configuration granularity information according to the random access preamble format and/or the subcarrier spacing for the random access preamble in the received contention-free random access configuration information can be done by the method described in Embodiment fourteen and/or Embodiment fifteen.

The way provided in this embodiment can be used for cell handover, or configuration and notification of TA groups of multiple carriers during the carrier aggregation.

Embodiment Eighteen

In Embodiment eighteen, a method for acquiring timing advance adjustment amount will be described in the context of a specific system.

As described in Embodiment sixteen, the TA adjustment amount granularity is determined by the subcarrier spacing for the uplink data transmission channel. The base station determines the TA adjustment amount granularity information according to the subcarrier spacing for the current uplink shared channel scheduled to the terminal, and transmits the TA adjustment amount configuration information. Upon receiving the TA adjustment amount configuration information, the terminal calculates and adjusts the TA by using the TA adjustment amount configuration information after a fixed time period (for example, after k time slots), and transmits the uplink data according to the adjusted TA.

Since the terminal is allowed to use several possible subcarrier spacings in the 5G communication system, if the base station schedules, after it configures a TA adjustment amount and before the adjustment amount goes into effect, an uplink shared channel with another subcarrier spacing for the uplink data transmission of the terminal, then the terminal will use the subcarrier spacing for the newly scheduled uplink shared channel when using the TA adjustment amount. As a result, errors occur in the calculation of TA.

To solve this problem, this embodiment provides following possible ways.

Method 1: The base station still determines the TA adjustment amount according to the subcarrier spacing for the current uplink shared channel scheduled to the terminal, and transmits it to the terminal by a downlink control channel or a high-layer signaling.

Upon receiving the TA adjustment amount information configured by the base station, the terminal obtains the TA adjustment amount granularity information according to the subcarrier spacing for the current uplink shared channel and calculates the TA adjustment amount. After a fixed time period (for example, after k time slots), the TA is adjusted by using the calculated TA adjustment amount, and the uplink data is transmitted according to the adjusted TA.

Method 2: The base station still determines the TA adjustment amount configuration information according to the subcarrier spacing for the current uplink shared channel scheduled to the terminal, and transmits it to the terminal by a downlink control channel or a high-layer signaling. The base station adds the TA adjustment amount granularity configuration information into a scheduling command when scheduling an uplink shared channel with another subcarrier spacing for the terminal.

Upon receiving the TA adjustment amount configuration information, the terminal determines the TA adjustment amount by using the configuration information after a fixed time period (for example, after k time slots). The terminal uses, by default, the TA adjustment amount granularity corresponding to the subcarrier spacing for the uplink shared channel after the fixed time period to calculate the TA adjustment amount. If the terminal receives the scheduling information from the base station within the fixed time period and the scheduling information contains the TA adjustment amount granularity information, the terminal calculates the TA adjustment amount according to the TA adjustment amount granularity information in the scheduling information.

In this method, if the scheduling information from the base station has been transmitted to the terminal before the transmitting of the TA adjustment amount configuration information, the terminal determines the granularity of the TA adjustment amount according to the current subcarrier spacing (or determines the granularity according to the granularity information in the previous scheduling information); and if the scheduling information from the base station is transmitted to the terminal after the transmitting of the TA adjustment amount configuration information, the terminal calculates the TA adjustment amount according to the granularity information in the scheduling information and the TA configuration information.

Wherein, the TA adjustment granularity information carried in the scheduling information from the base station may be configured and notified by an index. For example, one possible granularity information index table is shown in Table 12.

TABLE 12

| Index | TA adjustment amount configuration granularity information (Ts) |
|---|---|
| 0 | K0 |
| 1 | K1 |
| 2 | K2 |
| ... | ... |

Wherein, in Table 12, Ts=1/(64*30.72*106).

An index corresponding to TA adjustment amount configuration granularity information is transmitted in the scheduling information from the base station.

Method 3: The base station still determines the TA adjustment amount configuration information according to the subcarrier spacing for the current uplink shared channel scheduled to the terminal, and transmits it to the terminal by a downlink control channel or a high-layer signaling. The base station adds the TA adjustment amount configuration information corresponding to this subcarrier spacing into a scheduling command when scheduling an uplink shared channel with another subcarrier spacing for the terminal.

Upon receiving the TA adjustment amount configuration information, the terminal determines the TA adjustment amount by using the configuration information after a fixed time period (for example, after k time slots). The terminal uses, by default, the TA adjustment amount granularity corresponding to the subcarrier spacing for the uplink shared channel after the fixed time period to calculate the TA adjustment amount. If the terminal receives the scheduling information from the base station within the fixed time period and the scheduling information contains new TA adjustment amount configuration information, the terminal determines the TA adjustment amount granularity according to the newly configured subcarrier spacing, determines the TA adjustment amount according to the TA adjustment amount configuration information in the scheduling information, and adjusts the TA to complete the transmitting of the uplink data.

Figure 46:
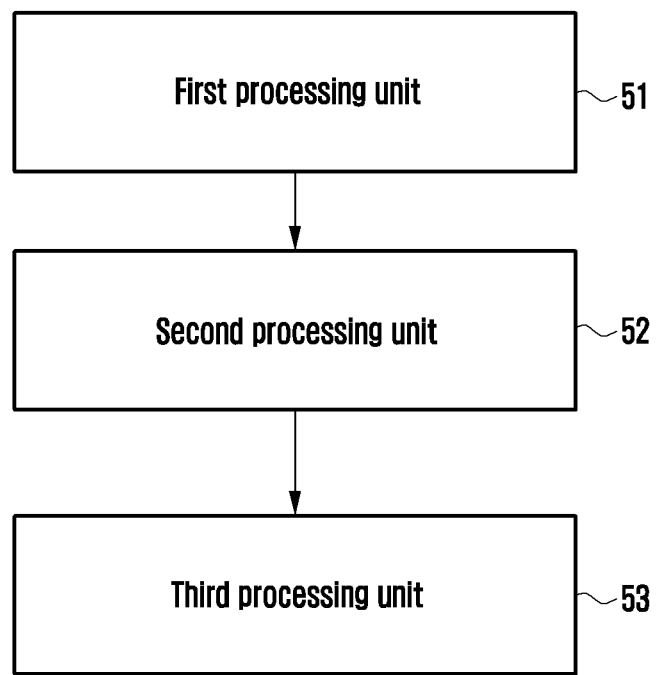
FIG. 46 is a structure diagram of a device for acquiring configuration of TA on a terminal side according to the present invention.

Based on the method for acquiring configuration of TA according to the present invention, the present invention further provides a device for acquiring configuration of TA, applied on the terminal side. As shown in FIG. 46, the device comprises:

a first processing unit 51 configured to acquire random access configuration information and transmit a random access preamble according to the random access configuration information;

a second processing unit 52 configured to detect a random access response and acquire first timing advance configuration information carried in the random access response; and a third processing unit 53 configured to determine second timing advance configuration information according to the random access configuration information and/or the first timing advance configuration information, and determine a timing advance according to the second timing advance configuration information.

Random access preamble configuration information is carried in the random access configuration information. The third processing unit 53 is configured to determine timing advance interval configuration information according to the random access preamble configuration information; and determine second timing advance configuration information according to the timing advance interval configuration information and/or the first timing advance configuration information.

Timing advance interval configuration information is determined according to the random access preamble configuration information, wherein the random access preamble configuration information and the timing advance interval configuration information satisfy a predetermined mapping rule.

The third processing unit 53 is configured to preconfigure a mapping rule between reference random access preamble configuration information and timing advance interval configuration information, and determine the timing advance interval configuration information according to a proportional relation between the random access preamble configuration information and the reference random access preamble configuration information and the mapping rule; and the random access preamble configuration information is random access preamble subcarrier spacing information.

Random access preamble configuration information is carried in the random access configuration information. The third processing unit 53 is configured to determine timing advance configuration bit length information according to the random access preamble configuration information; and determine second timing advance configuration information according to the timing advance configuration bit length information and/or the first timing advance configuration information.

Timing advance configuration bit length information is determined according to the random access preamble configuration information, wherein the random access preamble configuration information and the timing advance configuration bit length information satisfy a predetermined mapping rule.

The random access preamble configuration information is specifically random access preamble format information and/or random access preamble subcarrier spacing information.

First index information is carried in the random access configuration information. The third processing unit 53 is configured to acquire, according to the first index information, timing advance interval configuration information corresponding to the first index information; and determine second timing advance configuration information according to the timing advance interval configuration information and/or the first timing advance configuration information.

Second index information is carried in the random access configuration information. The third processing unit 53 is configured to acquire, according to the second index information, timing advance configuration bit length information corresponding to the second index information; and determine second timing advance configuration information according to the timing advance configuration bit length information and/or the first timing advance configuration information.

The third processing unit 53 is further configured to determine timing advance according to the first timing advance configuration information, the determined timing advance configuration bit length information, and the timing advance interval configuration information determined according to the random access configuration information.

The third processing unit 53 is further configured to:
receive timing advance adjustment indication information transmitted by a base station;
determine timing advance adjustment amount configuration information according to the timing advance adjustment indication information and preconfigured uplink data transmission subcarrier spacing information; and
determine timing advance adjustment amount information according to the uplink data transmission subcarrier spacing information and the determined timing advance adjustment amount configuration information;
wherein the preconfigured uplink data transmission subcarrier spacing information is specifically uplink data transmission subcarrier spacing information preconfigured by a terminal or received uplink data transmission subcarrier spacing information which is preconfigured and then transmitted by a base station.

The third processing unit 53 is further configured to inquire a third associative mapping list according to the uplink data transmission subcarrier spacing information to acquire timing advance adjustment amount interval information corresponding to the uplink data transmission subcarrier spacing information in the third associative mapping list; and determine timing advance adjustment amount information according to the timing advance adjustment amount interval information and the timing advance adjustment amount configuration information.

The third processing unit 53 is further configured to determine the adjusted timing advance according to the timing advance adjustment amount information and the determined timing advance.

Wherein, the processing in the random access process is specifically processing in the contention-free random access process.

The third processing unit 53 is further configured to transmit Msg3 according to uplink authorization information carried in the random access response and the determined timing advance.

Figure 47:
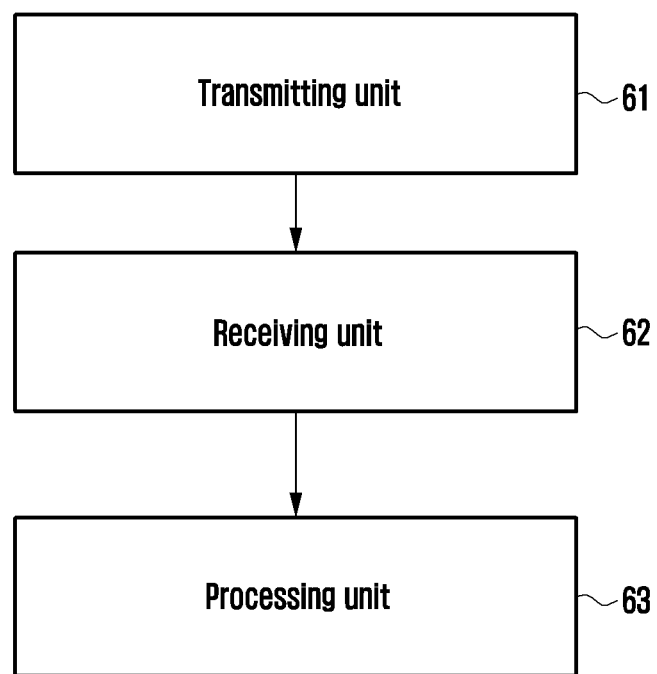
FIG. 47 is a structure diagram of a device for configuring TA on a base station side according to the present invention.

Based on the method for configuring TA according to the present invention, the present invention further provides a device for configuring TA, applied on the base station side. As shown in FIG. 47, the device comprises:

a transmitting unit 61 configured to transmit random access configuration information to a terminal;

a receiving unit 62 configured to receive a random access preamble transmitted by the terminal according to the random access configuration information; and a processing unit 63 configured to perform random access according to the random access preamble, and transmit a random access response carrying first timing advance configuration information so that the terminal determines a timing advance according to the first timing advance configuration information and/or the random access configuration information.

Wherein, first index information is carried in the random access configuration information so that the terminal acquires corresponding timing advance interval configuration information according to the first index information.

Second index information is carried in the random access configuration information so that the terminal acquires corresponding timing advance configuration bit length information according to the second index information.

The present invention further provides a terminal apparatus comprising a memory and a first processor, wherein the memory is configured to store computer programs that, when executed by the first processor, implement steps of a method for acquiring configuration of a timing advance as described above.

The present invention further provides a base station comprising a memory and a second processor, wherein the memory is configured to store computer programs that, when executed by the second processor, implement steps of a method for acquiring configuration of a timing advance as described above.

It should be understood by those skilled in the art that computer program instructions can be used to realize each block in structure diagrams and/or block diagrams and/or flowcharts as well as a combination of blocks in the structure diagrams and/or block diagrams and/or flowcharts. It should be understood by those skilled in the art that these computer program instructions can be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means.

The modules in the devices of the present invention can be integrated together, or can be deployed separately. The modules can be integrated into one module, or can be further split into multiple submodules.

It should be understood by those skilled in the art that the drawings are merely schematic diagrams of one preferred embodiment, and the modules or flows in the drawings are not necessary for the implementation of the present invention.

It should be understood by those skilled in the art that the modules in the devices in the embodiments can be distributed in the devices in the embodiments according to the descriptions in the embodiments, or can be located in one or more devices in the embodiments in accordance with corresponding changes. The modules in the embodiments can be integrated into one module, or can be further split into multiple submodules.

The serial number in the present invention is merely for description and does not represents the superiority of the embodiments.

The foregoing description merely shows several specific embodiments of the present invention, and the present invention is not limited thereto. Any variation conceived by those skilled in the art shall fall into the protection scope of the present invention.

As those skilled in the art can understand, the program running on the device according to the present disclosure may be a program that causes a computer to realize the functions of the embodiments of the present disclosure by controlling a central processing unit (CPU). The program or the information processed by the program may be temporarily stored in a volatile memory such as a random access memory (RAM), a hard disk drive (HDD), a non-volatile memory such as a flash memory, or other memory system.

A program for implementing the functions of the embodiments of the present disclosure may be recorded on a computer-readable recording medium. The corresponding functions can be realized by causing a computer system to read the program recorded on the recording medium and execute the program. The so-called "computer system" herein may be a computer system embedded in the device, and may include an operating system or hardware such as a peripheral device. The "computer-readable recording medium" may be a semiconductor recording medium, an optical recording medium, a magnetic recording medium, a recording medium that dynamically stores programs in short time, or any other recording medium readable by a computer.

Various features or functional modules of the device used in the above embodiments may be implemented or executed by a circuit (for example, monolithic or multi-chip integrated circuits). Circuits designed to perform the functions described in this specification may include general purpose processors, digital signal processors (DSPs), application specific integrated circuits (ASICs), field programmable gate arrays (FPGAs), or other programmable logic devices, discrete Gate or transistor logic, discrete hardware components, or any combination of the above. The general purpose processor may be a microprocessor or any existing processor, controller, microcontroller, or state machine. The above circuit can be a digital circuit or an analog circuit. One or more embodiments of the present disclosure may also be implemented using new integrated circuit technologies in the case of the new integrated circuit technology that has replaced the existing integrated circuits due to advances in semiconductor technology.

As above, the embodiments of the present disclosure have been described in detail with reference to the drawings. However, the specific configuration is not limited to the above embodiments, and the present disclosure also includes any design changes without departing from the gist of the present disclosure. In addition, various modifications may be made to the present disclosure within the scope of the appended claims, and the embodiments obtained by appropriately combining the technical means disclosed in the different embodiments are also included in the technical scope of the present disclosure. In addition, the components having the same effects described in the above embodiments may be replaced with each other.

The above description is only the preferred embodiments of the present application and the explanation of the technical principles used. It should be understood by those skilled in the art that the scope of the invention involved in the present application is not limited to the technical solutions formed by a specific combination of the above technical features and should also cover other technical solutions formed by any combination of the above technical features or their equivalent features without departing from the inventive concept, for example, the technical solutions formed by replacing the above features with the technical features having similar functions disclosed in the present application (but not limited to thereto).

What is claimed is:

1. A method by a user equipment (UE) in a wireless communication system, the method comprising:
measuring a signal of a target cell;
transmitting, to a network node, a measurement report on the signal of the target cell;
receiving, from the network node, a handover command including resource configuration information comprising dedicated random access resource configuration information associated with a synchronization signal block (SSB); and
performing a random access to the target cell based on the resource configuration information.

2. The method according to claim 1, wherein the dedicated random access resource configuration information includes a threshold for selecting the SSB.

3. The method according to claim 1,
wherein the random access resource configuration information includes dedicated random access resource configuration information associated with channel status information reference signals (CSI-RSs), and
wherein the dedicated random access resource configuration information includes a threshold for selecting a CSI-RS.

4. A method by a network node in a wireless communication system, the method comprising:
receiving, from a user equipment (UE), a measurement report on a signal of a target cell; and
transmitting, to the UE, a handover command including resource configuration information comprising dedicated random access resource configuration information associated with a synchronization signal block (SSB) based on the measurement report.

5. The method according to claim 4, wherein the dedicated random access resource configuration information includes a threshold for selecting the SSB.

6. The method according to claim 4,
wherein the random access resource configuration information includes dedicated random access resource configuration information associated with channel status information reference signals (CSI-RSs), and
wherein the dedicated random access resource configuration information includes a threshold for selecting a CSI-RS.

7. A user equipment, comprising:
a communication interface configured to communicate;
a processor; and
a memory storing computer-executable instructions that, when executed by the processor, cause the processor to perform the following operations:
measuring a signal of a target cell;
transmitting, to a network node, a measurement report on the signal of the target cell;
receiving, from the network node, a handover command including resource configuration information comprising dedicated random access resource configuration information associated with a synchronization signal block (SSB); and
performing a random access to the target cell based on the resource configuration information.

8. The user equipment according to claim 7, wherein the dedicated random access resource configuration information includes a threshold for selecting the SSB.

9. The user equipment according to claim 7,
wherein the random access resource configuration information includes dedicated random access resource configuration information associated with channel status information reference signals (CSI-RSs), and
wherein the dedicated random access resource configuration information includes a threshold for selecting a CSI-RS.

10. A network node, comprising:
a communication interface configured to communicate;
a processor; and
a memory storing computer-executable instructions that, when executed by the processor, cause the processor to perform the following operations:
receiving, from a user equipment (UE), a measurement report on a signal of a target cell; and
transmitting, to the UE, a handover command including resource configuration information comprising dedicated random access resource configuration information associated with a synchronization signal block (SSB) based on the measurement report.

11. The network node according to claim 10, wherein the dedicated random access resource configuration information includes a threshold for selecting the SSB.

12. The user equipment according to claim 10,
wherein the random access resource configuration information includes dedicated random access resource configuration information associated with channel status information reference signals (CSI-RSs), and
wherein the dedicated random access resource configuration information includes a threshold for selecting a CSI-RS.

* * * * *